US012643259B2

(12) United States Patent
Hakeem et al.

(10) Patent No.: US 12,643,259 B2
(45) Date of Patent: Jun. 2, 2026

(54) FLEXURAL HYBRID SPAN BEAM

(71) Applicant: NAJRAN UNIVERSITY, Najran (SA)

(72) Inventors: Ibrahim Yahya Ahmed Hakeem,
Najran (SA); Muhammad Kalimur Rahman, Dhahran (SA)

(73) Assignee: NAJRAN UNIVERSITY, Najran (SA)

( * ) Notice: Subject to any disclaimer, the term of this patent is extended or adjusted under 35 U.S.C. 154(b) by 264 days.

(21) Appl. No.: 18/448,546

(22) Filed: Aug. 11, 2023

(65) Prior Publication Data

US 2025/0050534 A1 Feb. 13, 2025

(51) Int. Cl.
| | |
|---|---|
| B28B 1/16 | (2006.01) |
| C04B 14/06 | (2006.01) |
| C04B 14/48 | (2006.01) |
| C04B 20/00 | (2006.01) |
| C04B 20/10 | (2006.01) |
| C04B 28/04 | (2006.01) |

(Continued)

(52) U.S. Cl.
CPC .............. B28B 1/16 (2013.01); C04B 14/06 (2013.01); C04B 14/48 (2013.01); C04B 20/0068 (2013.01); C04B 20/1062 (2013.01); C04B 28/04 (2013.01); C04B 40/0046 (2013.01); C04B 2103/32 (2013.01); C04B 2201/52 (2013.01)

(58) Field of Classification Search
CPC ................................... B28B 1/16; C04B 14/06
See application file for complete search history.

(56) References Cited

U.S. PATENT DOCUMENTS

| | | | |
|---|---|---|---|
| 7,641,731 | B2 | 1/2010 | Chanut et al. |
| 2014/0190113 | A1 | 7/2014 | Azad et al. |

(Continued)

FOREIGN PATENT DOCUMENTS

| | | |
|---|---|---|
| AU | 2021104161 A4 | 4/2022 |
| CN | 108179837 A | 6/2018 |
| CN | 114753270 A | 7/2022 |

OTHER PUBLICATIONS

Tanarslan, H.M., Alver, N.I.N.E.L., Jahangiri, R., Yalçnkaya, Ç. and Yazici, H., 2017. Flexural strengthening of RC beams using UHPFRC laminates: Bonding techniques and rebar addition. Construction and Building Materials, 155, pp. 45-55. (Year: 17).*

(Continued)

*Primary Examiner* — Nicholas Krasnow
(74) *Attorney, Agent, or Firm* — Oblon, McClelland, Maier & Neustadt, L.L.P.

(57) ABSTRACT

A method for producing a flexural hybrid span beam includes casting a first layer of ultra-high performance concrete (UHPC) into a bottom of a mold, the first layer comprising steel fibers that are randomly oriented and dispersed. The method includes self-curing the first layer for at least 48 hours to form an unfinished top surface of the first layer. The method includes casting a second layer of plain concrete, over the unfinished top surface of the first layer, in the mold, wherein the second layer of plain concrete is not reinforced by steel bars. The method includes curing the first layer and the second layer to form the flexural hybrid span beam. An interface between the first layer and the second layer is substantially flat and has a periphery conforming to a shape of the mold.

19 Claims, 27 Drawing Sheets

100

Casting a first layer of ultra-high performance concrete (UHPC) into a bottom of a mold, the first layer comprising steel fibers that are randomly oriented and dispersed — 102

Self-curing the first layer for at least 48 hours form an unfinished top surface of the first layer — 104

Casting a second layer of plain concrete, over the unfinished top surface of the first layer, in the mold, where the second layer of plain concrete is not reinforced by steel bars — 106

Curing the first layer and the second layer to form the flexural hybrid beam, wherein an interface between the first layer and the second layer is substantially flat and has a periphery conforming to a shape of the mold — 108

(51) Int. Cl.
    *C04B 40/00*       (2006.01)
    *C04B 103/32*    (2006.01)

(56)        References Cited

U.S. PATENT DOCUMENTS

2018/0141867 A1    5/2018   Zampini et al.
2022/0205195 A1    6/2022   Said

OTHER PUBLICATIONS

Al-Osta, M.A., Isa, M.N., Baluch, M.H. and Rahman, M.K., 2017. Flexural behavior of reinforced concrete beams strengthened with ultra-high performance fiber reinforced concrete. Construction and Building Materials, 134, pp. 279-296. (Year: 17).*

Huang, Y., Grünewald, S., Schlangen, E. and Luković, M., 2022. Strengthening of concrete structures with ultra high performance fiber reinforced concrete (UHPFRC): A critical review. Construction and Building Materials, 336, p. 127398. (Year: 17).*

Amran, M., Huang, S.S., Onaizi, A.M., Makul, N., Abdelgader, H.S. and Ozbakkaloglu, T., 2022. Recent trends in ultra-high performance concrete (UHPC): Current status, challenges, and future prospects. Construction and Building Materials, 352, p. 129029. (Year: 22).*

Tsioulou, O.T., Lampropoulos, A.P. and Dritsos, S.E., 2013. Experimental investigation of interface behaviour of RC beams strengthened with concrete layers. Construction and Building Materials, 40, pp. 50-59. (Year: 13).*

Lampropoulos, A.P., Paschalis, S.A., Tsioulou, O.T. and Dritsos, S.E., 2016. Strengthening of reinforced concrete beams using ultra high performance fibre reinforced concrete (UHPFRC). Engineering Structures, 106, pp. 370-384. (Year: 16).*

Liu, S., He, Z. and Hu, L., 2022. Interfacial microstructure between ultrahigh-performance concrete-normal concrete in fresh-on-fresh casting. Construction and Building Materials, 322, p. 126476. https://www.sciencedirect.com/science/article/pii/S0950061822001684 (Year: 2022).*

Ahmed et al. ; Structural Behavior of High Performance Lightweight Aggregate Concrete Beams Reinforced With Fibers ; Fibre Concrete 2011 ; Sep. 8-9, 2011 ; 2 Pages.

* cited by examiner

100

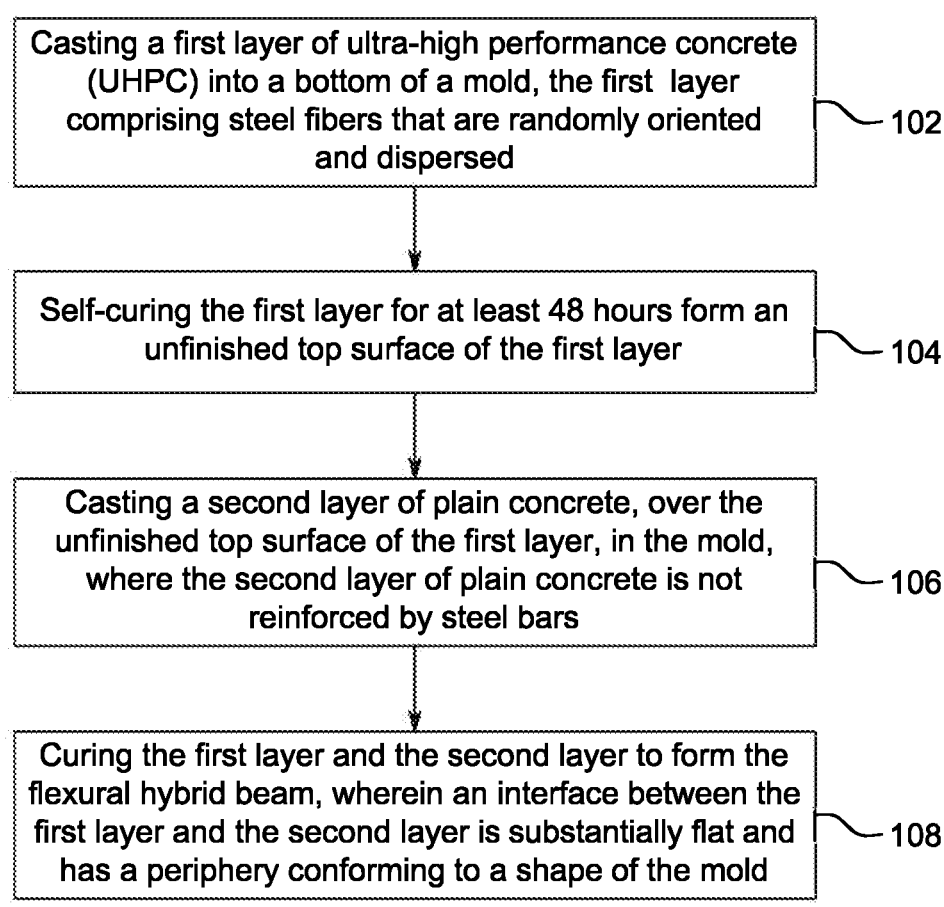

Casting a first layer of ultra-high performance concrete
(UHPC) into a bottom of a mold, the first layer
comprising steel fibers that are randomly oriented
and dispersed — 102

Self-curing the first layer for at least 48 hours form an
unfinished top surface of the first layer — 104

Casting a second layer of plain concrete, over the
unfinished top surface of the first layer, in the mold,
where the second layer of plain concrete is not
reinforced by steel bars — 106

Curing the first layer and the second layer to form the
flexural hybrid beam, wherein an interface between the
first layer and the second layer is substantially flat and
has a periphery conforming to a shape of the mold — 108

UHPC Layer

350

360

600 ⟍

650 ⟍

700

800

850

852

854

854

860

862

864

1110

1120

FLEXURAL HYBRID SPAN BEAM

CROSS REFERENCE TO RELATED APPLICATION

Aspects of the present disclosure are related to an academic paper published in Materials on Aug. 16, 2022, titled "Experimental Investigation of Hybrid Beams Utilizing Ultra-High Performance Concrete (UHPC) as Tension Reinforcement", which is incorporated herein by reference in its entirety.

BACKGROUND

Technical Field

The present disclosure is directed to a flexural hybrid span beam and a method of forming the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the rapid growth of technology, modern civil engineering construction requires better economic design and more durable construction structures made of higher-strength materials. One of the most common types of construction structures is concrete, especially reinforced concrete. Reinforced concrete is subject to various environmental conditions, including, but not limited to, erosion, impact loads, weather, and pollution. Durability issues in concrete structures, such as corrosion of reinforcement, alkali-silica reaction, and sulphate attack, associated with cracking from mechanical, thermal, and chemical stress, are almost inevitable. This can accelerate the deterioration of concrete structures to shorten their service life and increase cost owing to persistent monitoring and periodic maintenance and rehabilitation of the concrete structures. Plain (or unreinforced) concrete has several drawbacks such as low tensile strength, high brittleness, easy cracking, and heavy self-weight. Ultra-high performance concrete (UHPC) is produced to overcome the defects of plain concrete. UHPC offers super-strong mechanical properties (e.g. a compressive strength of more than 120 MPa and a flexural strength of more than 15 MPa), a high bond strength to the reinforcing bars and fibers, resistance to blast load, impact resistance, enhanced fatigue behavior, reduced pore volume and pore size resulting in very low water absorption, low chloride diffusion, reduced porosity and permeability, and very high durability. UHPC is a suitable substitution of the traditional steel reinforcement needed in the tension zone of concrete structures (or concrete beams). A reinforced UHPC column or beam is able to dissipate higher energy compared to a reinforced plain concrete during an earthquake, preventing it from collapsing. Efforts to reduce the high cost of UHPC include combining the UHPC with steel, wood, plain concrete or other materials to generate a hybrid system.

US20140190113A1 relates to UHPC reinforcement bars as tension reinforcement in concrete beams to replace steel tension bars. UHPC reinforcement bars are formed comprising a mix of Portland cement, micro-silica, fine aggregate, steels fibers, superplasticizer, and water.

US20180141867A1 relates to a concrete mix with several applications such as in concrete beams. The concrete mix includes fibers, micro silica, and fine aggregates. However, the reference teaches the use of metallic fibers in two separate fiber systems and only has a compressive strength of only 30-60 MPa.

CN108179837A relates to a dismounting-free high-performance composite cement template for constructing concrete columns and beams. It develops high-performance concrete, with slightly lower compressive strength and tensile strength. However, the concrete includes copper-plated steel fibers and basalt fibers.

CN114753270A relates to a reinforcing technique for bridge cover beams. This reference utilizes high-performance concrete comprising cement, a superplasticizer/water-reducing agent, water, and steel fibers. However, the steel fibers are shear corrugated, with a tensile strength of only 716.2 MPa. Furthermore, while the reference teaches the casting of more than one layer, thicknesses of each layer are much greater from 30 cm-50 cm, and adjusted according to the reinforcing steel bar.

An existing beam design utilized UHPC bars as tension reinforcement to provide flexural strength. (See: Azad, A. K., Hakeem, I. Y., "*Flexural behavior of hybrid concrete beams reinforced with ultra-high performance concrete bars*", Constr. Build. Mater. 2013, 49, 128-133, incorporated herein by reference in its entirety). However, the hybrid beam with UHPC bars demonstrates a ductile mode of failure associated with a softening part after peak load, with deflection increasing as the residual strength decreases.

Hence, there is a need for a flexural hybrid span beam that provides appropriate interfacial shear resistance and replaces the steel reinforcement needed in conventional beams, and has high durability in corrosive environments.

SUMMARY

In an embodiment, a method for producing a flexural hybrid span beam is described. The method includes casting a first layer of ultra-high performance concrete (UHPC) into a bottom of a mold, the first layer including steel fibers that are randomly oriented and dispersed. The method includes self-curing the first layer for at least 48 hours to form an unfinished top surface of the first layer. The method includes casting a second layer of a plain concrete, over the unfinished top surface of the first layer, in the mold. The second layer of the plain concrete is not reinforced by steel bars. The method includes curing the first layer and the second layer to form the flexural hybrid span beam. The method includes removing the flexural hybrid span beam from the mold. An interface between the first layer and the second layer is substantially flat and has a periphery conforming to a cross-sectional shape of the mold. The first layer is the bottom layer of the flexural hybrid span beam and the second layer is the top layer of the flexural hybrid span beam.

In an aspect, the second layer is cast over the unfinished top surface of the first layer after self-curing the first layer for the at least 48 hours.

In an aspect, the first layer and the second layer are cured for about 28 days to form the flexural hybrid span beam.

In an aspect, the steel fibers are coated by copper.

In an aspect, the steel fibers are straight and have an average diameter of about 0.2 mm.

In an aspect, the steel fibers have an aspect ratio of about 65 and a maximum tensile strength of 2500 MPa.

In an aspect, the first layer of UHPC further includes a type 1 ordinary Portland cement (OPC), a micro silica, a fine aggregate, a superplasticizer, and water.

In an aspect, the first layer of UHPC consists of at least one type 1 OPC, at least one micro silica, at least one fine aggregate, at least one superplasticizer, the water and the steel fibers.

In an aspect, the method further includes mixing the at least one type 1 OPC, the at least one micro silica and the at least one fine aggregate, then adding the water and the at least one superplasticizer, and then adding the steel fibers.

In an aspect, the first layer of UHPC has a width of 120-180 mm, a length of 760-1200 mm, a thickness of 20-50 mm, a compressive strength of at least 160 Mpa, and a tensile strength of about 30 Mpa.

In an aspect, the second layer of plain concrete includes a type 1 OPC, a fine aggregate, a coarse aggregate, and water.

In an aspect, the second layer of plain concrete consists of at least one type 1 OPC, at least one fine aggregate, at least one coarse aggregate, and the water.

In an aspect, the method further includes mixing the at least one type 1 OPC, the at least one fine aggregate and at least one coarse aggregate; and then adding the water.

In an aspect, the fine aggregate has an average size of about 0.6 mm, and the coarse aggregate has an average size of 10-20 mm.

In an aspect, a ratio of the water to the type 1 OPC is about 0.42, and the second layer of plain concrete has a width of 100-180 mm, a length of 760-1200 mm, and a thickness of 110-150 mm.

In an aspect, the unfinished top surface of the first layer is substantially flat, and the second layer is cast completely above the unfinished top surface of the first layer.

In an aspect, the method further includes treating the first layer with a trowel, and treating the second layer with the trowel.

In an aspect, the first layer has a first thickness of 20-50 mm, and the second layer has a second thickness of 110-175 mm.

In an aspect, the first layer has a first width of 150 mm, a first length of 900 mm and a first thickness of 50 mm. The second layer has a second width of 150 mm, a second length of 900 mm, and a second thickness of 150 mm. The flexural hybrid span beam has a failure load of 34,000 newtons and a deflection at a flexural failure load of 1.28 mm.

In an aspect, the flexural hybrid span beam consists of the first layer and the second layer.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 illustrates a method for producing a flexural hybrid span beam, according to aspects of the present disclosure;

DETAILED DESCRIPTION

Figure 2:
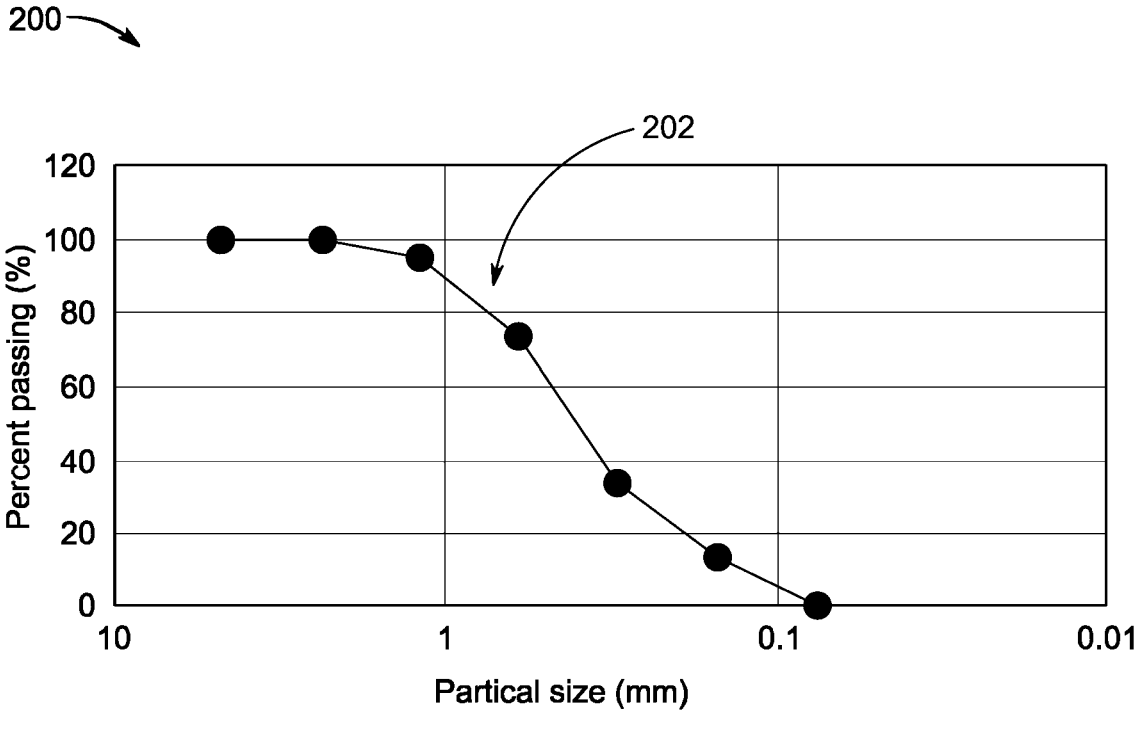
FIG. 2 illustrates a graph representing particle size distribution of the fine aggregate (FA) used in the flexural hybrid span beam, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Steel reinforcement (e.g. steel bars that are provided in combination with plain cement concrete to make reinforced concrete) is widely used in civil constructions. Ultra-high performance concrete (UHPC) has extremely high tensile strength, high compressive strength, high durability, and high ductility. The tensile strength of UHPC can be a substitution of the conventional steel reinforcement needed in the tension zone of the concrete beams. UHPC is capable of replacing conventional steel reinforcement made of normal concrete (NC) (or plain concrete) members. Steel fiber reinforced UHPC can have a flexural strength of greater than 30 Mpa. Steel reinforcement has a substantial potential for implementation in harsh environments, where the deterioration associated with corrosion of the steel reinforcement is considered a main issue for the durability of NC structural members, therefore requiring reinforcing structural members without steel reinforcement in a corrosive environment.

Aspects of this disclosure are directed to a method for producing a flexural hybrid span beam. The flexural hybrid span beam includes a first layer of UHPC as a bottom layer and a second layer of NC as a top layer. The UHPC layer, on the tension face, is configured to cater to tensile stresses, eliminating the need for passive steel reinforcement. Four-point flexural load tests were performed on 24 flexural hybrid span beams, where each beam had different dimensions and compositions, with the thin UHPC layer overlaid with the NC layer. During experiments, various parameters were considered, including the thickness of the UHPC layer, a depth of the flexural hybrid span beam, and a span of the flexural hybrid span beam. The experiments demonstrate a linear behavior of the hybrid NC-UHPC beam up to the ultimate load. An unfinished top surface of the UHPC layer and the overlying NC layer developed a full composite action without any slip. Further, it was found that a two-day self-curing of the UHPC layer was essential for developing a strong bond between the layers. The experimental results show that the hybrid NC-UHPC beam is an attractive, structurally feasible, and alternatively sound form of construction due to its high flexural strength and corrosion-free service life.

In various aspects of the disclosure, non-limiting definitions of one or more terms that will be used in the document are provided below.

The term "Ultra-High Performance Concrete (UHPC)" refers to a cementitious, concrete material that has a minimum specified compressive strength, when cured, of 17,000 pounds per square inch (120 Mpa), preferably at least 150 Mpa, preferably 150-240 Mpa, with specified durability, tensile ductility and toughness requirements.

The term "plain concrete" or "normal concrete" refers to a cementitious, concrete material that has a compressive strength, when cured, of 20-60 MPa, preferably 30-50 MPa, preferably 35-45 MPa.

The term "flexural strength" represents the highest stress experienced within the material at its moment of yield.

FIG. 1 illustrates a method 100 for producing a flexural hybrid span beam ("hybrid NC-UHPC beam"), according to aspects of the present disclosure. In an example, the flexural hybrid span beam includes only two layers: a first layer and a second layer. In some examples, the flexural hybrid span beam may include more than two layers.

At step 102, the method 100 includes casting the first layer of UHPC into a bottom of a mold. The first layer of UHPC includes steel fibers that are randomly oriented and dispersed. In an example, the steel fibers are coated with copper. For example, the steel fibers are straight and have an average diameter of about 0.2 mm. In an aspect, the steel fibers have an aspect ratio of 45-85, preferably 55-75, preferably 60-70, preferably about 65 and a maximum tensile strength of 2000-3000 MPa, preferably 2250-2750 MPa, preferably about 2500 MPa. In an aspect, the first layer of UHPC has a width in a range of 100-200 mm, preferably 120-180 mm, preferably 140-160 mm, and a length in a range of 600-1300 nn, preferably 760-1200 mm, preferably 850-1000 mm, and a thickness in a range of 10-60 mm, preferably 20-50 mm, preferably 30-40 mm, and a compressive strength of at least 160 MPa, preferably 160-300 MPa, preferably 200-250 MPa, and a tensile strength of 20-40 MPa, preferably 25-35 MPa, preferably about 30 MPa. In an example, the first layer of UHPC further includes a type 1 ordinary Portland cement (OPC), a micro silica, a fine aggregate, a superplasticizer, and water. In another example, the first layer of UHPC consists of at least one type 1 OPC, at least one micro silica, at least one fine aggregate, at least one superplasticizer, the water and the steel fibers. In an example, a ratio of the water to the type 1 OPC is 0.3-0.5, preferably 0.35-0.45, preferably about 0.42. In an example, the first layer has a first thickness of 20-50 mm. In an example, the first layer of UHPC has a first width of 150 mm, a first length of 900 mm and a first thickness of 50 mm.

Step 102 further includes mixing the at least one type 1 OPC, the at least one micro silica and the at least one fine aggregate. Water and the at least one superplasticizer are added to the mixture thereafter. After that, step 102 further includes adding the steel fibers.

At step 104, the method 100 includes self-curing the first layer of UHPC for 36-120 hours, preferably 48-96 hours, preferably about 48 hours to form an unfinished top surface of the first layer. The self-curing (internal curing) is defined as a process that can be used to provide additional moisture in the UHPC for more effective hydration of cement and reduced self-desiccation. When the self-curing is less than 36 hours, the unfinished top surface of the first layer of UHPC can be uneven when a second layer is deposited on top, even if a trowel treatment is performed on the unfinished top surface of the first layer of UHPC. As a result, an uneven interface can be formed. When the self-curing is longer than 120 hours, the bonding between the first layer of UHPC and a second layer of a plain concrete will be diminished. The self-curing is preferably carried out for a time sufficient to set the concrete in a green state prior to a complete cure. The first layer may reach a cure of 15-50% of design strength (compressive or flexural strength) after 48 hours, preferably 20-40%, 25-35% or about 30% design strength.

At step 106, the method 100 includes casting a second layer of a plain concrete (normal concrete), over the unfinished top surface of the first layer of UHPC, in the mold. The second layer of the plain concrete is not reinforced by steel bars. Note that conventional externally bonded reinforcement (EBR) methods typically use strong reinforcements, e.g. carbon, glass or aramid fibres, to strengthen UHPC. These strong reinforcements can be more resistant to deformation and stronger than UHPC. By contrast in the present disclosure, no such reinforcement is needed. Instead, the second layer includes the plain concrete to strengthen the UHPC. The second layer of plain concrete is cast over the unfinished top surface of the first layer of UHPC after self-curing the first layer. In an aspect, the second layer of plain concrete has a width in a range of 100-180 mm, a length in a range of 760-1200 mm, and a thickness in a range of 110-150 mm. In an example, the second layer of plain concrete includes the type 1 OPC, the fine aggregate, the coarse aggregate, and water. In another example, the second layer includes at least one type 1 OPC, at least one fine aggregate, at least one coarse aggregate, and the water. Step 106 further includes a step of mixing the at least one type 1 OPC, the at least one fine aggregate and at least one coarse aggregate and then adding the water. For example, a ratio of the water to the type 1 OPC is about 0.42. In an example, the fine aggregate has an average size of about 0.6 mm. In some examples, the coarse aggregate has an average size of 10-20 mm. In an example, the second layer has a second thickness of 110-175 mm. In an example, the second layer has a second width of 150 mm, a second length of 900 mm, and a second thickness of 150 mm.

At step 108, the method 100 includes curing the first layer of UPC and the second layer of plain concrete to form the flexural hybrid span beam. An interface between the first layer and the second layer is substantially flat and has a periphery conforming to a cross-sectional shape of the mold. In an example, the first layer and the second layer are cured for about 28 days to form the flexural hybrid span beam. The unfinished top surface of the first layer is substantially flat, and the second layer is cast completely above the unfinished top surface of the first layer.

The method further can include treating the first layer of UHPC with a trowel, and treating the second layer of plain concrete with the trowel.

In an example, the flexural hybrid span beam has a failure load of 34,000 newtons and a deflection at a flexural failure load of 1.28 mm.

EXAMPLES AND EXPERIMENTS

During experiments, a plurality flexural hybrid span beams (hybrid NC-UHPC beams or specimens) were manufactured and evaluated. Each of the plurality of flexural hybrid span beams has a different composition, and different dimension (width, length, and thickness). For example, four-point flexural load tests were conducted on 24 hybrid NC-UHPC beams. The four-point flexural test provides values for the modulus of elasticity in bending, flexural stress, flexural strain, and the flexural stress-strain response of the flexural hybrid span beam. During experiments, various parameters such as flexural strength, cracking, and failure modes of each flexural hybrid span beam were investigated with an objective of finding a defined form of hybrid beam or slab construction that could eliminate the need for conventional steel reinforcement, thereby providing high durability in corrosive environments.

Experimental Data and Analysis

First Experiment: Determining Materials to be Used in Construction of the Flexural Hybrid Span Beam and Defining a Layout of the Flexural Hybrid Span Beam The first stage of the experiment was determining materials to be used in construction of the flexural hybrid span beam and finalizing the design of the flexural hybrid span beam. Various materials were mixed to produce trial mixtures for preparing the flexural hybrid span beam. Each material has different mechanical properties, including compressive strength, strength, toughness, hardness, brittleness, malleability and ductility. During the experiments, the mechanical properties of the various materials were investigated for each of the trial mixtures. The object of the present disclosure is to provide the flexural hybrid span beam having a flexural strength of about 30 MPa. For example, the tested materials used for the first layer of UHPC include cement, micro silica, fine aggregate, steel fibers, ordinary portland cement (OPC) type 1, and superplasticizer. As per the American Society for Testing and Materials (ASTM) C150 (Cementitious, ceramic, concrete, and masonry materials), OPC Type I having a specific gravity of 3.15 was used.

FIG. 2 illustrates a graph 200 representing particle size distribution of the fine aggregate (FA) used in the flexural hybrid span beam, according to aspects of the present disclosure. In an example, the fine aggregate is the sand used in mortars. Coarse aggregate (CA) is the broken stone used in the concrete. The coarse aggregate, unless mixed with the fine aggregate, serves no purpose in cement works. Curve 202 represents particle size distribution of the fine aggregate used in the present disclosure. The specific gravity and specific surface area of micro silica (MS) used in the flexural hybrid span beam were 2.25 and 20,000 $cm^2$/g, respectively. The specific gravity and absorption values of the fine aggregate were 2.56 and 0.4%, respectively. Table 1 exhibits the physical properties and chemical characteristics of raw materials (OPC, MS, FA, and CA) used in the trial mixtures during the first stage.

TABLE 1

| Physical properties and chemical characteristics of OPC, MS, FA, and CA | | | | |
|---|---|---|---|---|
| Properties | OPC | MS | FA | CA |
| Physical properties | | | | |
| Bulk density ($kg/m^3$) | 3150 | 395 | 1540 | 1600 |
| Absorption (%) | — | — | 0.4 | 1.0 |
| Specific gravity | 3.15 | 2.25 | 2.53 | 2.67 |
| Specific area ($cm^2$/gm) | 3200 | 20,000 | — | — |
| Fineness modulus | — | — | 2.22 | 7.11 |
| Average particle size (μm) | 1.64 | 0.142 | 600 | 10-20 mm |
| Color | Grey | Light grey | — | — |
| Chemical compositions (%) | | | | |
| $SiO_2$ | 22 | 92.5 | — | — |
| $Al_2O_3$ | 5.64 | 0.72 | — | — |
| $Fe_2O_3$ | 3.8 | 0.96 | — | — |
| CaO | 64.35 | 0.48 | — | — |
| MgO | 2.11 | 1.78 | — | — |
| $SO_3$ | 2.1 | 0.15 | — | — |

TABLE 1-continued

| Physical properties and chemical characteristics of OPC, MS, FA, and CA | | | | |
|---|---|---|---|---|
| Properties | OPC | MS | FA | CA |
| $K_2O$ | 0.36 | 0.84 | — | — |
| $Na_2O$ | 0.19 | 0.5 | — | — |
| LOI | 0.7 | 1.55 | — | — |

Copper-coated steel fibers (straight steel-wire) were used in the flexural hybrid span beam. The length, diameter, aspect ratio, and volume fraction of the steel fibers were 13 mm, 0.2 mm, 65, and 2%, respectively. The steel fibers had a maximum tensile strength of 2500 MPa. Table 2 shows specifications of the micro-steel fiber. During experiments, a high-range water reducing agent (superplasticizer), Glenium 110M (manufactured by BASF SE, located at Ludwigshafen am Rhein, Carl-Bosch-Straße 38, Germany), was used. The superplasticizers are additives that are used for making high-strength concrete or for placing self-compacting concrete. The superplasticizer is a medium to dark brown colored liquid with a specific gravity of 1.065. The water to cement ratio was 0.15. The final mixture, molded in a shape of 2-inch cube, had a compressive strength of about 160 MPa and a flexural tensile strength of over 30 MPa. For example, the tested materials used for the second layer of the plain concrete include OPC, FA, CA with a specific gravity of 2.65 and 1% absorption capacity, and tap water. The water-to-cement ratio of 0.42 was used to achieve the compressive strength of about 40 MPa.

TABLE 2

| Specifications of the steel fiber | |
|---|---|
| Details | Copper-Coated Steel Fiber |
| Type | Straight |
| Length | 13 mm |
| Diameter | 0.2 mm |
| Aspect ratio (L/D) | 65 |
| Tensile strength | 2500 MPa |

Second Experiment: Preparing Various Test Specimens for Testing

The flexural hybrid span beam (hybrid NC-UHPC beam) was designed such that the beam was to fail in flexure, precluding shear failure. Shear failure occurs when the beam has shear resistance lower than flexural strength and a shear force exceeds a shear capacity of different materials of the beam. The flexural hybrid span beams (test specimens) did not have shear reinforcement. All test specimens were made with a consistent UHPC blend. During preparation of the test specimens, the casting technique, the mix design, and the casting method were kept identical.

Figure 3A:
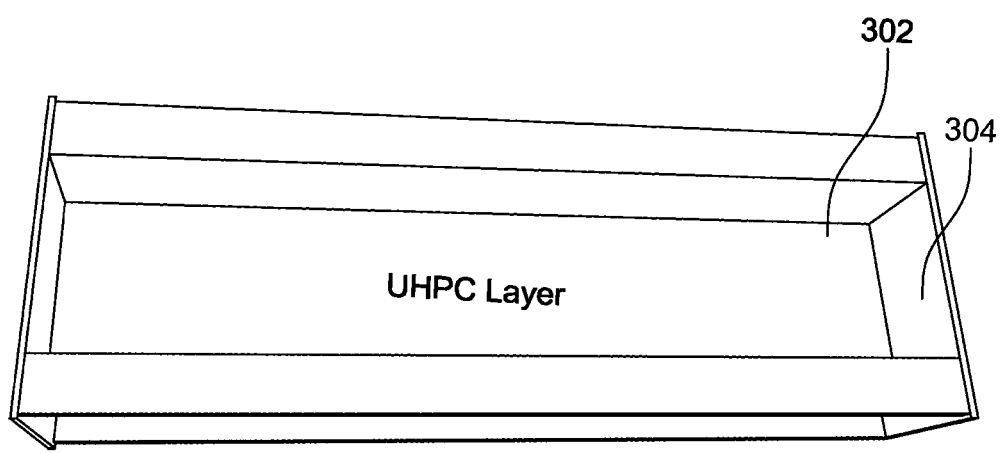
FIG. 3A illustrates casting a first layer of ultra-high performance concrete (UHPC) into a bottom of a mold, according to aspects of the present disclosure.

FIG. 3A illustrates casting a first layer 302 of UHPC (or a UHPC layer 302) into a bottom of a mold 304, according to aspects of the present disclosure. The casting of the UHPC layer 302 involves mixing the dry materials in a revolving mixing bowl and adding water and the superplasticizer. During the casting, steel fibers were also added to the UHPC layer 302. FIG. 3A illustrates the UHPC layer 302 prior to casting the NC (or plain concrete) layer. Table 3 shows the mixture proportions details of UHPC and NC used in the present disclosure.

TABLE 3

| | | | | | Steel | Superplas- | |
|---|---|---|---|---|---|---|---|
| Type | OPC | MS | FA | CA | Fibers | ticizer | Water |
| UHPC | 900 | 220 | 990 | — | 157 | 42 | 168 |
| NC | 400 | — | 729 | 1092 | — | — | 184 |

*Mixture proportions of UHPC and NC (kg/m³)*

Figure 3B:
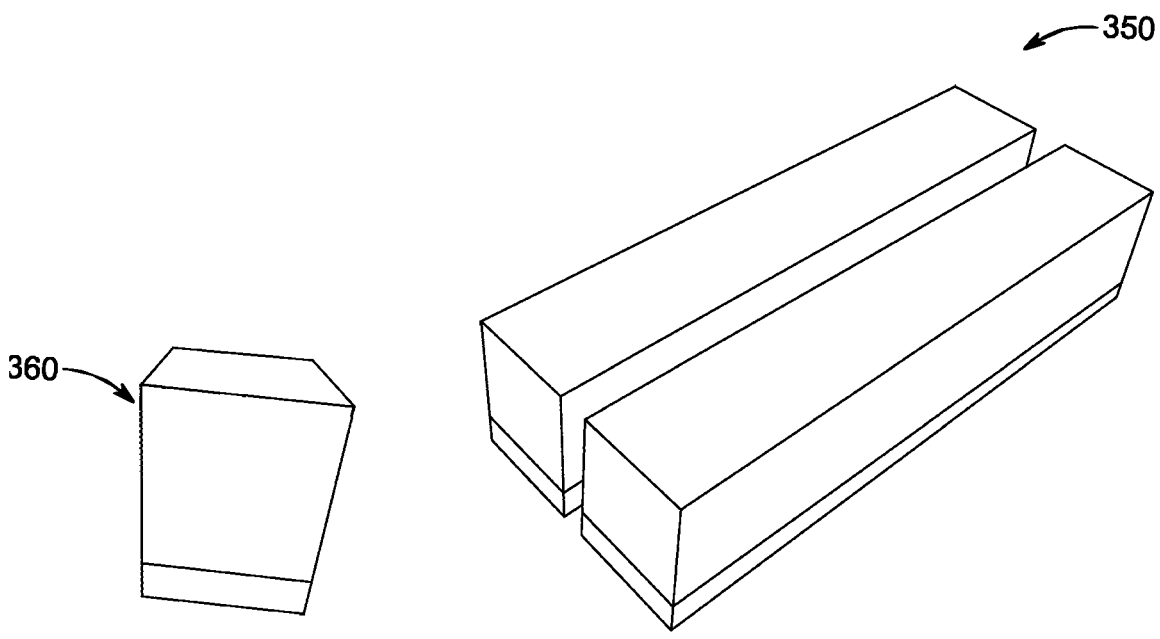
FIG. 3B illustrates a manufactured flexural hybrid span beam before testing, according to aspects of the present disclosure.

FIG. 3B illustrates the plurality of manufactured flexural hybrid span beams (hybrid NC-UHPC beams) 350 before testing, according to aspects of the present disclosure. Window 360 represents a side view of the manufactured flexural hybrid span beam. Each of the plurality of manufactured flexural hybrid span beams (known as specimens such as A20, A40, B20, B40, C25, C50, D25, D50) has different dimensions (length, breath, and height), and a different thickness of the UHPC layer. The details of each specimen are presented in table 4.

TABLE 4

Details of the various hybrid NC-UHPC beams

| | | | | | | | Shear span - depth |
| | | | | | Testing dimensions (mm) | | ratio |
| | Hybrid Beam Dimensions (mm) | | | UHPC thickness | | Shear Span, | (a/h |
| Specimens | b | h | L | (t) (mm) | Testing Span | (a) | ratio) |
|---|---|---|---|---|---|---|---|
| A20 | 150 | 150 | 760 | 20 | 630 | 240 | 1.6 |
| A40 | | | | 40 | | | |
| B20 | 150 | 150 | 1000 | 20 | 900 | 375 | 2.5 |
| B40 | | | | 40 | | | |
| C25 | 150 | 200 | 900 | 25 | 750 | 300 | 1.5 |
| C50 | | | | 50 | | | |
| D25 | 150 | 200 | 1200 | 25 | 1100 | 475 | 2.4 |
| D50 | | | | 50 | | | |

The specimens (A20, A40, B20, B40, C25, C50, D25, D50) were designed considering an influence of the UHPC thickness. In addition, four different testing spans were also considered. Beam span is the maximum length allowed for a beam to adequately support a specific weighted area. A total of 24 specimens were cast, in the four groups, with four different thicknesses of UHPC layers 20 mm, 40 mm, 25 mm, and 50 mm and different testing spans (630 mm, 750 mm, 900 mm, and 1100 mm) with two different cross-sections (150 mm×150 mm and 150 mm×200 mm). During the preparation of the specimens, a similar curing process was used, such that the bottom UHPC layer 302 was the first cast into the mold 304, leaving the top surface unfinished, and allowed to self-cure for 2 days before placing the vibrated NC layer (FIG. 3A). The top surface of all specimens were trowel-finished. Trowel finish is a technique of concrete finishing that involves the use of a flat-bladed tool to smooth and level the surface of freshly poured concrete. After the concrete is laid in the mold and leveled, the trowel was used to smooth and fine level the surface of the top surface.

FIG. 3B displays various hybrid beam specimens. All hybrid beam specimens had standard water curing for 28 days before testing.

Third Experiment: Evaluation of Mechanical Properties of UHPC and NC

During the third experiment, compressive strength tests were performed as per ASTM C109 standard for cubes and ASTM C39 standard for cylinders. UHPC concrete cubes were tested in a compression testing instrument with a capacity of 3000 kN after 2 days of heat curing at 90° C. The tensile properties of UHPC were determined using two tests related to the tensile strength: split tensile test and flexural test. In an example, 75 mm×150 mm prisms (specimens) were used in flexural testing to determine modulus of rupture, flexural toughness, and residual flexural strength (i.e., post-cracking flexural strength). Compression tests on cylinders of 75 mm×150 mm were performed by means of a hydraulic compression machine of 2000 kN capacity with strain gauges applied on the specimen connected to the data logger to capture the strain and load results. The compressive strength of normal concrete was evaluated on 75 mm×150 mm specimens as per ASTM C39 after 28 days of water curing. Split cylinder tension tests were conducted on concrete prism 75 mm×150 mm to evaluate the indirect tensile strength of UHPC specimens according to ASTM C496. The experiments were conducted using a compression testing machine of 2000 kN capacity.

Fourth Experiment: Testing Hybrid Beam Specimens

The hybrid NC-UHPC specimens were subjected to the four-point bending test under monotonically increasing load until failure using a testing machine.

Figure 4A:
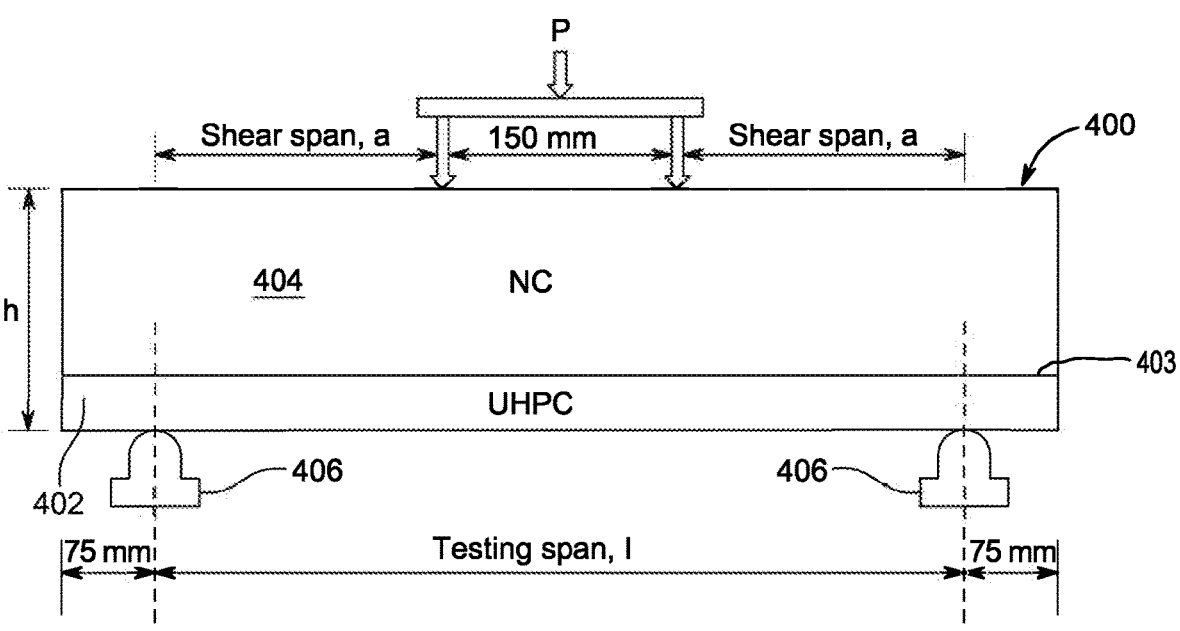
FIG. 4A is a schematic diagram for load testing of the manufactured flexural hybrid span beam, according to aspects of the present disclosure.

FIG. 4A is a schematic diagram for a load test of the manufactured flexural hybrid span beam 400, according to aspects of the present disclosure.

The load P is applied to the flexural hybrid span beam 400. The applied loads P are spaced at a fixed distance of 150 mm along the flexural hybrid span beam 400. The flexural hybrid span beam 400 includes the NC layer 404 and the UHPC layer 402. The flexural hybrid span beam 400 is placed over two stands 406. FIG. 4A has varying shear spans for all hybrid NC-UHPC beams, as shown in Table 4. The ratio of shear span/depth (a/h) of all hybrid beams was larger than 1.5 to ensure a flexure mode of failure.

Figure 4B:
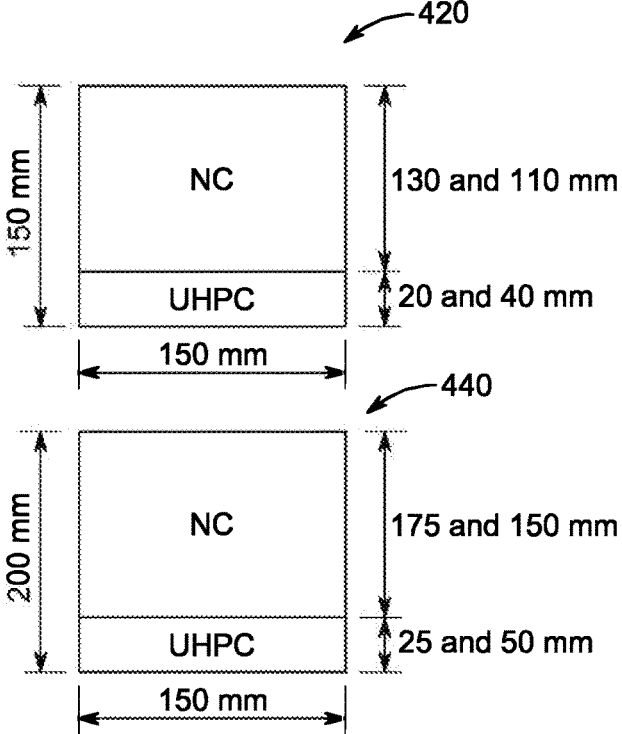
FIG. 4B illustrates a side view of the manufactured hybrid flexural beam, according to aspects of the present disclosure.

FIG. 4B illustrates a side view 420 of the manufactured hybrid flexural beam 400, according to aspects of the present disclosure. In an example, the manufactured hybrid flexural beam 400 has a thickness of 150 mm and a width of 150 mm. The thickness of the NC layer 404 is in a range of 110-130 mm, preferably 115-125 mm, preferably 117-123 mm. The thickness of the UHPC layer 402 is in a range of 20-40 mm, preferably 25-35 mm, preferably 27-33 mm. In another side view 440 of the manufactured hybrid flexural beam 400, the manufactured hybrid flexural beam 400 has a thickness of 200 mm and a width of 150 mm. The thickness of the NC layer 404 lies in a range of 150-175 mm, preferably 155-170 mm, preferably 160-165 mm. The thickness of the UHPC layer 402 is in a range of 25-50 mm, preferably 30-45 mm, preferably 35-40 mm.

As shown in FIGS. 3A, 3B, 4A and 4B, the NC layer 404 can be formed completely above the UHPC layer 402. An interface 403 between the UHPC layer 402 and the NC layer 404 is substantially flat and has a periphery conforming to a shape of the mold 304. This can be achieved by treating the unfinished top surface of the UHPC layer 402 with a trowel before forming the NC layer 404 thereon. Note that there is no steel bar: neither the UHPC layer 402 nor the NC layer 404 needs to be reinforced. In some embodiment, the flexural hybrid span beam 400 includes only the UHPC layer 402 and the NC layer 404.

Figure 4C:
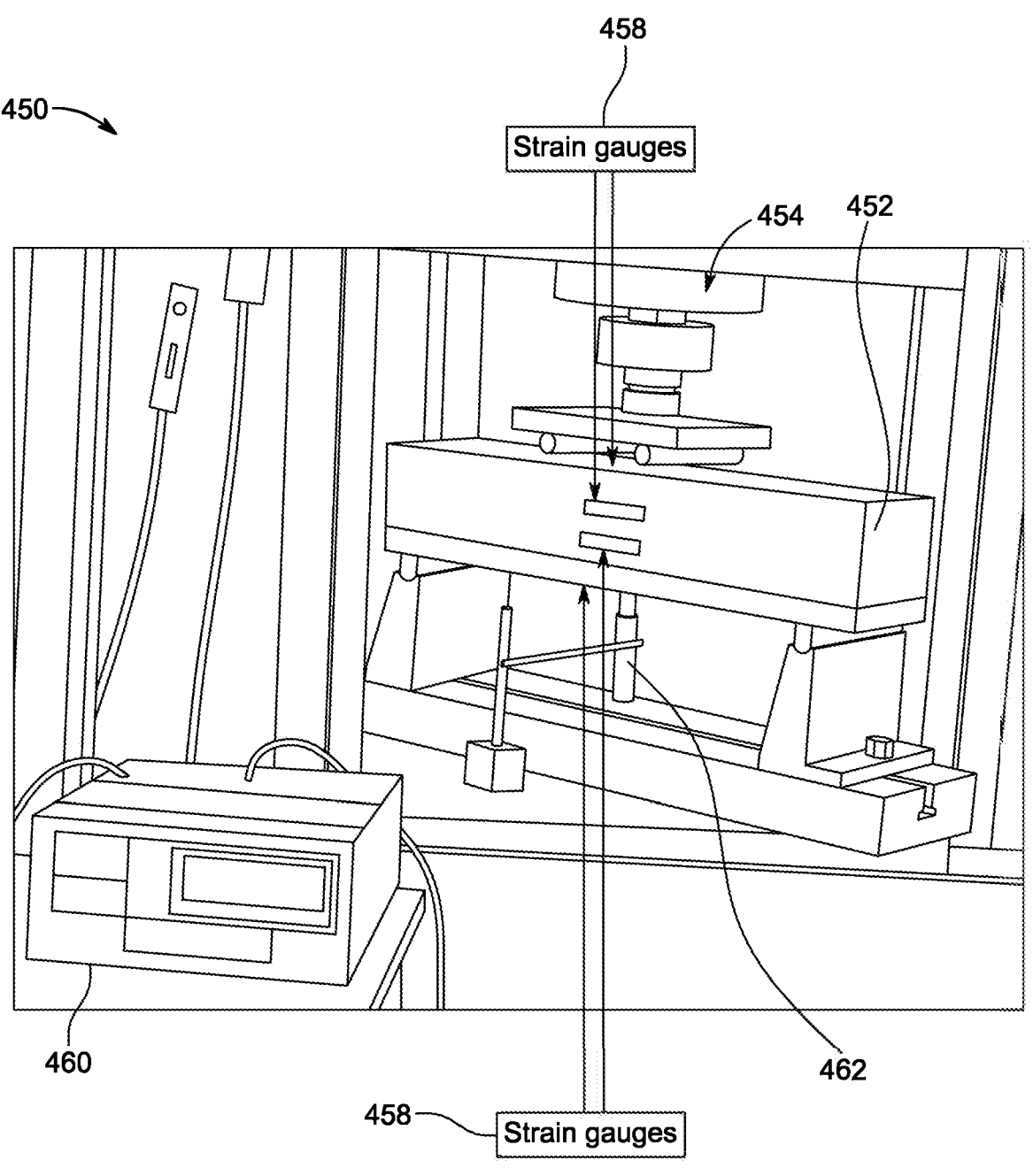
FIG. 4C illustrates a hybrid test set up for load testing of the manufactured flexural hybrid span beam under a testing machine, according to aspects of the present disclosure.

FIG. 4C illustrates a hybrid test setup 450 for load testing of the manufactured flexural hybrid span beam 452 under the testing machine 454. For example, the testing machine 454 is an Instron testing machine (manufactured by Instron® Mechanical Testing Systems, located at 825 University Ave, Norwood, MA 02062, USA).

A direct tension of the UHPC layer 402 was determined using dog bone-shaped specimens according to ASTM D638 using a universal testing machine of 400 kN capacity. The dog bone-shaped specimen has a shoulder at each end and a gauge section in between. The shoulders are wider than the gauge section which causes a stress concentration to occur in the middle when the sample is loaded with a tensile force. The direct tension test involves loading the specimen with a well-defined shape along the axis in tension, generally to fracture, and recording the resultant load and displacement to calculate several mechanical properties.

The hybrid test setup 450 includes four strain gauges 458, a data logger 460, and a linear variable differential transformer (LVDT) 462. In an example, four strain gauges 458 were positioned at four different locations, on a top surface, a bottom surface, one third or two thirds of the beam depth on the vertical side of the beam to observe the strain distribution across the depth. The specimens were instrumented using four strain gauges 458 connected to the data logger 460. The data logger 460 is configured to collect load and strain data. Load tests on the specimens were translation-controlled with 0.1 mm/min having a constant loading velocity. The two ends of the flexural hybrid 452 were fixed in the testing machine 454, and the geometry of the dog bone guaranteed that the cracks took place in the central zone. The arrangement of the hybrid test set up 450 was tested before starting the test to avoid any eccentricity. The average tensile strain of the two strain gauges 458 was obtained. A standard four-point flexural loading test as per ASTM C78 was used to evaluate the flexural performance of UHPC prism and NC prism. Flexural load tests were performed on 30 UHPC prisms with dimensions 40 mm×40 mm×160 mm after 48 hours of heat curing using the testing machine 454 with the constant loading velocity of 0.5 mm/min.

The LVDT 462 is configured to measure deflection in the flexural hybrid 452. For example, the LVDT 462 is fabricated by Tokyo Sokki Kenkyujo-Co., Ltd, located at 8-2, Minami-Ohi 6-chome, Shinagawa-ku, Tokyo 140-8560, Japan. The LVDT 462 is located at the bottom side of the flexural hybrid 452 in the central portion at mid-span as shown in FIG. 4C. In an example, TML PL-60-11-3LJCT-F concrete strain gauge (fabricated by Tokyo Sokki Kenkyujo-Co., Ltd, located at 8-2, Minami-Ohi 6-chome, Shinagawa-ku, Tokyo 140-8560, Japan) of 60 mm gauge length was used. All hybrid beam specimens were tested at the loading velocity of 0.5 mm/min. The deflection and strain values were recorded for every step of loading. The load-displacement path after the peak load was also recorded to observe softening behavior. The softening behavior reflects the ability of the material to resist crack propagation In addition to the measurement of the strain and deflection, crack propagation, as well as the mode failure of all specimens, were also observed.

Fifth Experiment: Compressive Strength of UHPC and NC

The average compressive strength of UHPC, obtained from three cylindrical specimens of 75 mm diameter×150 mm length, was about 160 MPa with an average axial compressive strain of 0.0038. The average compressive strength of three 50-mm-sized cubical specimens was 170 MPa with a standard deviation of 8 MPa.

Figure 5A:
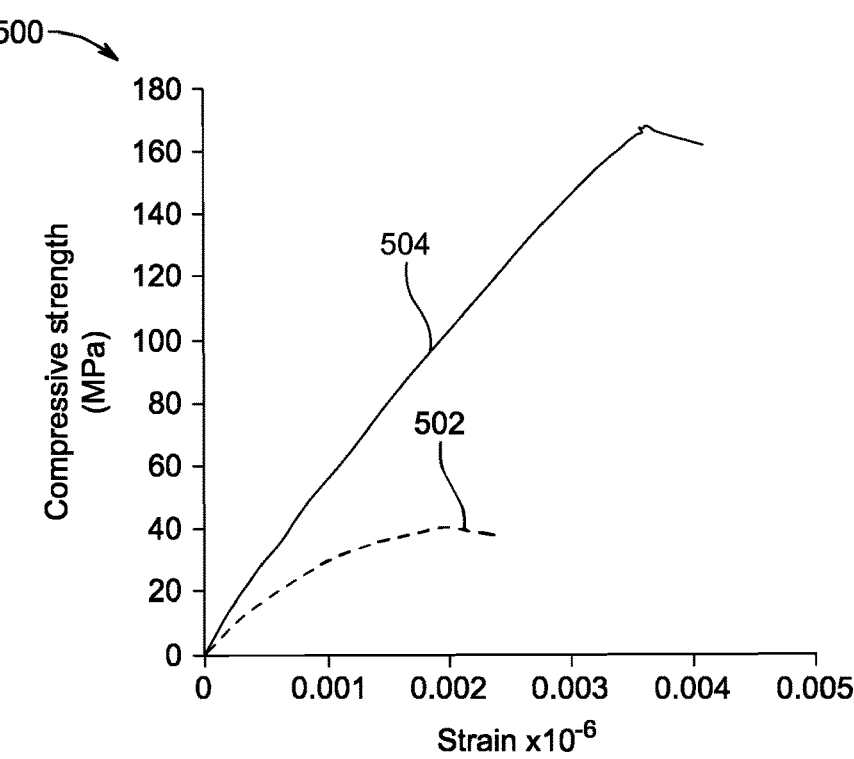
FIG. 5A illustrates a stress-strain graph for UHPC and normal concrete (NC) (or plain concrete) under compression, according to aspects of the present disclosure.

FIG. 5A illustrates a stress-strain graph 500 for UHPC and NC under compression. A stress-strain graph 500 was obtained from load test on cylinders. Curve 502 represents compressive strength of the NC layer 404. Curve 504 represents compressive strength of the UHPC layer 402. In an example, the strain values were recorded using two strain gauges. A linear response can be observed up to nearly 120 MPa (as shown in FIG. 5A). From the compression stress-strain curves, the modulus of elasticity of UHPC was computed to 55 GPa. The measured value of Poisson's ratio was found to be about 0.22. The NC specimens perform elastically until the peak load, followed by a fast softening, loss of strength, and a sudden collapse in an explosive mode. The average results of the compressive strength and elastic modulus of three specimens were 40 MPa and 30,000 MPa, respectively.

Sixth Experiment: Split and Direct Tensile Strength of UHPC

Figure 5B:
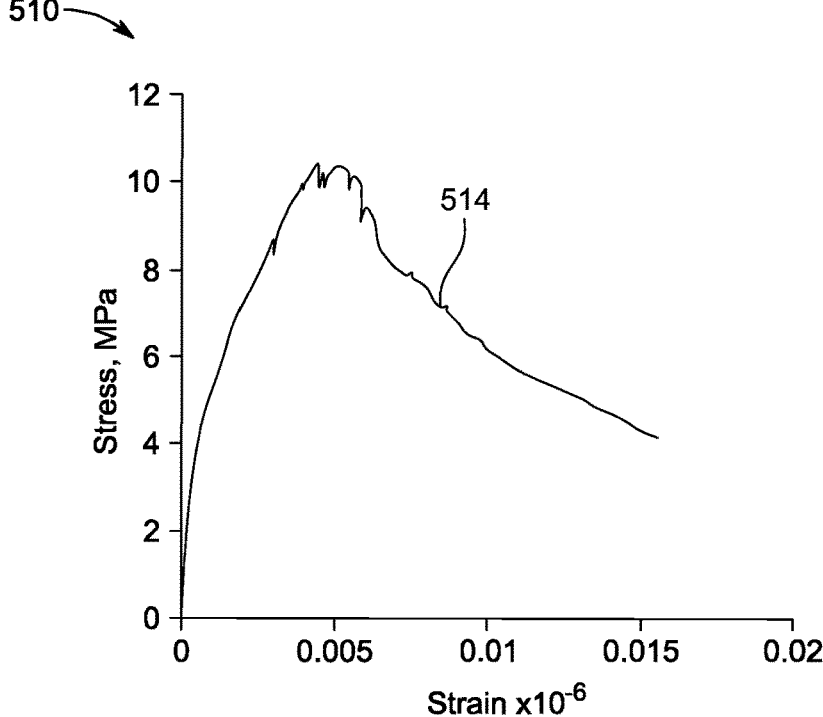
FIG. 5B illustrates a stress-strain graph for UHPC under direct tension, according to aspects of the present disclosure.

The indirect split tensile tests result for UHPC was measured to be 26 MPa with a standard deviation of ±1.33 MPa. This value of the split tensile is around five times higher as compared to the NC. The tensile strength values were measured as high as 30 MPa. The UHPC cylinders exhibit longitudinal cracking at failure without splitting in half due to the bridging influence of small size steel fibers, in addition to the dense micro-structure of UHPC. The average direct tensile strength of three UHPC specimens obtained on dog bone-shaped specimens was 10 MPa with a standard deviation of 1.0 MPa. FIG. 5B illustrates a stress-strain graph 510 for UHPC under direct tension. Curve 514 represents compressive strength of the UHPC under direct tension. The behavior of UHPC under direct tension is described by a nearly linear stress increase up to the initiation of the first crack, after that limited strain hardening until the maximum strength was achieved, followed by a softening portion until failure.

Seventh Experiment: Flexural Strength of UHPC

The UHPC prisms were tested for flexure under four-point loads after 48 hours of heat treatment at 90° C. in an oven. The average flexural strength of three specimens (samples) was about 27 MPa with a standard deviation of ±2 MPa.

Figure 6A:
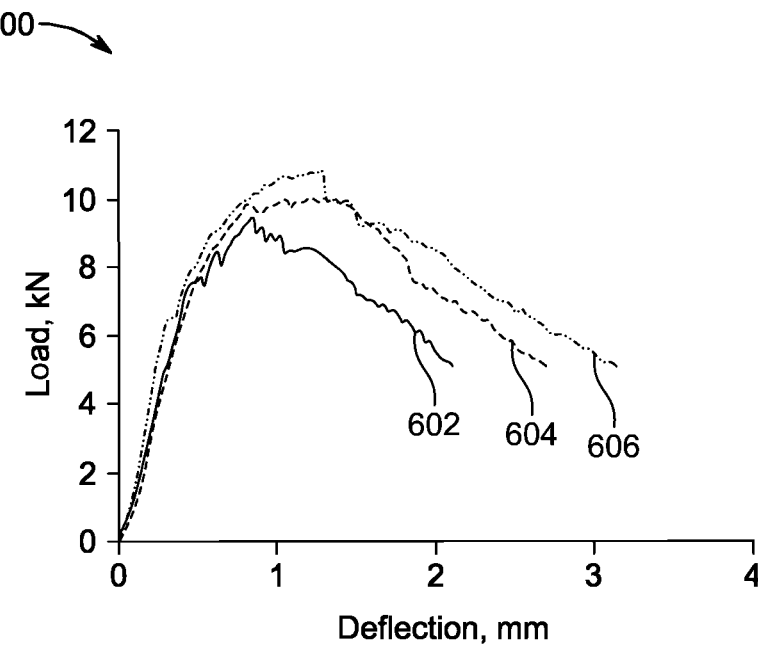
FIG. 6A illustrates a load-deflection graph for UHPC prisms under flexure, according to aspects of the present disclosure.

FIG. 6A illustrates a load-deflection graph 600 for UHPC prisms under flexure. FIG. 6A shows the load-deflection graph 600 of three identical samples. The flexural behavior of the UHPC samples is described by a linear elastic portion prior to cracking, followed by the presence of many fine cracks. A limited strain-hardening phase is observed until the maximum strength is reached and finally, a gradual softening mode is associated with the widening of the crack. Curve 602 represents the deflection of a sample 1 corresponding to the load. Curve 604 represents the deflection of a sample 2 corresponding to the load. Curve 606 represents the deflection of a sample 3 corresponding to the load.

Figure 6B:
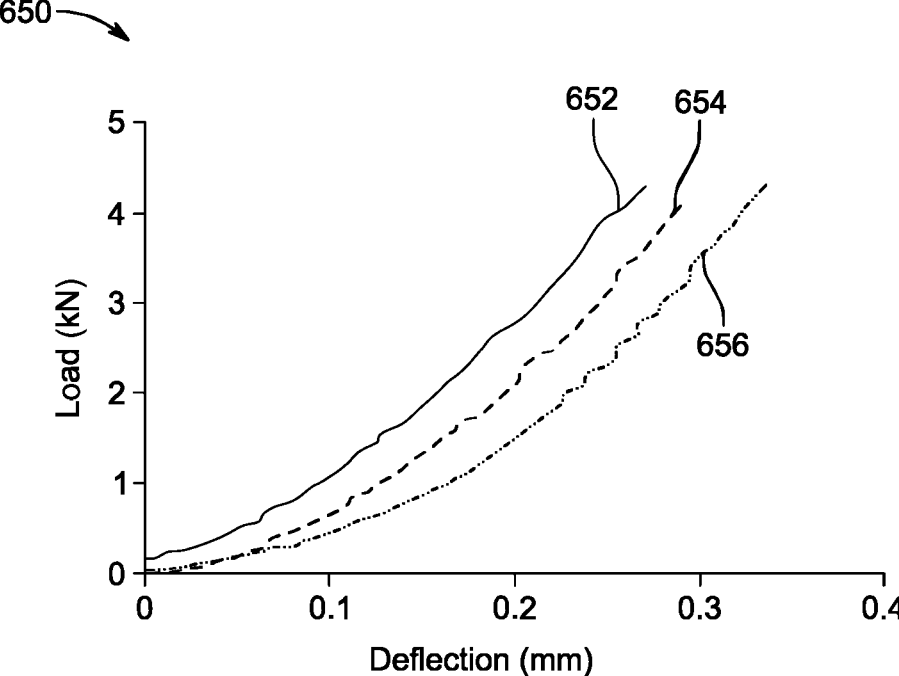
FIG. 6B illustrates a load-deflection graph for UHPC prisms without steel fibers, according to aspects of the present disclosure.

FIG. 6B illustrates a load-deflection graph 650 for UHPC prisms without steel fibers. Curve 652 represents the deflection of a sample 1, without steel fibers, corresponding to the load. Curve 654 represents the deflection of a sample 2, without steel fibers, corresponding to the load. Curve 656 represents the deflection of a sample 3, without steel fibers, corresponding to the load.

The orientation and distribution of fibers in UHPC significantly influence mechanical performance. This effect must be reflected in structural uses where the difference in steel fiber distribution in bigger sections can lead to a significant variation in the mechanical behavior of concrete. The casting direction of fresh UHPC is predicted to affect the orientation of the steel fiber. When workability is excessively high, or there is more vibration on the specimens during casting, the steel fibers may also settle down, leading to disturbed orientation and dispersion of the steel fibers. Fiber orientation has a very large effect on the flexural strength of the tested prisms. The aspect ratio of the steel fibers also plays an important role in flexural performance. It is well known that the size influence is not revealed in the flexural test specimens since all prisms had the same size and length. The flexural tensile strength of UHPC varies significantly. The flexural tensile strength is significantly low for larger sizes.

In order to determine the flexural capacity of the cementitious matrix without steel fibers, three small prisms were made of UHPC with no steel fibers in the mix and examined in the four-point bending test procedure according to ASTM. The load-deflection diagram of three identical specimens tested under flexural loading with no steel fibers is shown in FIG. 6B. As expected, the flexural behavior was very brittle without any ductility. The average flexural strength of 13 MPa was obtained, which is about 50% of the strength of UHPC specimens with steel fibers. All three specimens exhibited sudden failure, lacking any softening mode after peak load. The average results of all tests conducted on UHPC and NC are listed in table 5.

TABLE 5

Test results of UHPC and NC used in the hybrid beams

| Test | | Specimens Size | Results (Average of 3 Specimens) (MPa) |
|---|---|---|---|
| UHPC | Compressive strength | 50 mm cube | 172 |
| | Compressive strength | 75 mm dia. × 150 mm length (cylinder) | 160 |
| | Elastic Modulus | 75 mm dia. × 150 mm length (cylinder) | 55,000 |
| | Direct tensile strength | Dog-Bone Test Specimen (ASTM D638) | 10 |
| | Flexural strength | 40 mm × 40 mm × 160 mm (prism) | 27 |
| | Flexural strength (No fibers) | 40 mm × 40 mm × 160 mm (prism) | 13 |
| | Splitting tensile strength | 75 mm dia. × 150 mm length (cylinder) | 15 |

TABLE 5-continued

Test results of UHPC and NC used in the hybrid beams

| Test | | Specimens Size | Results (Average of 3 Specimens) (MPa) |
|---|---|---|---|
| NC | Compressive strength | 100 mm cube | 45 |
| | Compressive strength | 75 mm dia. × 150 mm length (cylinder) | 40 |
| | Elastic Modulus | 75 mm dia. × 150 mm length (cylinder) | 30,000 |

Eighth Experiment: Flexural Load Test Results of the Hybrid NC-UHPC Beams

Figure 7:
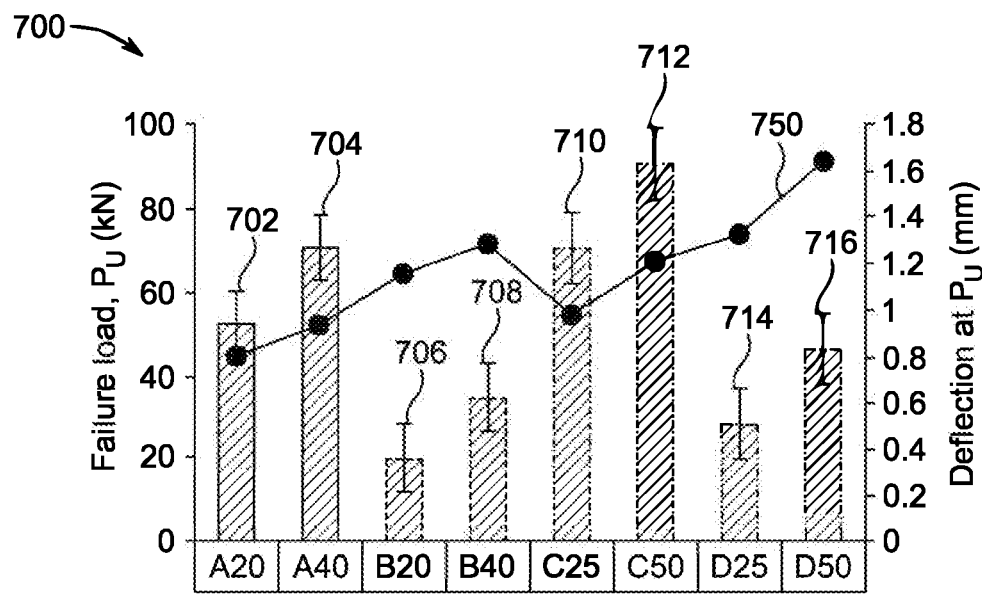
FIG. 7 is a graph illustrating average failure load and deflection of various flexural hybrid specimens, according to aspects of the present disclosure.

Flexural load tests were conducted on the hybrid NC-UHPC beams with four different spans (group A to group D) ranging from 630 mm to 1100 mm, and each span having two different UHPC thicknesses. Group A and group B have a thickness of 20 mm and 40 mm. Group A and group B have thicknesses of 25 mm and 50 mm. The details of spans, failure load, and moment capacity of three identical specimens are shown in table 6. The average results of three specimens for maximum flexural failure load, $P_U$, and the corresponding deflection recorded at mid-span for all hybrid beam specimens are shown in FIG. 7.

TABLE 6

Hybrid beams spans, failure load, and moment capacity

| Specimens | Testing Span mm | Shear Span (a) (mm) | Shear Span/Total Depth (a/h) | Shear Span/UHPC Thickness (a/t) | Average Experimental Cracking Load (kN) | Average Failure Load (kN) | Average Moment Capacity (kN · m) |
|---|---|---|---|---|---|---|---|
| A20 | 630 | 240 | 1.6 | 12 | 45 | 52 | 6.24 |
| A40 | | | | 6 | | 51 | 70 | 8.4 |
| B20 | 900 | 375 | 2.5 | 18.8 | 20 | 20 | 3.8 |
| B40 | | | | 9.4 | 31 | 34 | 6.4 |
| C25 | 750 | 300 | 1.5 | 12 | 64 | 70 | 10.5 |
| C50 | | | | 6 | 70 | 90 | 13.5 |
| D25 | 1100 | 475 | 2.4 | 19 | 28 | 28 | 6.7 |
| D50 | | | | 9.5 | 38 | 46 | 10.9 |

FIG. 7 is a graph 700 illustrating average failure load and deflection at failure load of various flexural hybrid span beams. Bar 702 represents failure load of A20 specimen. As shown in FIG. 7, failure load for A20 specimen is 52 kN. Bar 704 represents failure load of A40 specimen. The failure load for A40 specimen is 70 kN. Bar 706 represents failure load of B20 specimen. As shown in FIG. 7, failure load for B20 specimen is 20 kN. Bar 708 represents failure load of B40 specimen. The failure load for B40 specimen is 34 kN. Bar 710 represents failure load of C25 specimen. As shown in FIG. 7, failure load for C25 specimen is 70 kN. Bar 712 represents failure load of C50 specimen. The failure load for C50 specimen is 90 kN. Bar 714 represents failure load of D25 specimen. As shown in FIG. 7, failure load for D25 specimen is 28 kN. Bar 716 represents failure load of D50 specimen. The failure load for D50 specimen is 46 kN.

Curve 750 represents deflection at the failure load of various flexural hybrid span beams. As shown in FIG. 7, A20 specimen has a deflection of 0.8 mm. A40 specimen has a deflection of 0.93 mm. B20 specimen has a deflection of 1.15 mm. B40 specimen has a deflection of 1.28 mm. C25 has a deflection of 0.98 mm. C50 specimen has a deflection of 1.21 mm. D25 specimen has a deflection of 1.32 mm. D50 specimen has a deflection of 1.64 mm.

As observed from FIG. 7 that for each of the four (4) spans, the failure load increases when the thickness of the UHPC layer is doubled. For spans of 630 mm and 750 mm, the failure load increases by 34.6% and 28.6%, respectively, when the thickness is doubled. For longer spans of 900 mm and 1100 mm, the failure load increases by 70% and 64.2%, respectively, as the thickness is doubled. The failure load decreases by 61.5% for specimens A20 and B20, as the spans increase from 630 mm to 900 mm, whereas for the 40 mm thick UHPC layer, the failure load decreases by 51.4%. For 25 mm and 50 mm thick UHPC layers, the reductions are 60% and 49%, respectively, as the span increases from 750 mm to 1100 mm. It can be observed from FIG. 7 that the deflection increases by 16.3% and 11.3% for 630 mm and 900 mm spans as the thickness are doubled, whereas it increases by 23.5% and 24.2% for 750 mm and 1100 mm spans as the thickness is increased from 25 mm to 50 mm. For the same shear span (a) to UHPC thickness (t) ratio of $a/t=12$ (specimens A20, C25), the moment capacity increases by 68%, showing that an increase in UHPC thickness by 5 mm results in a significant increase in the flexural capacity. For $a/t=6$ (specimens A40, C50), the increase in the capacity is about 60.7%. Similarly, for $a/t=9.5$ (B40, D50) and $a/t=19$ (B20, C25), the moment capacity increases by 43.6% and 41.6%, respectively. With respect to the ratio of shear span and total depth (a/h) of the hybrid beam, the moment capacity increases significantly as the UHPC layer thickness is doubled. For example, for $a/h=1.6$, the capacity increases by 34.6%, whereas, for $a/h=2.5$, it increases by 70% as the thickness of UHPC is increased from 20 mm to 40 mm. When the total depth of the composite beam is increased from 150 mm to 200 mm, and the UHPC thickness of 25 mm is doubled, the moment capacity increases by 28.6% and 64.2% for a/h of 1.5 and 2.4, respectively.

Ninth Experiment: Mode of Failure of the Hybrid NC-UHPC Beams

The failure modes of the eight hybrid NC-UHPC beams (group A to group D) of varying thicknesses, along with their load-deflection responses, are shown in FIG. 8A-FIG. 8H.

Figure 8A:
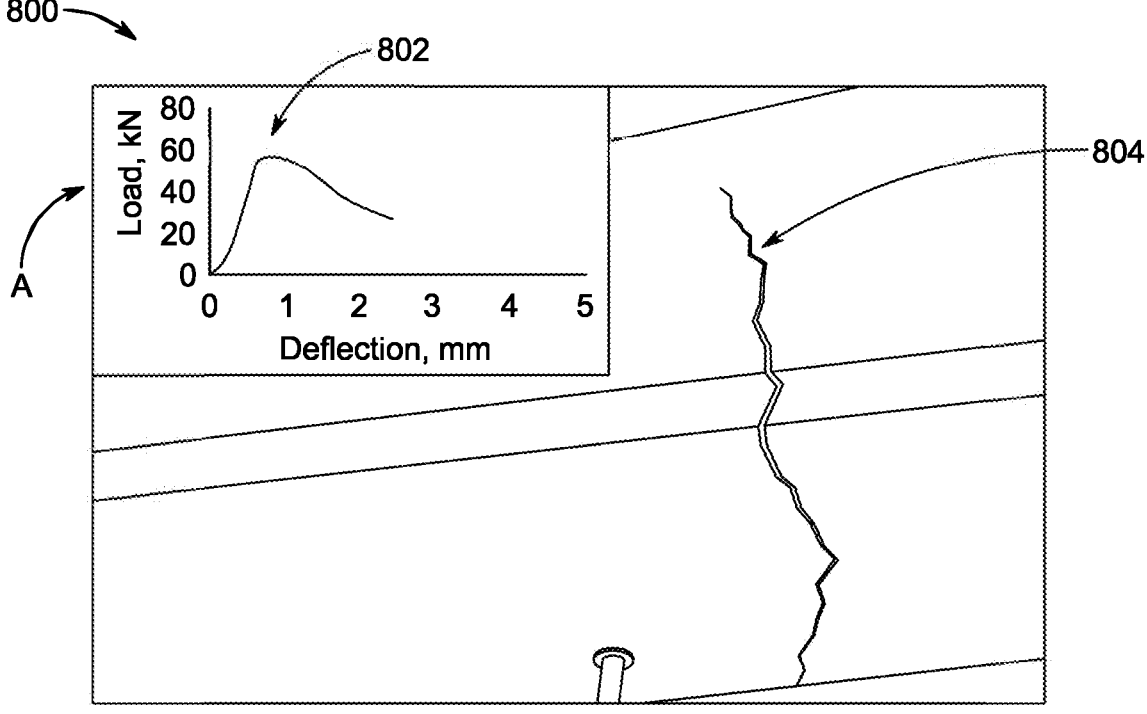
FIG. 8A is a graph illustrating cracking and load-deflection response of A20 specimen of the flexural hybrid span beam, according to aspects of the present disclosure.

FIG. 8A is a graph 800 illustrating cracking and load-deflection response of A20 specimen of the flexural hybrid span beam. Window "A" shows the load-deflection response of A20 specimen. Curve 802 represents the deflection of A20 specimen. Line 804 indicates crack occurred in A20 specimen.

Figure 8B:
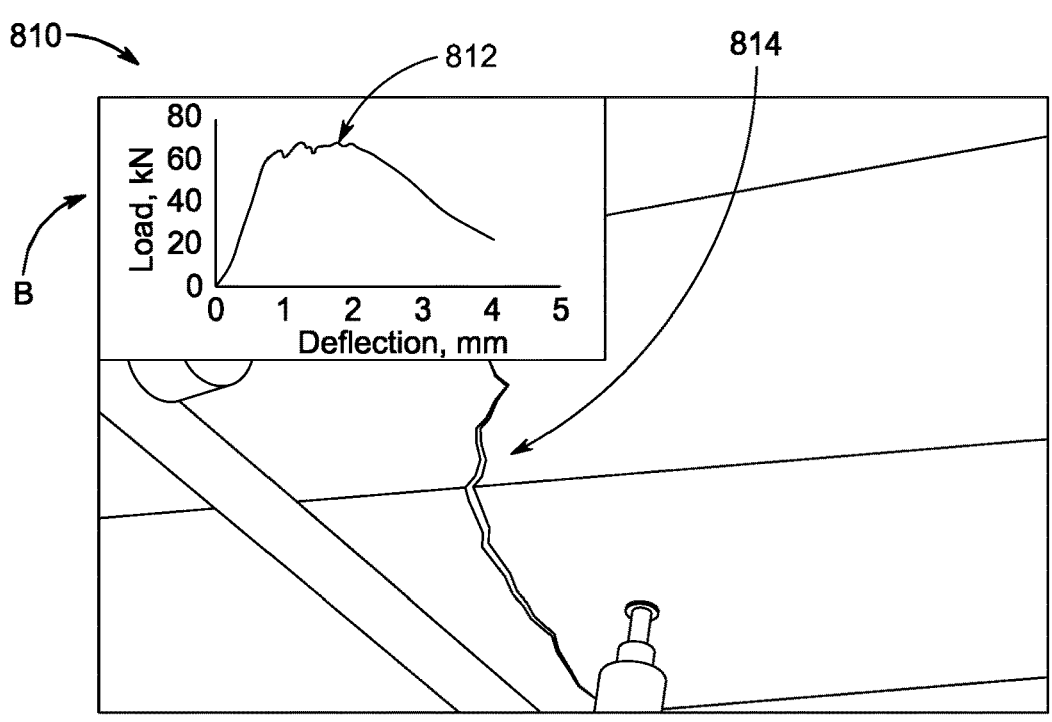
FIG. 8B is a graph illustrating cracking and load-deflection response of A40 specimen of the flexural hybrid span beam, according to aspects of the present disclosure.

FIG. 8B is a graph 810 illustrating cracking and load-deflection response of A40 specimen of the flexural hybrid span beam. Window "B" shows the load-deflection response of A40 specimen. Curve 812 represents the deflection of A40 specimen. Line 814 indicates crack occurred in A40 specimen.

Figure 8C:
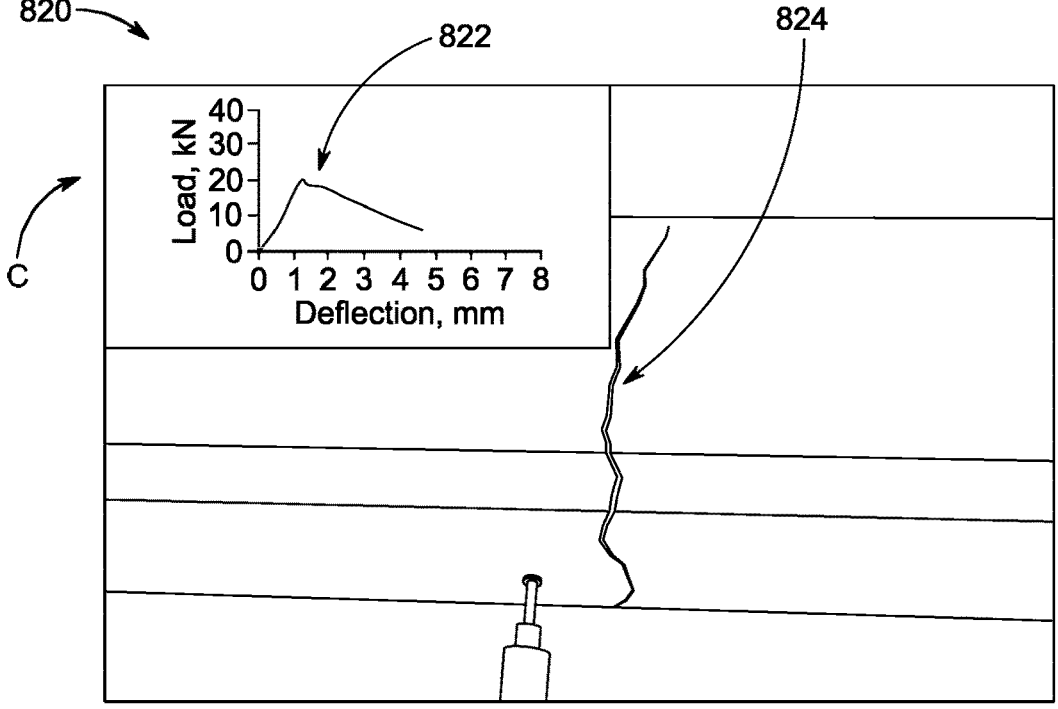
FIG. 8C is a graph illustrating cracking and load-deflection response of B20 specimen of the flexural hybrid span beam, according to aspects of the present disclosure.

FIG. 8C is a graph 820 illustrating cracking and load-deflection response of B20 specimen of the flexural hybrid span beam. Window "C" shows the load-deflection response of B20 specimen. Curve 822 represents the deflection of B20 specimen. Line 824 indicates crack occurred in B20 specimen.

Figure 8D:
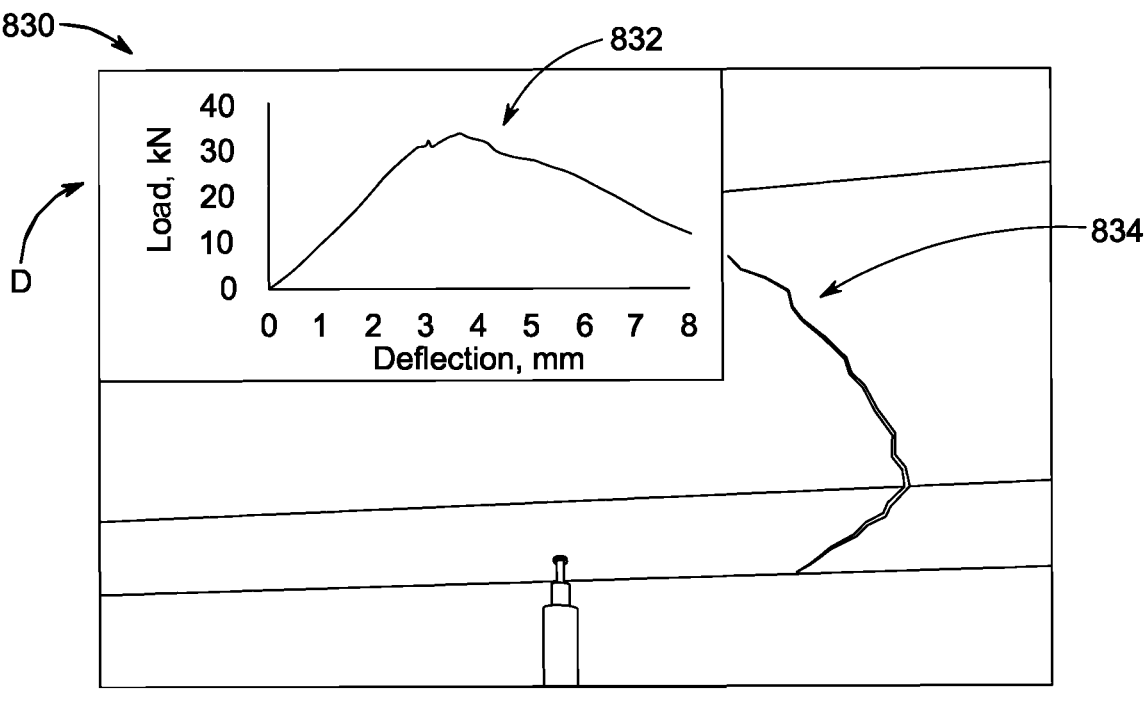
FIG. 8D is a graph illustrating cracking and load-deflection response of B40 specimen of the flexural hybrid span beam, according to aspects of the present disclosure.

FIG. 8D is a graph 830 illustrating cracking and load-deflection response of B40 specimen of the flexural hybrid span beam. Window "D" shows the load-deflection response of B40 specimen. Curve 832 represents the deflection of B40 specimen. Line 834 indicates crack occurred in B40 specimen.

Figure 8E:
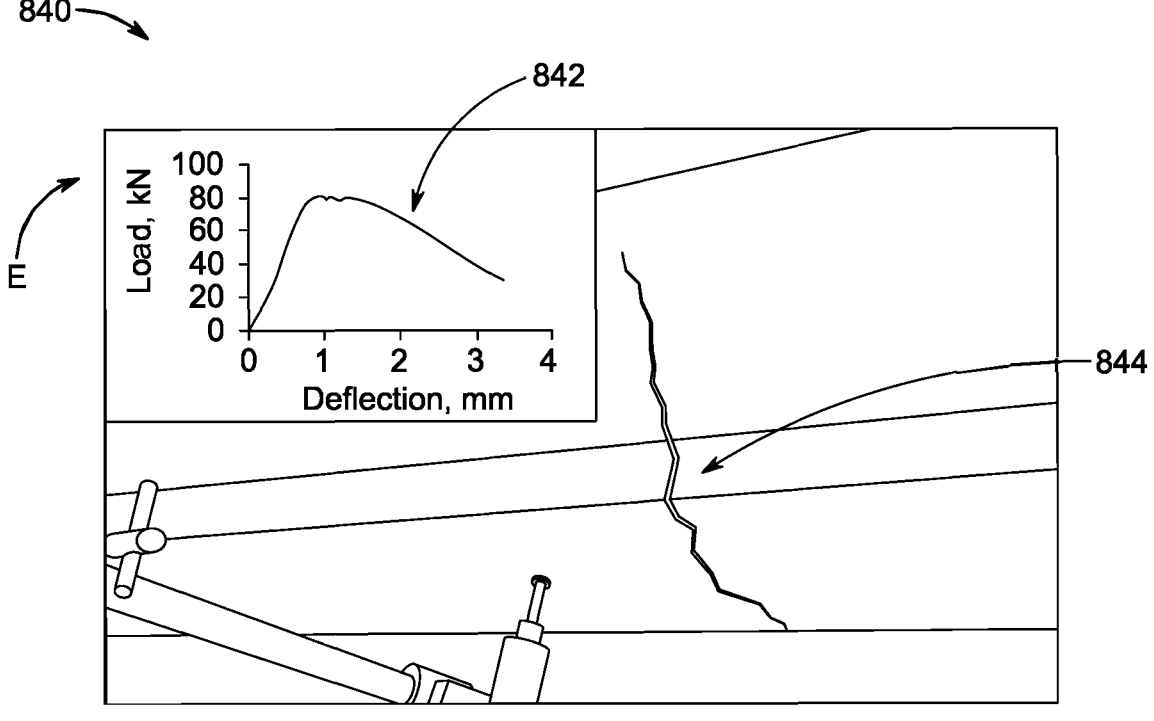
FIG. 8E is a graph illustrating cracking and load-deflection response of C25 specimen of the flexural hybrid span beam, according to aspects of the present disclosure.

FIG. 8E is a graph 840 illustrating cracking and load-deflection response of C25 specimen of the flexural hybrid span beam. Window "E" shows the load-deflection response of C25 specimen. Curve 842 represents the deflection of C25 specimen. Line 844 indicates crack occurred in C25 specimen.

Figure 8F:
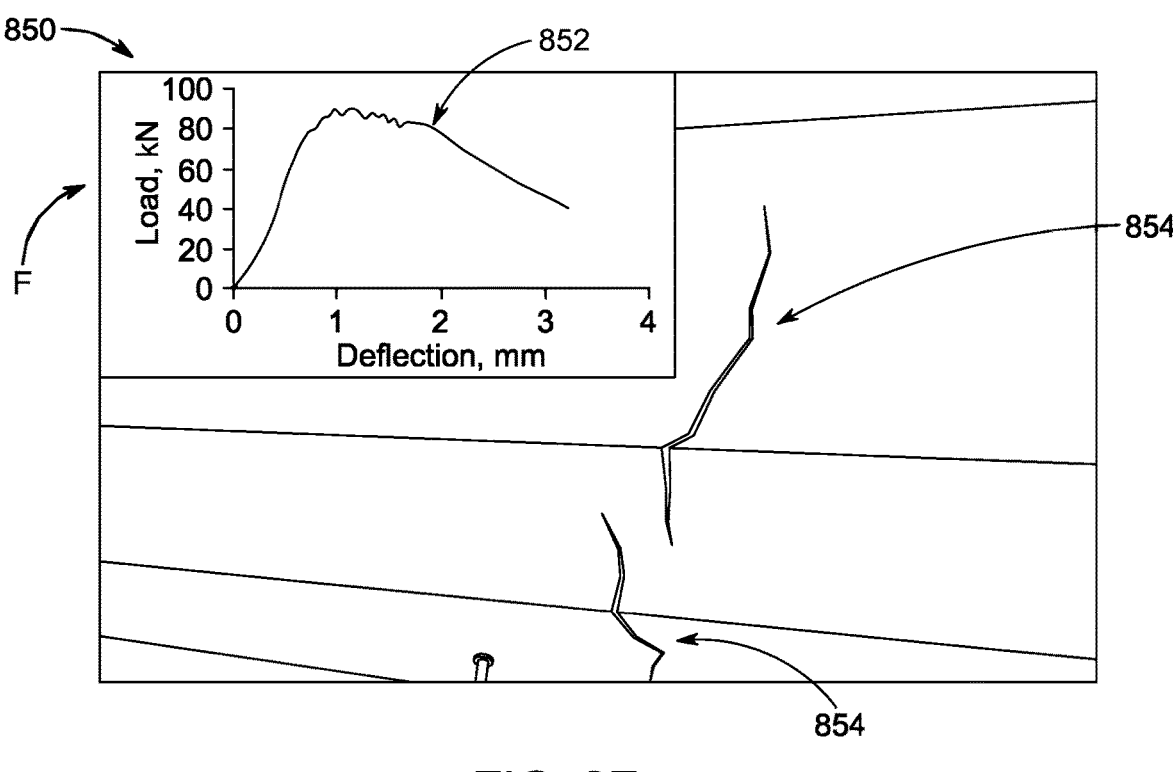
FIG. 8F is a graph illustrating cracking and load-deflection response of C50 specimen of the flexural hybrid span beam, according to aspects of the present disclosure.

FIG. 8F is a graph 850 illustrating cracking and load-deflection response of C50 specimen of the flexural hybrid span beam. Window "F" shows the load-deflection response of C50 specimen. Curve 852 represents the deflection of C50 specimen. Line 854 indicates crack occurred in C50 specimen.

Figure 8G:
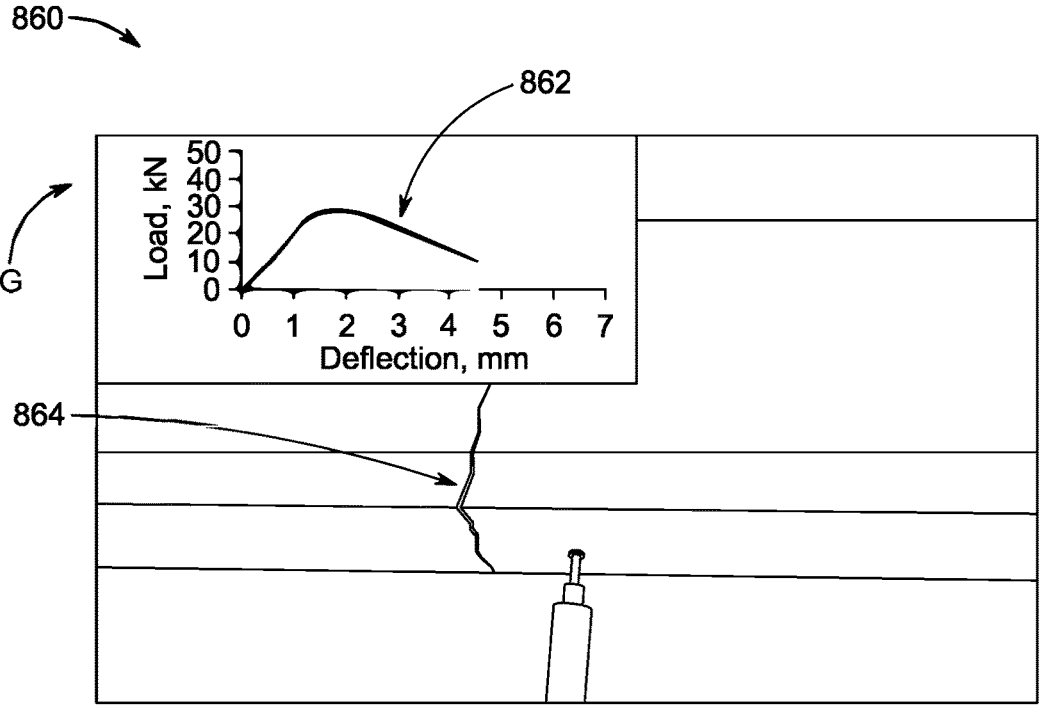
FIG. 8G is a graph illustrating cracking and load-deflection response of D25 specimen of the flexural hybrid span beam, according to aspects of the present disclosure.

FIG. 8G is a graph 860 illustrating cracking and load-deflection response of D25 specimen of the flexural hybrid span beam. Window "G" shows the load-deflection response of D25 specimen. Curve 862 represents the deflection of D25 specimen. Line 864 indicates crack occurred in the D25 specimen.

Figure 8H:
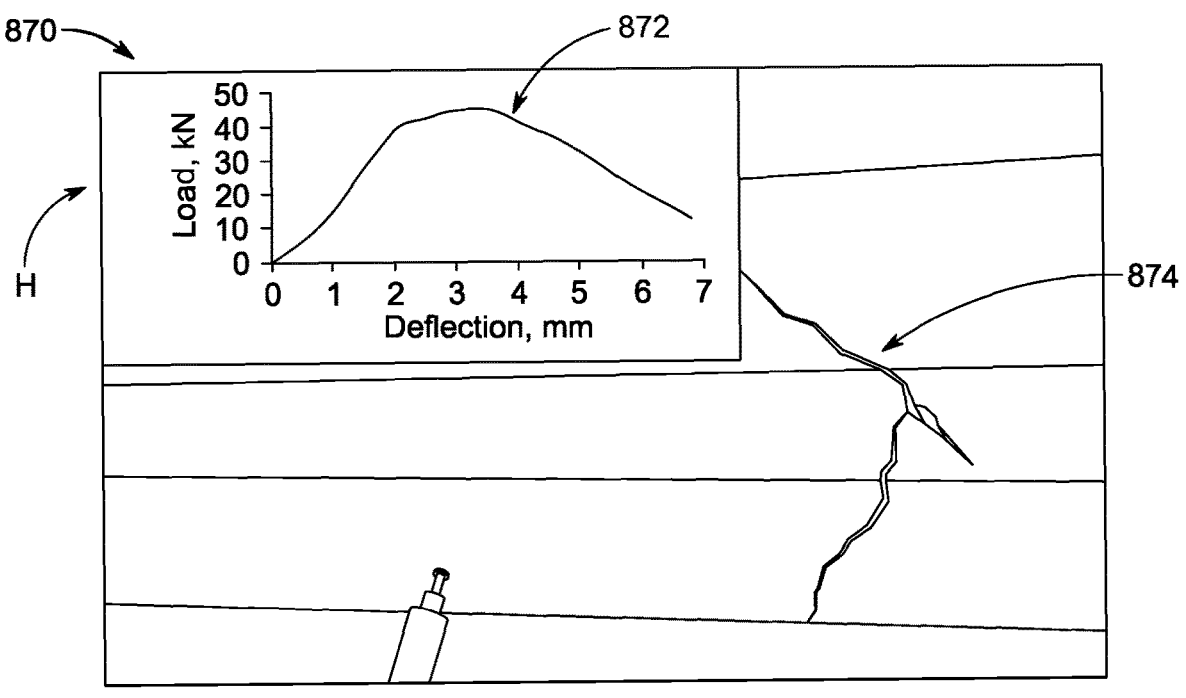
FIG. 8H is a graph illustrating cracking and load-deflection response of D50 specimen of the flexural hybrid span beam, according to aspects of the present disclosure.

FIG. 8H is a graph 870 illustrating cracking and load-deflection response of D50 specimen of the flexural hybrid span beam. Window "H" shows the load-deflection response of D50 specimen. Curve 872 represents the deflection of D50 specimen. Line 874 indicates crack occurred in D50 specimen.

The failure is characterized by a single vertical crack traversing across the UHPC layer into the NC layer, reaching almost to the top of the beam. In some specimens, several fine cracks appear before a single wide crack takes control. Cracks in all specimens extend across the width of the beam. The cracks in all specimens are formed either between the loading points or adjacent to the loads a little distance outside. FIG. 8A and FIG. 8B show the failure mode of specimens A20 and A40 of 630 mm span. The cracks commencing from the bottom of the beams propagate vertically across the NC-UHPC interface into the NC layer extending to the top of the beam. The width of the crack for A40 specimen with a thicker UHPC layer is wider as compared to A20 specimens. A significantly higher energy dissipation can be observed in A40 specimen. The load-deflection curve shows a strain-hardening portion significantly greater than A20 specimen. The influence of steel fibers on the bridging mechanism and uncracked portion of the UHPC layer is evident, which offers post-cracking ductility to the beam. The effect of the a/t ratio on the failure mode can be seen with A20 ($a/t=12$), showing lower ductility and energy dissipation. The failure mode of the B20 specimen ($a/t=18.8$) and B40 ($a/t=9.4$) are shown in FIG. 8C and FIG. 8D. The failure is again characterized by a single, wide crack formed within the load (B20 specimen) and outside the load point for the B40 specimen. Failure is characterized by a significantly lower strain-hardening region compared to A-type specimens. The uncracked portion within the load point provides higher energy dissipation in B40 as compared to B20 specimen.

The failure mode of the hybrid beam in group C with 25 mm and 50 mm thick UHPC layer is shown in FIG. 8E and FIG. 8F. In 50 mm thick C50 specimen, several hairline cracks are developed at the bottom side, extending only in the UHPC layer between and outside the loading points when the applied load is close to the failure load $P_U$. A small hardening portion during which the cracks grow wider, moving upward into the NC layer, can be observed in the specimen. At peak load, a straight upward single vertical crack develops outside the left loading point, which extends well into the NC layer. This is followed by a moderate softening behavior up to failure, with crack width increasing as the bridging effect of steel fiber vanishes. In contrast, for 25 mm thick UHPC layer C25 specimen, the flexural mode of failure illustrates the development of a single crack between the loading points at peak loading. The crack width increases over a small strain-hardening region, after which the softening ensues as the load decreases with increasing crack width. The crack extends across the NC-UHPC interface deep into the NC layer over the width of the beam.

In the specimens of group D, with a/t ratio of 19 (D25) and 9.5 (D50) and a beam span of 1100 mm, the flexural failure mode is almost identical to the group C specimen (FIG. 8G and FIG. 8H), with lower failure loads. A single vertical crack within the loading point (D25) and outside the right loading point (D50) extending across the width is observed. For all specimens tested, the UHPC layer imparts significant ductility to the hybrid NC-UHPC beam and functions as a reinforcement in the normal beam. A well-developed softening curve can be seen after the ultimate load with the steel fibers bridging the crack, imparting resistance to crack development. Once the steel fibers at the bottom of the UHPC layer are pulled out as the crack width increases, the steel fiber in the upper layer swings into action, resisting the load. The failure was seen to occur once the steel fibers lost their resistance capacity.

Figure 9:
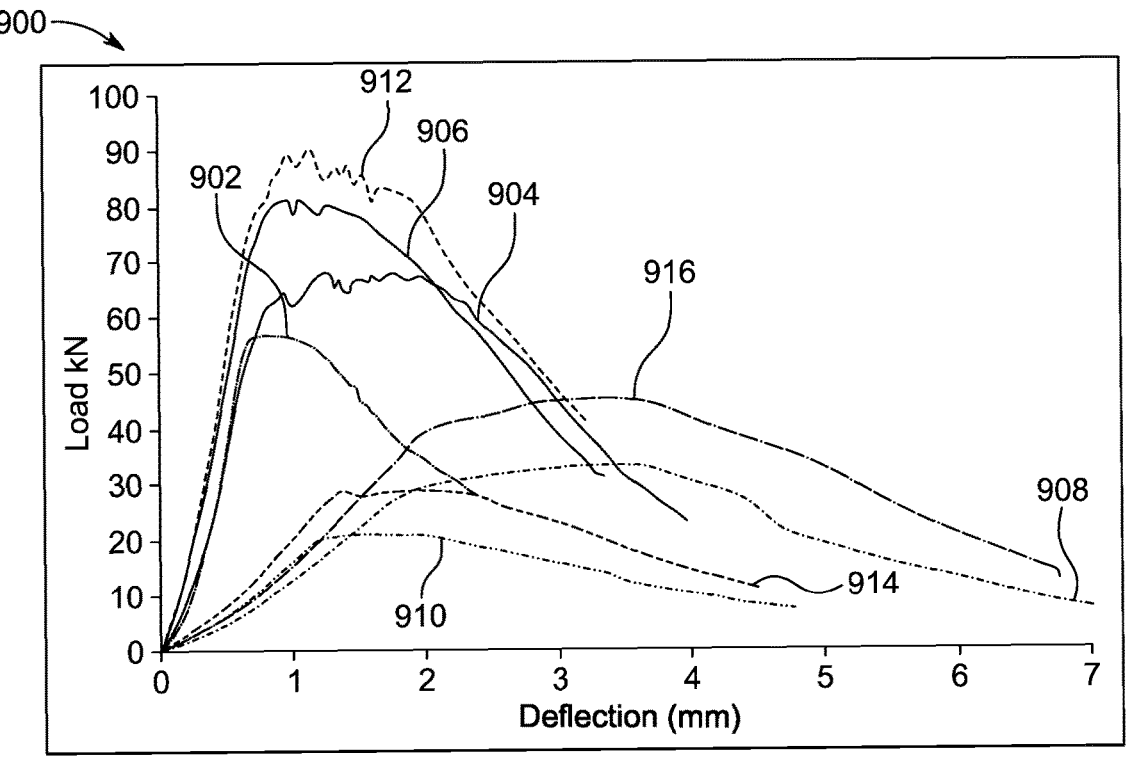
FIG. 9 is a graph illustrating load-deflection curves for various specimens of the flexural hybrid span beam under flexural loading, according to aspects of the present disclosure.

FIG. 9 is a graph 900 illustrating load-deflection curves for various specimens of the flexural hybrid span beam under flexural loading. FIG. 9 shows a combined load-displacement response of all eight-hybrid beams with two different depths, 150 mm and 200 mm, and four different thicknesses of UHPC layers. Curve 902 represents the deflection of A20 specimen corresponding to the load. Curve 904 represents the deflection of A40 specimen corresponding to the load. Curve 906 represents the deflection of B20 specimen corresponding to the load. Curve 908 represents the deflection of B40 specimen corresponding to the load. Curve 910 represents the deflection of C25 specimen corresponding to the load. Curve 912 represents the deflection of C50 specimen corresponding to the load. Curve 914 represents the deflection of D25 specimen corresponding to the load. Curve 916 represents the deflection of D50 specimen corresponding to the load.

As shown in FIG. 9, the moment capacity increases as the a/h ratio of the beam decreases. The effect of doubling the thickness of the UHPC layer in enhancing the moment capacity increases significantly from 28.6% for a/h=1.5 to 70% for a/h=2.4. The thickness of the UHPC layer enhances the ductility of the hybrid beams. When the thickness of the UHPC layer increases from 25 mm to 50 mm for groups C and D. Group D specimens with a/h=2.4 show a significant increase in ductility. For a/h=1.5, the moment capacity increases but with a slight change in the ductility. For group A specimens for a/h=1.6, the ductility increase is significant with enhanced moment capacity, and same for the group B specimens.

The flexural behavior of the hybrid NC-UHPC beams is characterized by a linear response up to the point of cracking. For higher thicknesses of the UHPC layer, the ultimate load is higher than the cracking load (Refer to table 6). The larger thickness with a higher volume of steel fibers provides resistance to the propagation of cracks across the depth of the UHPC layer. For C50 specimen, the ultimate load is 22% higher than the cracking load, whereas, for the D50 specimen, a large strain hardening region can be seen up to the ultimate load, with displacement increasing from about 2 mm at cracking load to about 3.5 mm at the ultimate load.

The ultimate load is 17% higher than the cracking load for D50. The A40 and B40 specimens, on the other hand, have an ultimate load higher by about 27% and 9%, respectively, with the B40 specimen showing significant displacement up to the achievement of the $P_U$ value. For specimens B20 and D25, the cracking and ultimate failure load are the same as seen in Table 6. The load-deformation for these specimens follows closely, with a significant strain hardening portion and higher ductility. For specimens A20 and C25 with similar a/h ratio, the ultimate load is higher than the cracking load by 13% and 9%, respectively. Both specimens show similar load-deflection responses, with C25 having a significantly higher moment capacity (68%) compared to A20.

After the peak load, a horizontal portion with varying lengths can be seen in FIG. 9. All specimens after the peak load show a softening curve up to failure. This indicates a non-brittle failure in the NC-UHPC hybrid beams. All failures, as mentioned in the previous section, are characterized by a single vertical crack within or adjacent to the loading points. Due to the significant difference between the cracking load (uncracked section) and the ultimate load (cracked section), the deflection in the beam could be computed using the cracked moment of inertia. This approach is adopted in the section that follows. It is also evident from FIG. 9, that the load-deflection behavior of specimens A20 and C25, A40 and C50 (a/h=1.6 and 1.5), B20 and D25, B40 and D50 (a/h=2.5 and 2.4) follow closely.

The flexural capacity of hybrid beams can vary due to size, for example, the width of the beam. In larger-sized specimens, the effect of dispersion and orientation of steel fibers in UHPC is more definite. In order to confirm the findings related to the influence of specimen size on the flexural capacity of beams with UHPC, panels of two sizes, 600 mm×30 mm×150 mm and 600 mm×30 mm×350 mm (height×depth×width), were cast and subjected to the four-point flexural load over a clear span of 500 mm.

Figure 10:
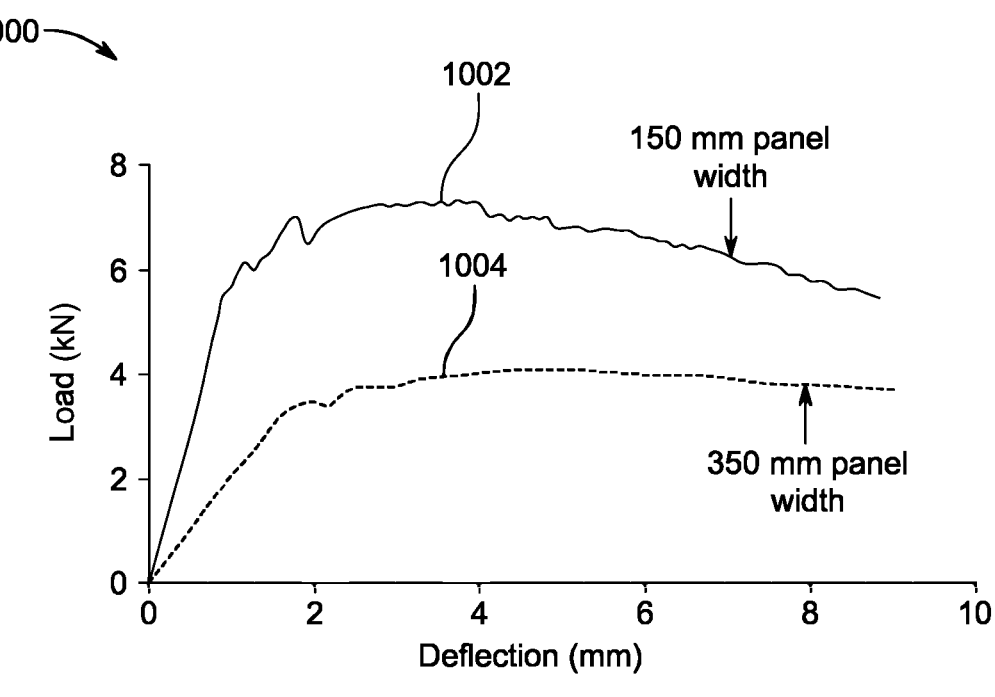
FIG. 10 is a graph illustrating effect of width of the UHPC layer on the flexural strength, according to aspects of the present disclosure.

The load-deflection response of the UHPC beams is shown in FIG. 10. FIG. 10 is a graph 1000 illustrating the effect of the width of the UHPC panels on the flexural strength, according to aspects of the present disclosure. Curve 1002 represents a deflection of a 150 mm wide specimen. Curve 1004 represents a deflection of a 350 mm wide specimen. The average peak load of three specimens for the 150 mm wide specimen is 7.2 kN, which is reduced to about 4 kN for the 350 mm wide specimen. Both specimens show significant ductility after the peak load. The load capacity decreases by about 45% when the width of the UHPC beam is increased.

Strain developed in the NC-UHPC hybrid beams was measured by the strain gauges attached at the top and bottom and two gauges attached on the sides of the beams, as shown in FIG. 4C. The strain gauges were attached at the mid-span of the hybrid beam. The measured strains are used to find the depth of the neutral axis (NA) of these beams. Data for two sets of hybrid beam specimens, A20 and B20, of the same thickness of UHPC layer and different spans of the beams and D25 and D50 with different thickness and same span are discussed here for brevity. The recorded values of strains at four different locations and at different levels of load are shown in table 7 for A20 and B20 and table 8 for D25 and D50. The measured and computed depth of the NA for the four hybrid beam specimens are also shown in the tables.

TABLE 7

Experimental results of load and strain for specimens A20 and B20

| | | | | Measured Strain ×10⁻⁶ | | | | |
|---|---|---|---|---|---|---|---|---|
| Specimens | $P_{cr}$· (kN) | Level of Load (kN) | % of $P_U$ | Top surface | One third from top | Two thirds from top | Bottom surface | Measured NA from top mm |
| A20 | 45 | 12.3 | 23 | −58 | −24 | 8 | 54 | 81 |
| | | 24.2 | 45 | −119 | −47 | 20 | 111 | 81 |
| | | 36.6 | 70 | −119 | −70 | 36 | 262 | 72 |
| | | 42.5 | 80 | −231 | −80 | 56 | 300 | 69 |
| | | 48.4 | 90 | −283 | −83 | 112 | 350 | 65 |
| B20 | 20 | 4.9 | 25 | −44 | −19 | 11 | 39 | 81 |
| | | 10.3 | 50 | −99 | −38 | 30 | 91 | 78.1 |
| | | 15.2 | 75 | −155 | −55 | 65 | 166 | 72.6 |
| | | 19.6 | 98 | −225 | −72 | 110 | 255 | 68 |

TABLE 8

Experimental results of load and strain for beams D25 and D50

| | | | | Measured Strain ×10⁻⁶ | | | | |
|---|---|---|---|---|---|---|---|---|
| Specimens | $P_{cr}$· (kN) | Level of Load (kN) | % of $P_U$ | Top surface | One third from top | Two thirds from top | Bottom surface | Measured NA from top mm |
| D25 | 28 | 7.2 | 25 | −38 | −18 | 13 | 42 | 105 |
| | | 14.5 | 50 | −106 | −38 | 31 | 92 | 105 |
| | | 21.5 | 75 | −158 | −57 | 63 | 110 | 98 |
| | | 28.3 | 100 | −249 | −57 | 110 | 233 | 86 |
| D50 | 38 | 11.3 | 25 | −75 | −30 | 19 | 64 | 108 |
| | | 22.6 | 50 | −120 | −63 | 40 | 132 | 107 |
| | | 33.9 | 75 | −217 | −100 | 71 | 173 | 109 |
| | | 39.3 | 85 | −282 | −120 | 55 | 205 | 111 |

Figure 11A:
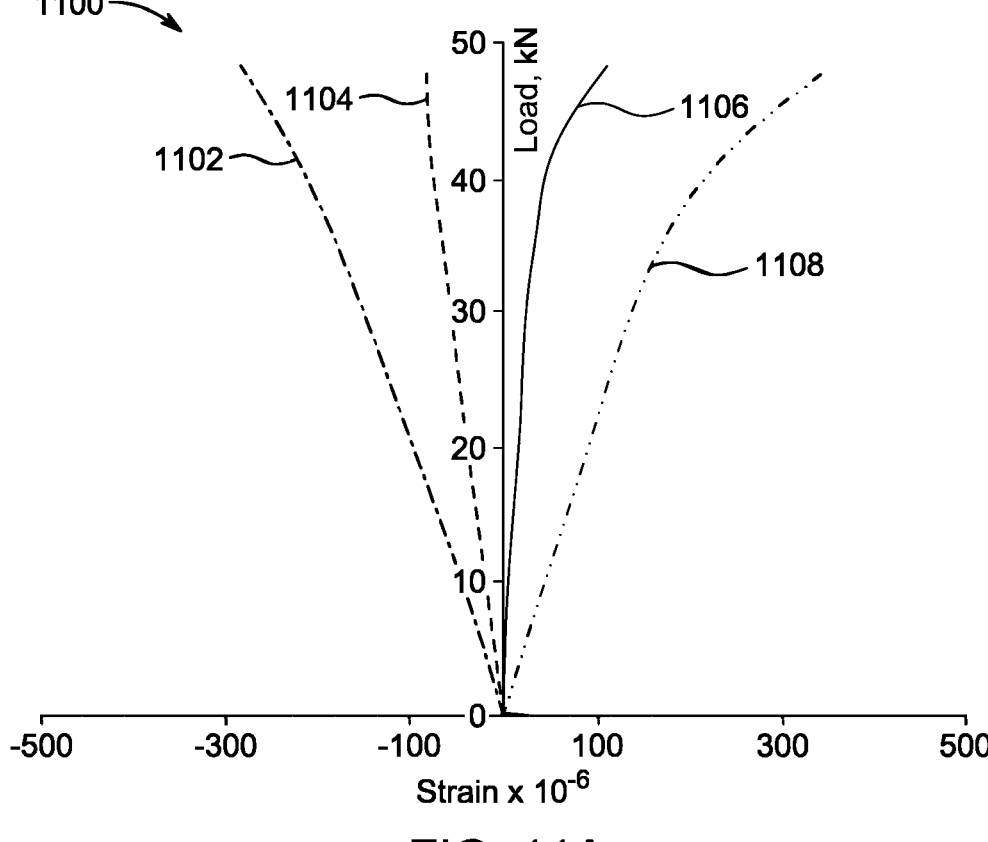
FIG. 11A is a graph illustrating a load-strain curve of A20 specimen of the flexural hybrid span beam, according to aspects of the present disclosure.

The load-strain curves for the beams A20, B20, D25 and D50 at 90% of $P_U$ are shown in FIG. 11A-FIG. 11D for the strains measured at the top surface, the bottom surface, one third and two thirds of the depth from the top surface. FIG. 11A is a graph 1100 illustrating a load-strain curve of A20 specimen of the flexural hybrid span beam. Curve 1102 represents strain at the top surface. Curve 1104 represents strain at one third of the depth from the top surface. Curve 1106 represents strain at two thirds of the depth from the top surface. Curve 1108 represents strain at the bottom surface. The tensile strains in the strain gauges at the bottom surface and two thirds depth are linear initially, up to 70% of the $P_U$ for bottom strain gauges and 80% of the $P_U$ for the strain gauge at two thirds depth. The strains become nonlinear beyond these load levels. The compressive strains at one third depth are linear up to failure; however, the top strain shows slight nonlinearity beyond 80% of the $P_U$.

Figure 11B:
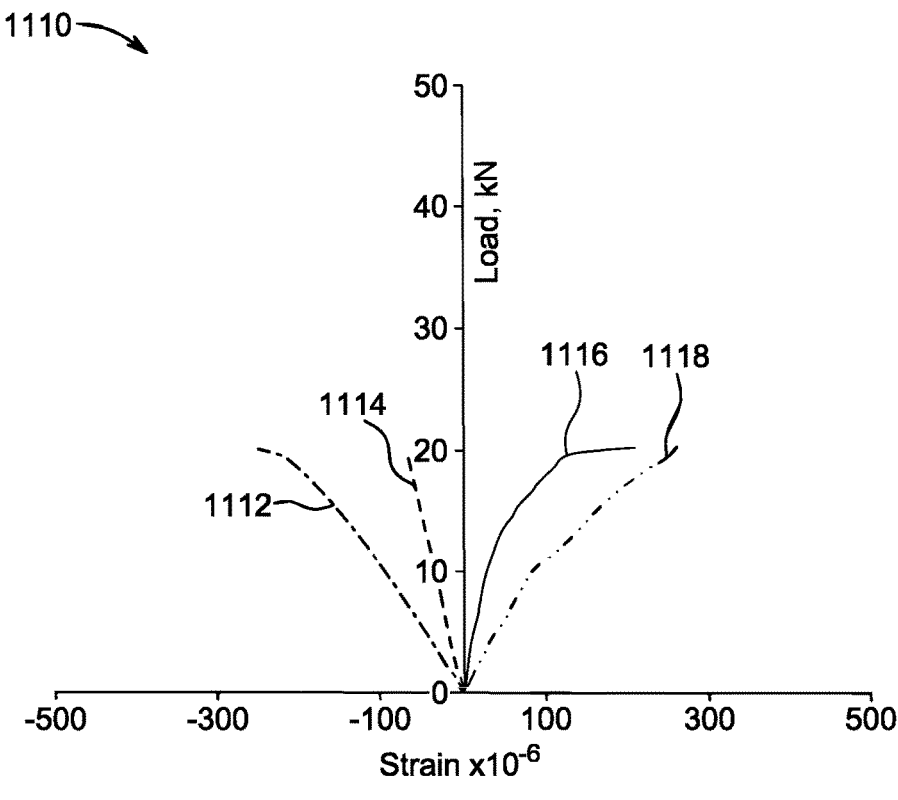
FIG. 11B is a graph illustrating a load-strain curve of B20 specimen of the flexural hybrid span beam, according to aspects of the present disclosure.

FIG. 11B is a graph 1110 illustrating a load-strain curve of B20 specimen of the flexural hybrid span beam. Curve 1112 represents strain at the top surface. Curve 1114 represents strain at one third of the depth from the top surface. Curve 1116 represents strain at two thirds of the depth from the top surface. Curve 1118 represents strain at the bottom surface. For B20 specimen (FIG. 11B), the tensile strain becomes nonlinear at about 50% of the $P_U$ at the bottom surface. The compressive strain at the top surface is almost nonlinear except at nearly 95% of the $P_U$. Similar observations can be made for the beams D25 and D50 (FIG. 11C-FIG. 11D).

Figure 11C:
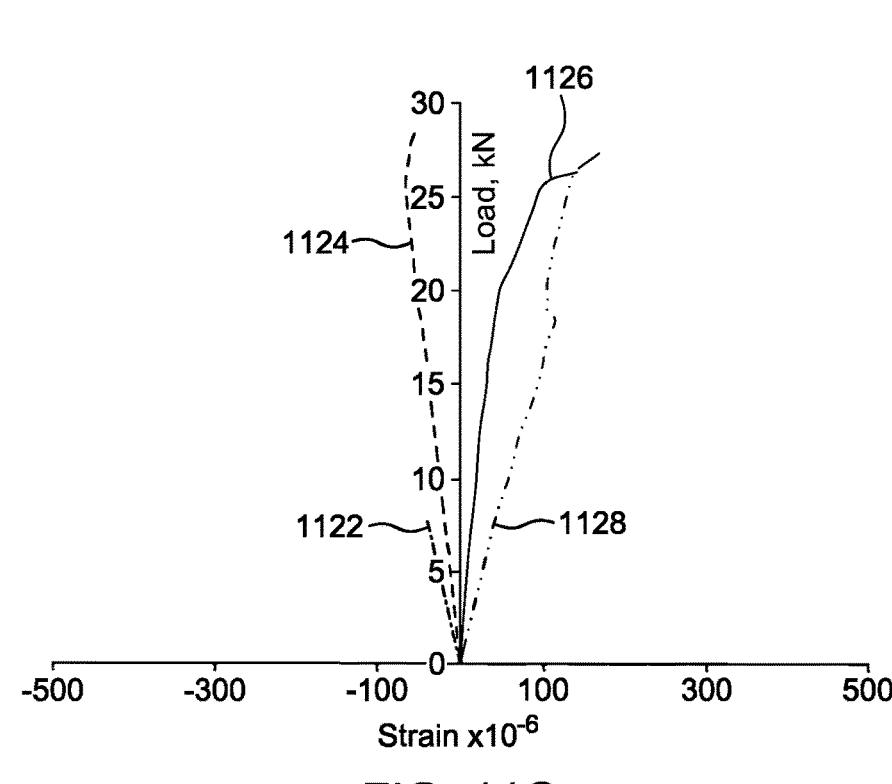
FIG. 11C is a graph illustrating a load-strain curve of D25 specimen of the flexural hybrid span beam, according to aspects of the present disclosure.

FIG. 11C is a graph 1120 illustrating a load-strain curve of D25 specimen of the flexural hybrid span beam. Curve 1122 represents strain at the top surface. Curve 1124 represents strain at one third of the depth from the top surface. Curve 1126 represents strain at two thirds of the depth from the top surface. Curve 1128 represents strain at the bottom surface.

Figure 11D:
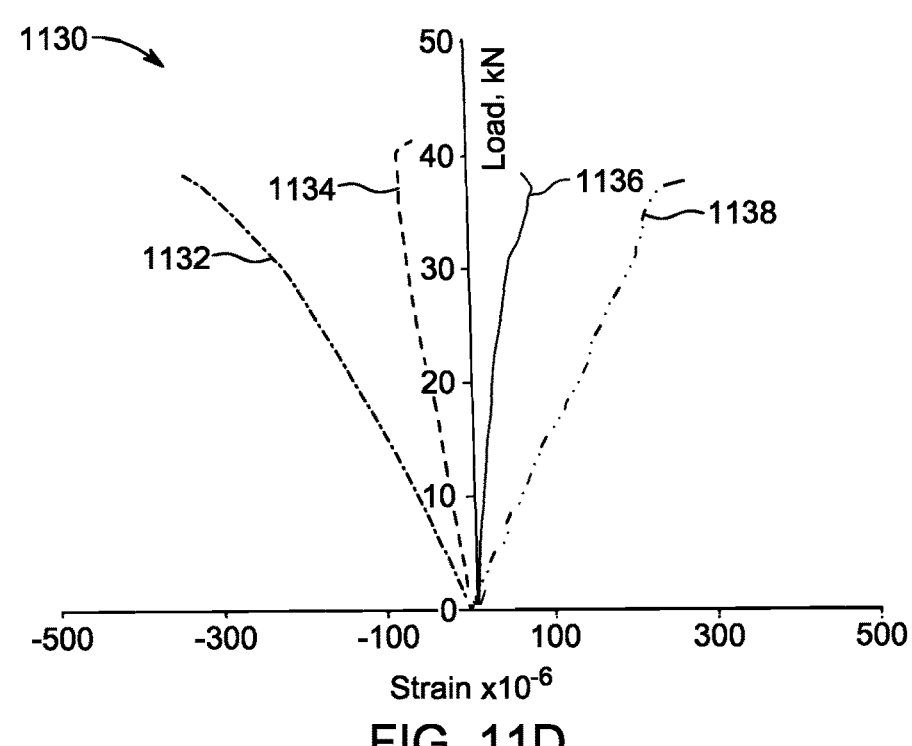
FIG. 11D is a graph illustrating a load-strain curve of D50 specimen of the flexural hybrid span beam, according to aspects of the present disclosure.

FIG. 11D is a graph 1130 illustrating a load-strain curve of D50 specimen of the flexural hybrid span beam. Curve 1132 represents strain at the top surface. Curve 1134 represents strain at one third of the depth from the top surface. Curve 1136 represents strain at two thirds of the depth from the top surface. Curve 1138 represents strain at the bottom surface.

As shown in FIG. 11C-FIG. 11D, the load-strain response is almost linear, with the strain at the top surface showing slight nonlinearity at a higher load. At lower load levels (service load), the strains in the hybrid beam are linear. The linearity of the strain confirms that no slip occurs between the UHPC and the NC, and adequate bonding exists between NC and UHPC layers.

Figure 12A:
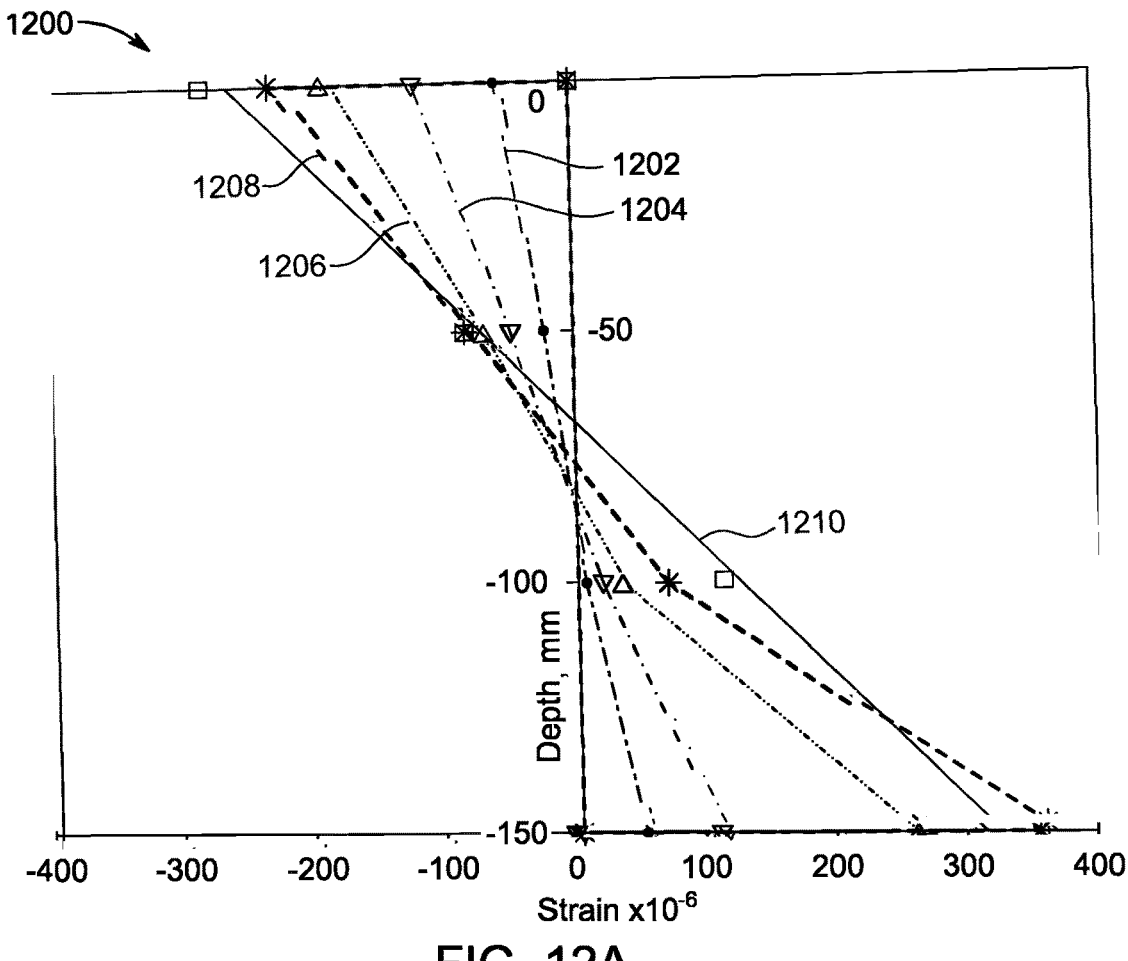
FIG. 12A is a strain diagram through the depth of A20 specimen of the flexural hybrid span beam, according to aspects of the present disclosure.
Figure 12B:
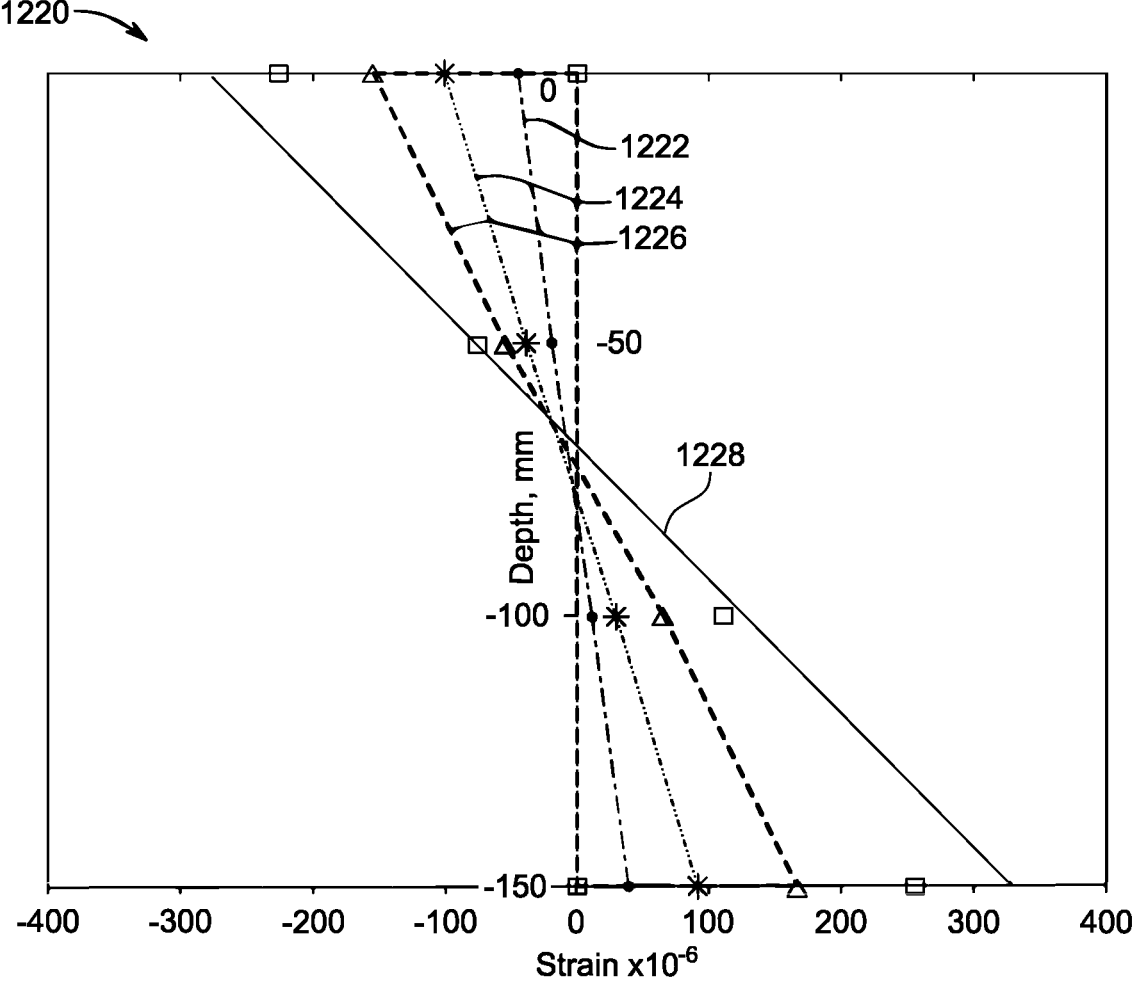
FIG. 12B is a strain diagram through the depth of B20 specimen of the flexural hybrid span beam, according to aspects of the present disclosure.
Figure 12C:
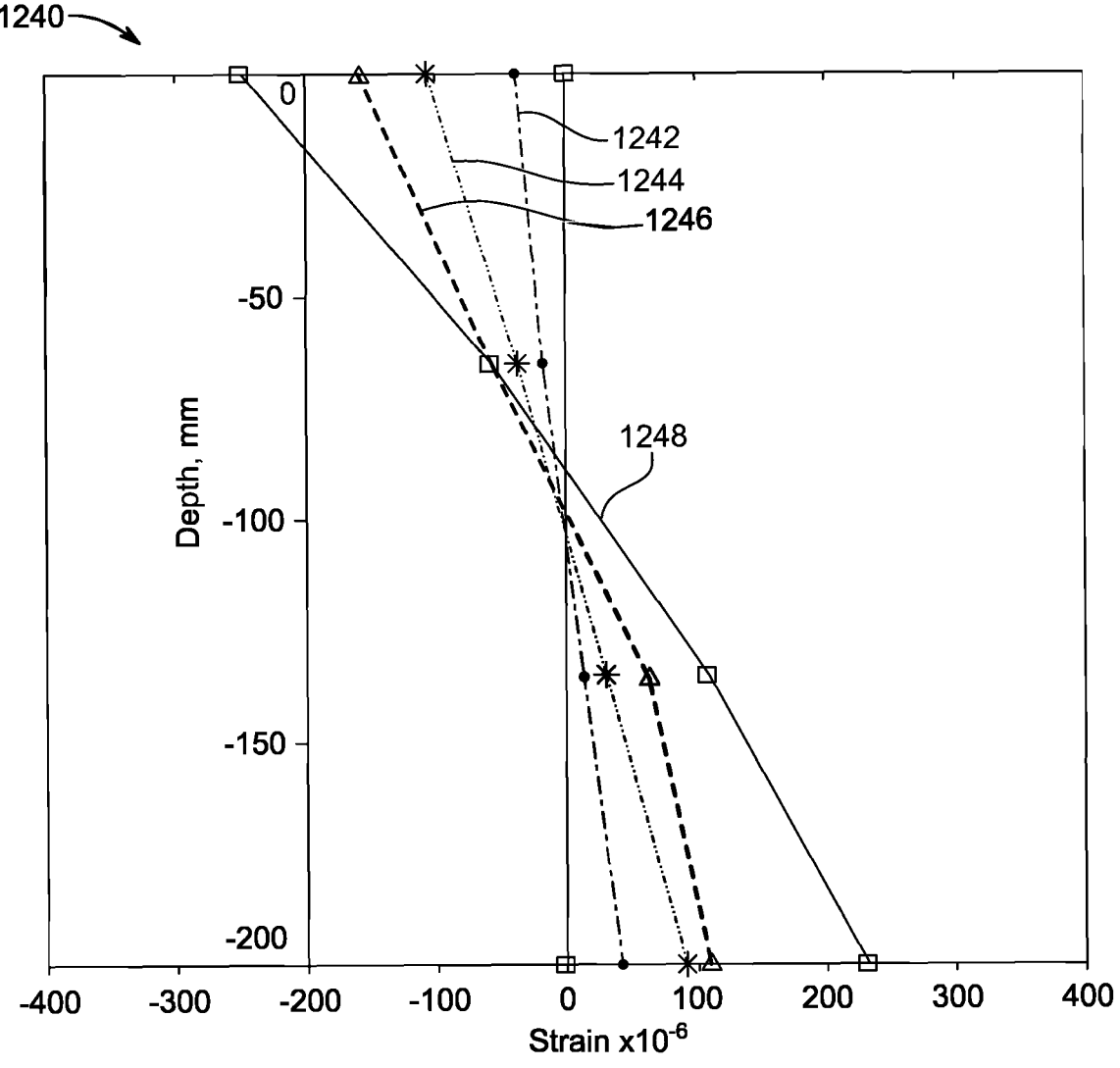
FIG. 12C is a strain diagram through the depth of D25 specimen of the flexural hybrid span beam, according to aspects of the present disclosure.
Figure 12D:
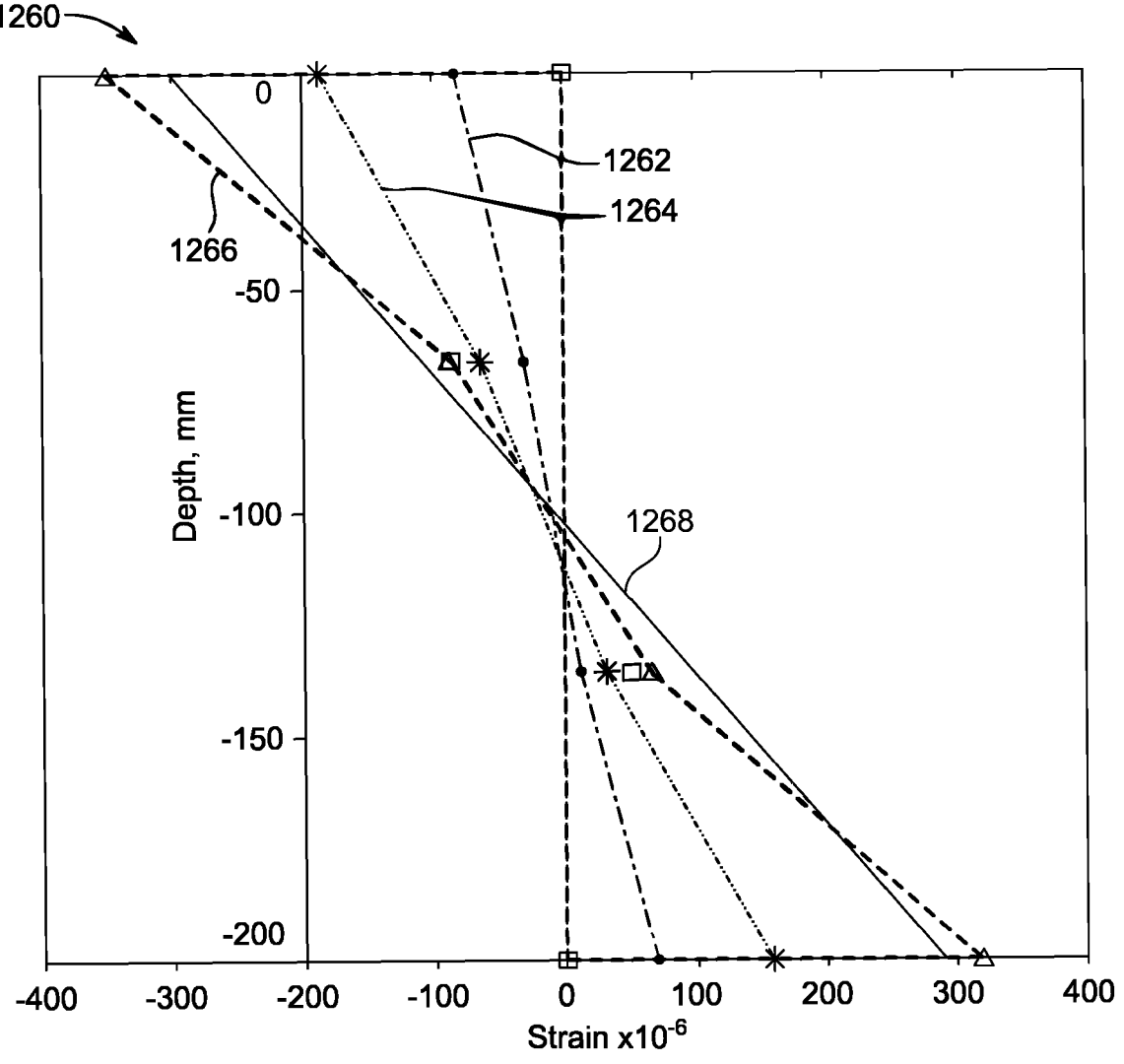
FIG. 12D is a strain diagram through the depth of D50 specimen of the flexural hybrid span beam, according to aspects of the present disclosure.

The strain diagram across the depth of NC-UHPC hybrid beams obtained from measured values of strains at four locations are shown in FIG. 12A-FIG. 12D. FIG. 12A-FIG. 12B show the measured values of strains for the beam specimens A20 and B20. FIG. 12C and FIG. 12D show the measured values of strains for the beam specimens D25 and D50 at the interface.

FIG. 12A is a strain diagram 1200 through the depth of A20 specimen of the flexural hybrid span beam. Curve 1202 represents strain through the depth when load (P) is 12.3 kN. Curve 1204 represents strain through the depth when P is 24.2 kN. Curve 1206 represents strain through the depth when P is 36.6 kN. Curve 1208 represents strain through the depth when P is 42.5 kN. Curve 1210 represents strain through the depth when P is 48.4 kN.

FIG. 12B is a strain diagram 1220 through the depth of B20 specimen of the flexural hybrid span beam. Curve 1222 represents strain through the depth when P is 4.9 kN. Curve 1224 represents strain through the depth when P is 10.3 kN. Curve 1226 represents strain through the depth when P is 15.2 kN. Curve 1228 represents strain through the depth when P is 19.6 kN.

FIG. 12C is a strain diagram 1240 through the depth of D25 specimen of the flexural hybrid span beam. Curve 1242 represents strain through the depth when P is 7.2 kN. Curve 1244 represents strain through the depth when P is 14.5 kN. Curve 1246 represents strain through the depth when P is 21.5 kN. Curve 1248 represents strain through the depth when P is 28.3 kN.

FIG. 12D is a strain diagram 1260 through the depth of D50 specimen of the flexural hybrid span beam. Curve 1262 represents strain through the depth when P is 12.4 kN. Curve 1264 represents strain through the depth when P is 25.2 kN. Curve 1266 represents strain through the depth when P is 38.25 kN. Curve 1268 represents strain through the depth when P is 42.6 kN.

The variation in strains for five increasing load levels for A20 specimen and four load levels for other specimens are shown in FIG. 12A-FIG. 12D. These load levels represent strains at lower levels of load and close to failure. For all specimens, the compressive strains for lower load levels are almost linear. For B20 specimen, the tensile strains follow the linear path without any divergence. However, for specimens A20, D25 and D50, the slope of the line change below the NA at the NC-UHPC interface at the load level equal to 75% of the $P_U$ and higher level. This divergence can be attributed to a possible slip at the interface. It can also be seen from FIG. 12A-FIG. 12D that the neutral axis moves upward as the load level increases. This movement is in the vicinity of 5-8 mm.

The flexural capacity of NC-UHPC beams can be computed using an analytical NC-UHPC model based on the flexural theory of beams. The analytical NC-UHPC model is configured to compute stresses in the hybrid NC-UHPC beams, and neutral axis and moment of inertia of the hybrid NC-UHPC beams. The following assumptions are made for the analytical NC-UHPC model:

1. The beam section remains plane under loads;
2. The beam bonding takes place without any slip at the NC-UHPC interface, i.e., there is a perfect bond;
3. Properties of NC-UHPC in the hybrid beam are expressed by material constitutive law.

From the experimental program conducted, it was observed that cracking in the beams may commence either at the bottom surface of the UHPC layer or at the bottom surface of the NC layer. No shear cracking was observed at the interface of NC-UHPC. The computation of the neutral axis and the moment of inertia (MI) of the hybrid sections is used for computing stresses that depends on the state of cracking.

Figure 13A:
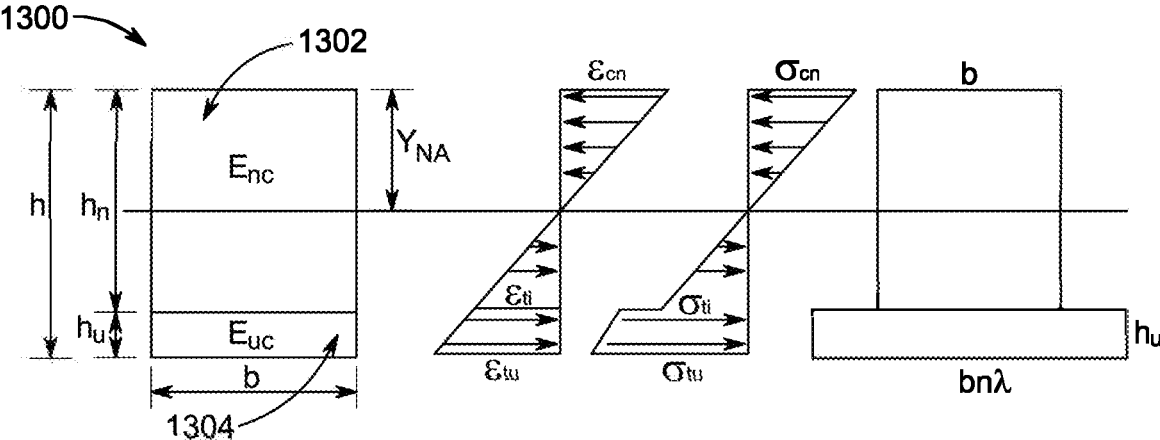
FIG. 13A is a schematic diagram moment of inertia and stresses in the flexural hybrid span beam having an uncracked section and partially cracked UHPC layer, according to aspects of the present disclosure.

Prior to the development of cracking either in the NC or the UHPC layer, the uncracked MI ($I_{uc}$) can be computed in which both NC and UHPC are effective (FIG. 13A). FIG. 13A is a schematic diagram 1300 of moment of inertia and stresses in the flexural hybrid span beam having an uncracked section ($\lambda$=1) and partially cracked UHPC layer. Internal shear forces and bending moments cause longitudinal axial stresses and shear stresses in the cross-section as shown in FIG. 13A. As shown in FIG. 13A, the NC layer 1302 has an elasticity ($E_{nc}$) and a height $h_n$. The UHPC layer 1304 has an elasticity ($E_{uc}$) and a height $h_u$.

Figure 13B:
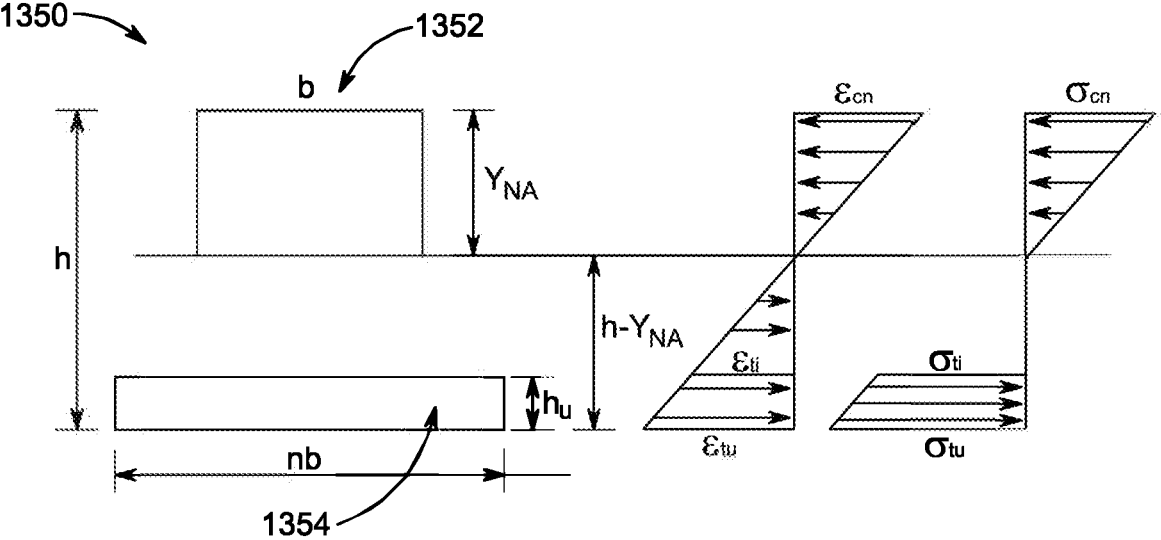
FIG. 13B is a schematic diagram moment of inertia and stresses in the flexural hybrid span beam having a cracked NC layer, according to aspects of the present disclosure.

If the cracks develop in the NC layer and the UHPC layer is uncracked, then MI is ($I_{crn}$) in which NC is cracked below the NA (as shown in FIG. 13B). FIG. 13B is a schematic diagram 1350 of moment of inertia and stresses in the flexural hybrid span beam having a cracked NC layer 1352. There could be partial cracking in the NC layer 1352, and a portion of the section below the NA may be active in resisting the tension. If the cracks initiate at the bottom of the UHPC layer 1354 and the NC layer 1352 is uncracked, then the MI ($I_{crn}$) can be determined. The steel fibers in the UHPC resist the cracks, and the UHPC layer is not fully effective. During the testing, a reduction factor $\lambda$ may be applied while transforming the UHPC layer to NC for computing the NA and MI. The reduction factor A accounts for cracking in the UHPC layer.

For the uncracked section and for the case where the crack initiates in the UHPC layer, the depth of the neutral axis, $Y_{NA}$ measured from the top of the section, and the uncracked moment of inertia ($I_{uc}$) and cracked UHPC MI ($I_{cm}$) of the composite beam was calculated from equations (1) and (2). For the uncracked section $\lambda$=1, and for the UHPC cracked section, the value of $\lambda$ depends on the extent of cracking in the UHPC layer. The flexural strength of the composite beams can be determined using the appropriate values of depth of NA and the moment of inertia.

$$Y_{NA} = \frac{h_n^2 + 2\lambda n h_u h - \lambda h_u^2}{2[h_n + \lambda h_u]}. \tag{1}$$

$$I_{uc/cru} = \frac{1}{3}bY_{NA}^3 + \frac{1}{3}b(h_n - Y_{NA})^3 + bn\lambda h_u\left[\frac{h_u^2}{12} + \left(h - Y_{NA} - \frac{h_u}{2}\right)^2\right]. \tag{2}$$

For the cracked normal concrete section (FIG. 13B), $Y_{NA}$ was measured from the top the NA was calculated by solving equation (3), and the cracked moment of inertia ($I_{crn}$) was calculated from equation (4). Partial cracking in the UHPC layer can be accounted for by the factor $\lambda$.

$$\frac{1}{2}Y_{NA}^2 = n\lambda h_u\left(h - Y_{NA} - \frac{h_u}{2}\right). \tag{3}$$

$$I_{crn} = \frac{1}{3}bY_{NA}^3 + \frac{1}{12}n\lambda bh_u^3 + nb\lambda h_u\left(h - Y_{NA} - \frac{h_u}{2}\right)^2. \tag{4}$$

The values of elastic modulus for UHPC and NC, as presented in table 5, were 55 GPa and 30 GPa, respectively. The modular ratio ($n=E_{uc}/E_{nc}$) of the hybrid section is 1.833. The computed values of NA and MI for the uncracked, cracked NC layer and cracked UHPC layer of hybrid beam sections (FIG. 13A-FIG. 131B) are displayed in table 9. For the cracked UHPC layer, the value of $\lambda$=0.15 is assumed.

25

TABLE 9

| | Calculated NA depth and MI of the hybrid beams | | | | | |
|---|---|---|---|---|---|---|
| | Uncracked | | Cracked NC Layer | | Cracked UHPC | |
| Specimen | NA Top (mm) | $I_{uc} \times 10^6$ mm$^4$ | NA Top (mm) | $I_{crn} \times 10^6$ mm$^4$ | NA Top (mm) | $I_{cru} \times 10^6$ mm$^4$ |
| A20 | 81.5 | 51.8 | 71.1 | 44.3 | 68.0 | 31.9 |
| A40 | 85.0 | 55.2 | 83.0 | 54.4 | 61.8 | 25.3 |
| B20 | 81.5 | 51.8 | 71.1 | 44.3 | 68.0 | 31.9 |
| B40 | 85.0 | 55.2 | 83.0 | 54.4 | 61.8 | 25.3 |
| C25 | 108.3 | 121.8 | 93.1 | 102.0 | 91.3 | 77.0 |
| C50 | 112.9 | 130.4 | 109.5 | 127.5 | 83.4 | 61.5 |
| D25 | 108.3 | 121.8 | 93.1 | 102.0 | 91.3 | 77.0 |
| D50 | 112.9 | 130.4 | 109.5 | 127.5 | 83.4 | 61.5 |

The strain variation along the depth (FIG. 12A-FIG. 12D) shows that the neutral axis moves slightly upward at a higher load level. This movement is in the vicinity of 5-8 mm. FIG. 14A-FIG. 14D show a comparison between the computed and average measured depth of the neutral axis in various beam specimens.

Figure 14A:
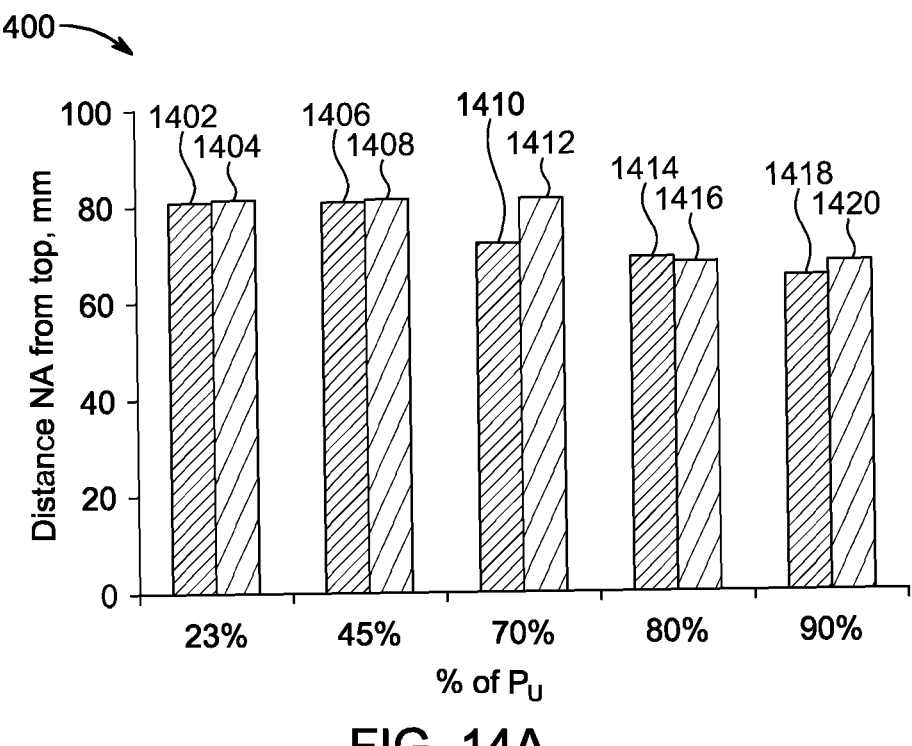
FIG. 14A is a graph illustrating a measured and calculated distance of a neutral axis for the A20 specimen of the flexural hybrid span beam, according to aspects of the present disclosure.

FIG. 14A is a graph 1400 illustrating a measured and calculated distance of a neutral axis (X) for the A20 specimen of the flexural hybrid span beam. Bar 1402 represents the measured distance of NA and bar 1404 represents the calculated distance of NA at 23% of the P$_U$. Bar 1406 represents the measured distance of NA and bar 1408 represents the calculated distance of NA at 45% of the P$_U$. Bar 1410 represents the measured distance of NA and bar 1412 represents the calculated distance of NA at 70% of the P$_U$. Bar 1414 represents the measured distance of NA and bar 1416 represents the calculated distance of NA at 80% of the P$_U$. Bar 1418 represents the measured distance of NA and bar 1420 represents the calculated distance of NA at 90% of the P$_U$. For A20 specimen, at a load level of 23% and 45% of P$_U$, the values are identical; however, at higher levels (70%, 80%, 90%), the usage of I$_{cru}$ for computation of depth of NA is slightly higher as compared to the measured values. The UHPC layer may be marginally stiffer than assumed in the computations.

Figure 14B:
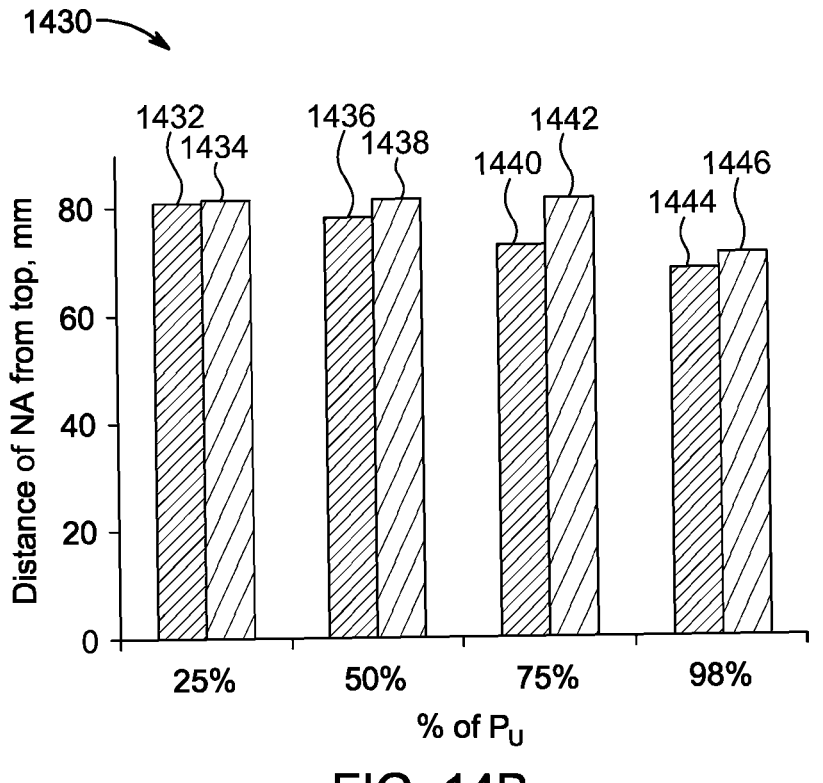
FIG. 14B is a graph illustrating a measured and calculated distance of a neutral axis for the B20 specimen of the flexural hybrid span beam, according to aspects of the present disclosure.

FIG. 14B is a graph 1430 illustrating measured and calculated distance of a neutral axis (X) for the B20 specimen of the flexural hybrid span beam. Bar 1432 represents the measured distance of NA and bar 1434 represents the calculated distance of NA at 25% of the P$_U$. Bar 1436 represents the measured distance of NA and bar 1438 represents the calculated distance of NA at 50% of the P$_U$. Bar 1440 represents the measured distance of NA and bar 1442 represents the calculated distance of NA at 75% of the P$_U$. Bar 1444 represents the measured distance of NA and bar 1446 represents the calculated distance of NA at 98% of the P$_U$. For B20 specimen, at load levels up to 25%, the depth of the neutral axis is also identical, but for 50%, 75%, and 98%, the calculated values are marginally higher.

Figure 14C:
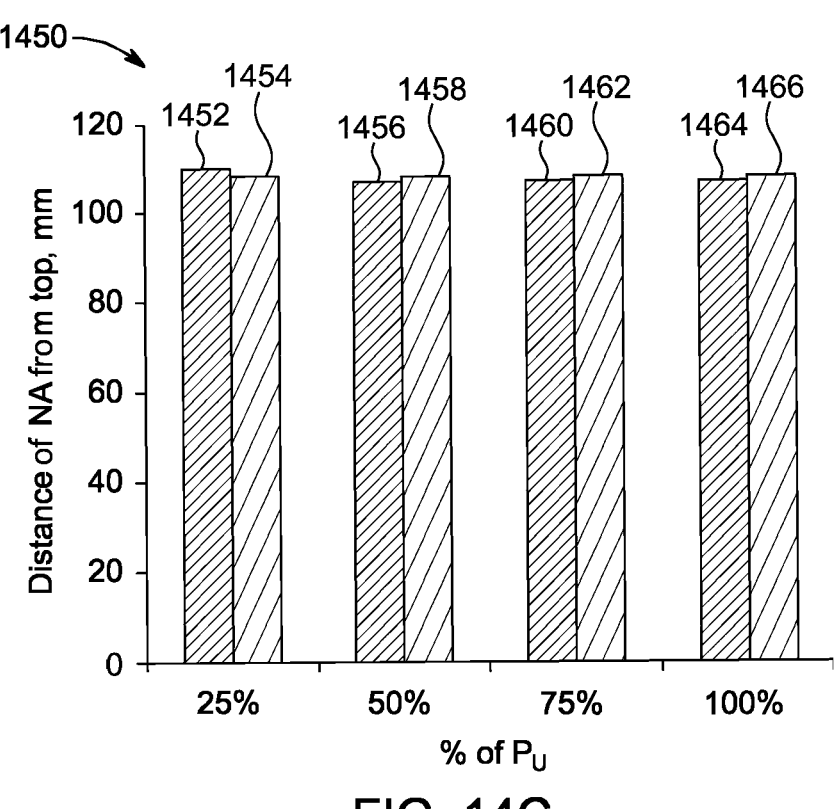
FIG. 14C is a graph illustrating a measured and calculated distance of a neutral axis for the D25 specimen of the flexural hybrid span beam, according to aspects of the present disclosure.

FIG. 14C is a graph 1450 illustrating measured and calculated distance of a neutral axis (X) for the D25 specimen of the flexural hybrid span beam. Bar 1452 represents the measured distance of NA and bar 1454 represents the calculated distance of NA at 25% of the P$_U$. Bar 1456 represents the measured distance of NA and bar 1458 represents the calculated distance of NA at 50% of the P$_U$. Bar 1460 represents the measured distance of NA and bar 1462 represents the calculated distance of NA at 75% of the P$_U$. Bar 1464 represents the measured distance of NA and bar 1466 represents the calculated distance of NA at 100% of the P$_U$. For D25 specimen, the measured and calculated values of NA are almost the same at all load levels.

Figure 14D:
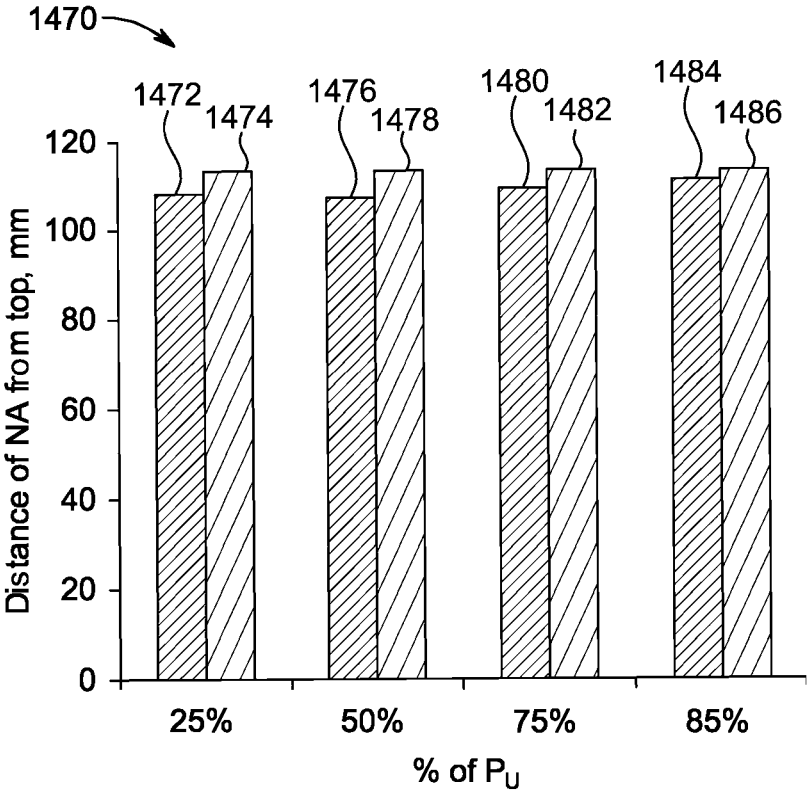
FIG. 14D is a graph illustrating a measured and calculated distance of a neutral axis for the D50 specimen of the flexural hybrid span beam, according to aspects of the present disclosure.

FIG. 14D is a graph 1470 illustrating measured and calculated distance of a neutral axis (X) for the D50 specimen of the flexural hybrid span beam. Bar 1472 represents the measured distance of NA and bar 1474 represents the calculated distance of NA at 25% of the P$_U$. Bar 1476 represents the measured distance of NA and bar 1478 represents the calculated distance of NA at 50% of the P$_U$. Bar 1480 represents the measured distance of NA and bar 1482 represents the calculated distance of NA at 75% of the P$_U$. Bar 1484 represents the measured distance of NA and bar 1486 represents the calculated distance of NA at 85% of the P$_U$. For D50 specimen, the calculated values are slightly higher at all load levels. For service load levels, say up to 30% of P$_U$, the neutral axis can be computed using an uncracked section.

Cracking Load for the Hybrid Beams:

$$P_{cr.} = \frac{2 f_r I_{uc}}{a Y_{NA}} \text{ where } M_{cr} = \frac{f_r I_{uc}}{Y_{NA}}, \tag{5}$$

where f$_r$ is the flexural strength, I$_{uc}$ is the uncracked transformed section (Table 9), a is the shear span, Y$_{NA}$ is the bottom distance of neutral axis (N.A).

Figure 15:
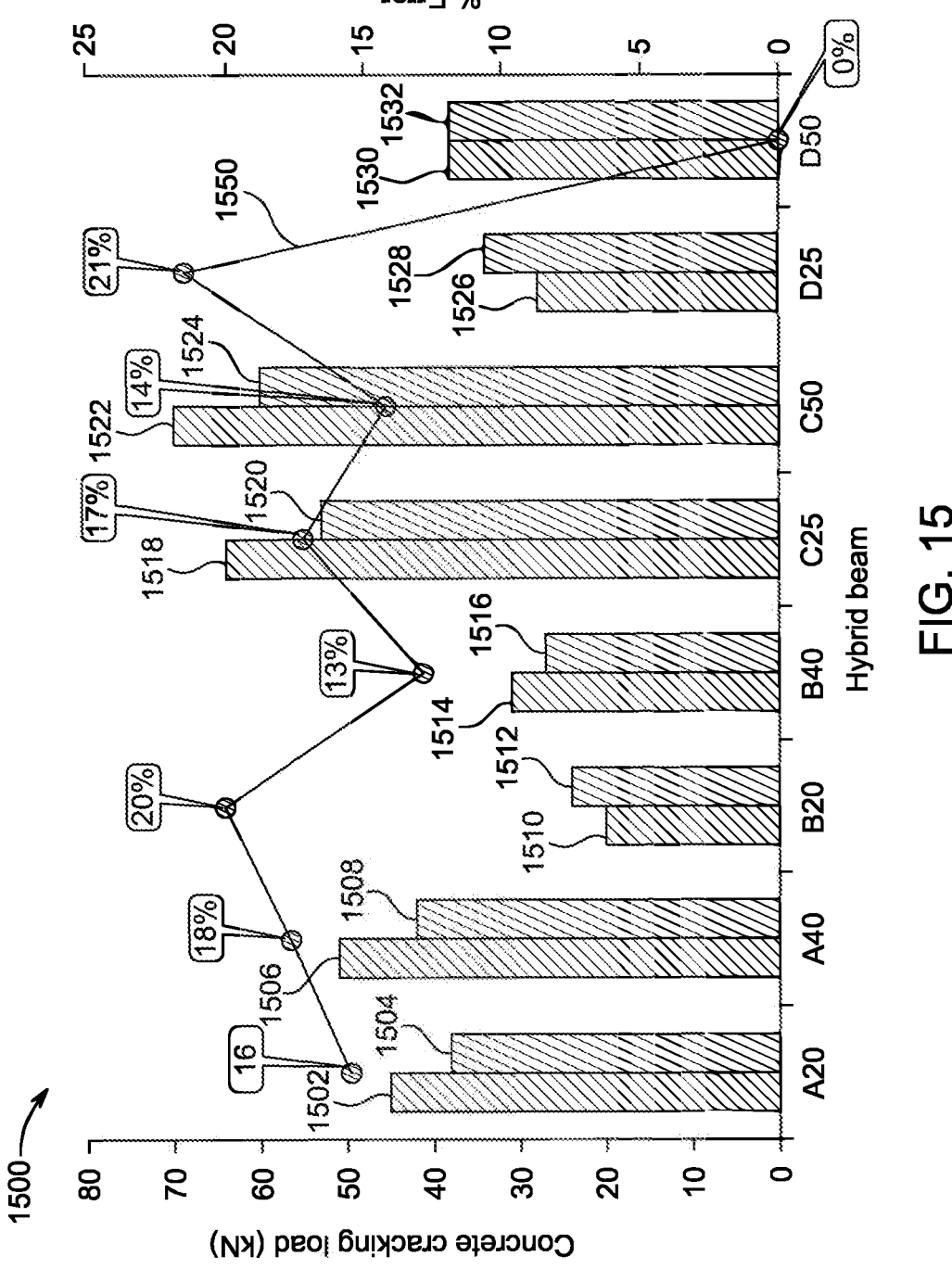
FIG. 15 is a graph illustrating experimental cracking loads versus the calculated cracking loads for the flexural hybrid span beam, according to aspects of the present disclosure.

FIG. 15 is a graph 1500 illustrating experimental concrete cracking loads versus the calculated concrete cracking loads P$_{cr}$ for the flexural hybrid span beam. The calculated concrete cracking load and the average experimental concrete cracking load for all tested beams are shown in FIG. 15. Bar 1502 represents experimental concrete cracking load of A20 specimen. Bar 1504 represents calculated concrete cracking load of A20 specimen. Bar 1506 represents experimental concrete cracking load of A40 specimen. Bar 1508 represents calculated concrete cracking load of A40 specimen. Bar 1510 represents experimental concrete cracking load of B20 specimen. Bar 1512 represents calculated concrete cracking load of B20 specimen. Bar 1514 represents experimental concrete cracking load of B40 specimen. Bar 1516 represents calculated concrete cracking load of B40 specimen. Bar 1518 represents experimental concrete cracking load of C25 specimen. Bar 1520 represents calculated concrete cracking load of C25 specimen. Bar 1522 represents experimental concrete cracking load of C50 specimen. Bar 1524 represents calculated concrete cracking load of C50 specimen. Bar 1526 represents experimental concrete cracking load of D25 specimen. Bar 1528 represents calculated concrete cracking load of D25 specimen. Bar 1530 represents experimental concrete cracking load of D50 specimen. Bar 1532 represents calculated cracking load of D50 specimen.

Curve 1550 is an error curve representing an error between the experimental concrete cracking load and the calculated concrete cracking load. As shown in FIG. 15, A20 specimen has an error of 16% between the experimental concrete cracking load and the calculated concrete cracking load. A40 specimen has an error of 18% between the experimental concrete cracking load and the calculated concrete cracking load. B20 specimen has an error of 20% between the experimental concrete cracking load and the calculated concrete cracking load. B40 specimen has an error of 13% between the experimental concrete cracking load and the calculated concrete cracking load. C25 specimen has an error of 17% between the experimental concrete cracking load and the calculated concrete cracking load. C50 specimen has an error of 14% between the experimental concrete cracking load and the calculated concrete cracking load. D25 has an error of 21% between the experimental concrete cracking load and the calculated concrete cracking load. D50 has 0% error between the experimental concrete cracking load and the calculated concrete cracking load.

The modulus of rupture for NC is taken as 6 MPa. The error ranges from 3% to 200%, with calculated values being lower in most of the cases except B20 and D25.

Figure 16:
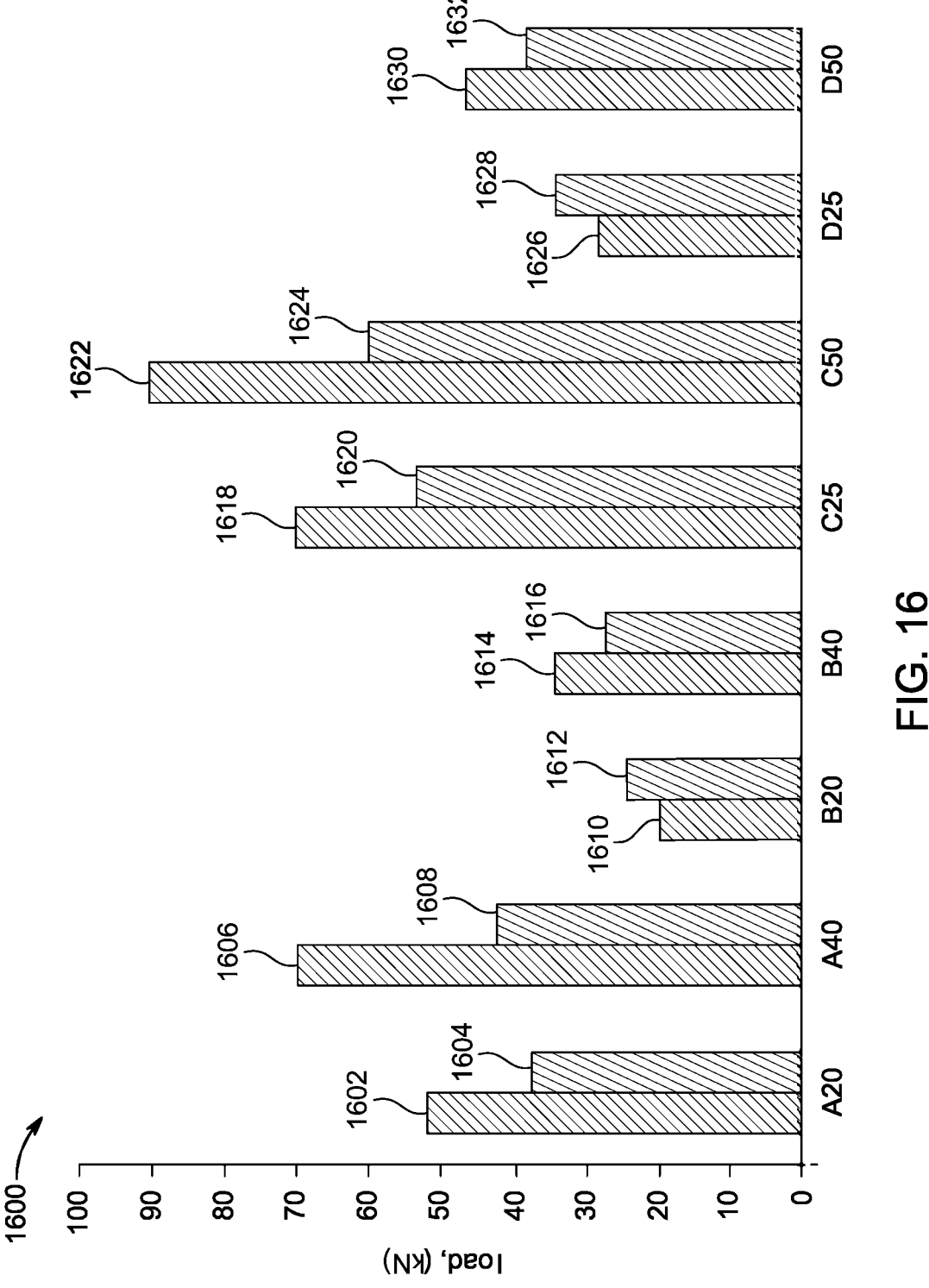
FIG. 16 is a graph illustrating experimental failure load versus the calculated cracking load for the flexural hybrid span beam, according to aspects of the present disclosure.

FIG. 16 is a graph 1600 illustrating experimental failure load ($P_U$) versus the calculated concrete cracking load ($P_{cr}$) for the flexural hybrid span beam. Bar 1602 represents failure load ($P_U$) of A20 specimen. In an example, the failure load ($P_U$) is 52 kN. Bar 1604 represents calculated concrete cracking load ($P_{cr}$) of A20 specimen. In an example, the calculated concrete cracking load ($P_{cr}$) is 38 kN. Bar 1606 represents failure load ($P_U$) of A40 specimen. In an example, the failure load ($P_U$) is 70 kN. Bar 1608 represents calculated concrete cracking load ($P_{cr}$) of A40 specimen. In an example, the calculated concrete cracking load ($P_{cr}$) is 42 kN. Bar 1610 represents failure load ($P_U$) of B20 specimen. In an example, the failure load ($P_U$) is 20 kN. Bar 1612 represents calculated concrete cracking load ($P_{cr}$) of B20 specimen. In an example, the calculated concrete cracking load ($P_{cr}$) is 24 kN. Bar 1614 represents failure load ($P_U$) of B40 specimen. In an example, the failure load ($P_U$) is 34 kN. Bar 1616 represents calculated concrete cracking load ($P_{cr}$) of B40 specimen. In an example, the calculated concrete cracking load ($P_{cr}$) is 27 kN. Bar 1618 represents failure load ($P_U$) of C25 specimen. In an example, the failure load ($P_U$) is 70 kN. Bar 1620 represents calculated concrete cracking load ($P_{cr}$) of C25 specimen. In an example, the calculated concrete cracking load ($P_{cr}$) is 53 kN. Bar 1622 represents failure load ($P_U$) of C50 specimen. In an example, the failure load ($P_U$) is 90 kN. Bar 1624 represents calculated concrete cracking load ($P_{cr}$) of C50 specimen. In an example, the lower load level, and there is a transition from uncracked to the cracked concrete section. For specimen B20, the average cracking load (20 kN) and the average ultimate load (20 kN) are very close, and the section remains uncracked up to a high load and fails at a slightly higher load. For a/h ratio of 1.5 and 1.6, the cracking occurs at a lower load and increases significantly by values ranging from 32% to 36.8% for the smaller thickness of the UHPC and 52.5% to 66.6% when the thickness is doubled. For a higher a/h ratio of 2.4 and 2.5, the difference between the cracking and the ultimate load is in the range of 14% to 26%.

During experiments, the moment capacity and stresses of the hybrid beams were also calculated. The moment capacity of the hybrid beam at experimentally measured and computed cracking load is shown in table 10. For the purpose of comparison, the moment capacity of the NC beams of the same dimensions, unreinforced and reinforced, are also presented. Unreinforced NC beams have an ultimate moment capacity of 3.4 kN·m for the beam cross-section of 150 mm×150 mm (specimens A20, A40, B20, B40) and 6 kN·m for beam cross-section of 150 Mm×200 mm (specimens C25, C50, D25, D50). For the NC beams reinforced with 3-8 mm diameter steel bars, the moment capacity ranges from 7.5 kN·m for the beam cross-section of 150 mmx 150 mm (specimens A20, A40, B20, B40) to 10.7 kN·m for beam cross-section of 150 mm×200 mm (specimens C25, C50, D25, D50). The experimental results show that the NC-UHPC beams have moment capacity ranging between 3.8 kN·m and 6.1 kN·m for the beams A20, A40, B20, and B40, and between 6.7 kN·m and 10.5 kN·m for beams C25, C50, D25, and D50. The moment capacity is of the same order as the reinforced NC beam and significantly higher than plain concrete beams. The potential of using a UHPC layer as a replacement for steel is exhibited; however, verifications by tests on large-scale beams are warranted.

TABLE 10

| | Moment capacity of hybrid, plain NC, and reinforced NC sections. | | | | | |
|---|---|---|---|---|---|---|
| Specimens | Exp. Cracking Load (kN) | Exp. Moment Capacity (kN · m) | Calculated Cracking Load (kN)) | Calculated Moment Capacity (kN · m) | Moment Capacity of Plain NC Section (kN · m) | Moment Capacity of Reinforced NC Section (kN · m) |
| A20 | 45 | 5.4 | 38 | 4.6 | 3.4 | 7.5 |
| A40 | 51 | 6.1 | 42 | 5.0 | 3.4 | 7.5 |
| B20 | 20 | 3.8 | 24 | 4.5 | 3.4 | 7.5 |
| B40 | 31 | 5.8 | 27 | 5.1 | 3.4 | 7.5 |
| C25 | 64 | 9.6 | 53 | 8.0 | 6.0 | 10.7 |
| C50 | 70 | 10.5 | 60 | 9.0 | 6.0 | 10.7 |
| D25 | 28 | 6.7 | 34 | 8.1 | 6.0 | 10.7 |
| D50 | 38 | 9.0 | 38 | 9.0 | 6.0 | 10.7 | calculated concrete cracking load ($P_{cr}$) is 60 kN. Bar 1626 represents failure load ($P_U$) of D25 specimen. In an example, the failure load ($P_U$) is 28 kN. Bar 1628 represents calculated concrete cracking load ($P_{cr}$) of D25 specimen. In an example, the calculated concrete cracking load ($P_{cr}$) is 34 kN. Bar 1630 represents failure load ($P_U$) of D50 specimen. In an example, the failure load ($P_U$) is 46 kN. Bar 1632 represents calculated concrete cracking load ($P_{cr}$) of D50 specimen. In an example, the calculated concrete cracking load ($P_{cr}$) is 38 kN.

Figure 17:
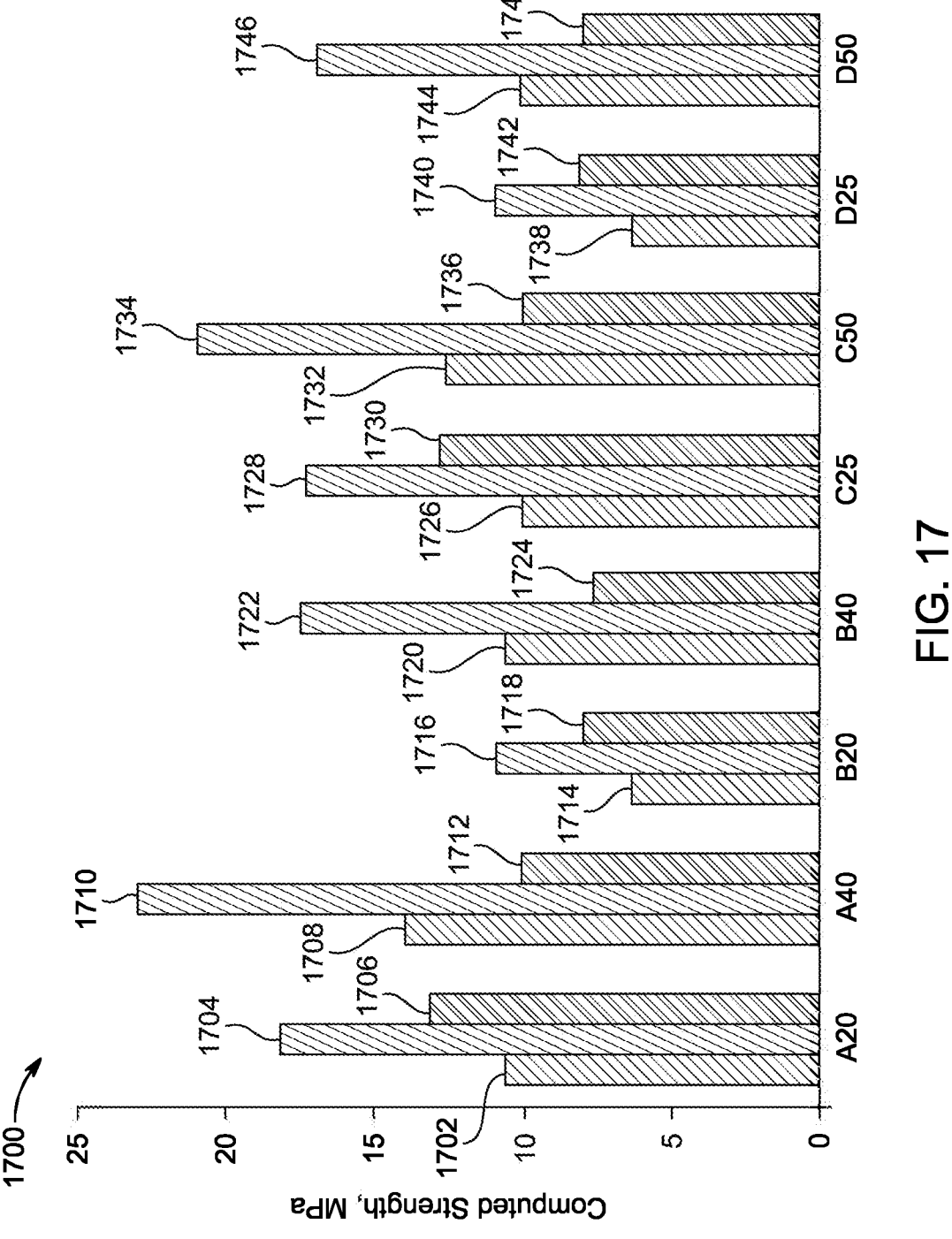
FIG. 17 is a graph illustrating stresses in the flexural hybrid span beams measured at various locations, according to aspects of the present disclosure.

As shown in FIG. 16, for A20 specimen, the difference between the average ultimate load (52 kN) and the average cracking load (38 kN) is higher. The specimen cracks at the FIG. 17 is a graph 1700 illustrating stresses in the hybrid NC-UHPC beams measured at various locations. Bar 1702 represents compressive stress at the top surface for A20 specimen. The compressive stress for A20 specimen is 10.6 MPa. Bar 1704 represents tensile stress at the bottom surface for A20 specimen. The tensile stress for A20 specimen is 18.2 MPa. Bar 1706 represents interface stress between the NC layer and the UHPC layer for A20 specimen. The interface stress for A20 specimen is 13.2 MPa. Bar 1708 represents compressive stress at the top surface for A40 specimen. The compressive stress for A40 specimen is 14 MPa. Bar 1710 represents tensile stress at the bottom surface for A40 specimen. The tensile stress for A40 is 23 MPa. Bar

1712 represents interface stress between the NC layer and the UHPC layer for A40 specimen. The interface stress for A40 specimen is 10.1 MPa.

Bar 1714 represents compressive stress at the top surface for B20 specimen. The compressive stress for B20 specimen is 6.3 MPa. Bar 1716 represents tensile stress at the bottom surface for B20 specimen. The tensile stress for B20 specimen is 10.9 MPa. Bar 1718 represents interface stress between the NC layer and the UHPC layer for B20 specimen. The interface stress for B20 specimen is 7.9 MPa. Bar 1720 represents compressive stress at the top surface for specimen B40. The compressive stress for B40 specimen is 10.6 MPa. Bar 1722 represents tensile stress at the bottom surface for B40 specimen. The tensile stress for B40 specimen is 17.5 MPa. Bar 1724 represents interface stress between the NC layer and the UHPC layer for B40 specimen. The interface stress for B40 specimen is 7.6 MPa.

Bar 1726 represents compressive stress at the top surface for C25 specimen. The compressive stress for C25 specimen is 10 MPa. Bar 1728 represents tensile stress at the bottom surface for C25 specimen. The tensile stress for C25 specimen is 17.3 MPa. Bar 1730 represents interface stress between the NC layer and the UHPC layer for C25 specimen. The interface stress for C25 specimen is 12.8 MPa. Bar 1732 represents compressive stress at the top surface for C50 specimen. The compressive stress for C50 specimen is 12.6 MPa. Bar 1734 represents tensile stress at the bottom surface for C50 specimen. The tensile stress for C50 specimen is 21 MPa. Bar 1736 represents interface stress between the NC layer and the UHPC layer for C50 specimen. The interface stress for C50 specimen is 10 MPa.

Bar 1738 represents compressive stress at the top surface for D25 specimen. The compressive stress for D25 specimen is 6.3 MPa. Bar 1740 represents tensile stress at the bottom surface for D25 specimen. The tensile stress for D25 specimen is 10.9 MPa. Bar 1742 represents interface stress between the NC layer and the UHPC layer for D25 specimen. The interface stress for D25 specimen is 8.1 MPa. Bar 1744 represents compressive stress at the top surface for D50 specimen. The compressive stress for D50 is 10.2 MPa. Bar 1746 represents tensile stress at the bottom surface for D50 specimen. The tensile stress for D50 specimen is 17 MPa. Bar 1748 represents interface stress between the NC layer and the UHPC layer for D50 specimen. The interface stress for D50 specimen is 8 MPa.

FIG. 17 shows the stress in the hybrid NC-UHPC beams, computed at measured cracking load using computed NA and MI. The tensile stress in the UHPC layer varies between 17.0 MPa and 23.0 MPa (at the bottom surface) and 7.6 MPa and 13.2 MPa (at the interface). The compressive stress in the NC layer varies between 6.3 and 14 MPa. The tensile stress in the UHPC layer increases when the thickness is doubled. For group A and group C, with an a/h ratio of about 1.5, the stress in UHPC at the bottom increases by 21% and 26%, whereas for group B and group D (a/h=2.4), it increases by 56% and 60%. The compressive stress also showed a similar enhancement when the thickness of the UHPC layer doubled.

During experiments, the measured and calculated stresses were compared to analyze the failure load. The failure load is the load that causes the net section stress to equal or exceed the material's yield strength.

In general, the hybrid beam section is considered a cracked section as soon as the tensile strength of the UHPC layer at its bottom face goes beyond the computed tensile strength of the NC. The comparison between the theoretical results calculated using a simple bending equation with the measured stresses from strains for the specimens A20, B20, D25, and D50 are presented in FIG. 18A-FIG. 18D.

Figure 18A:
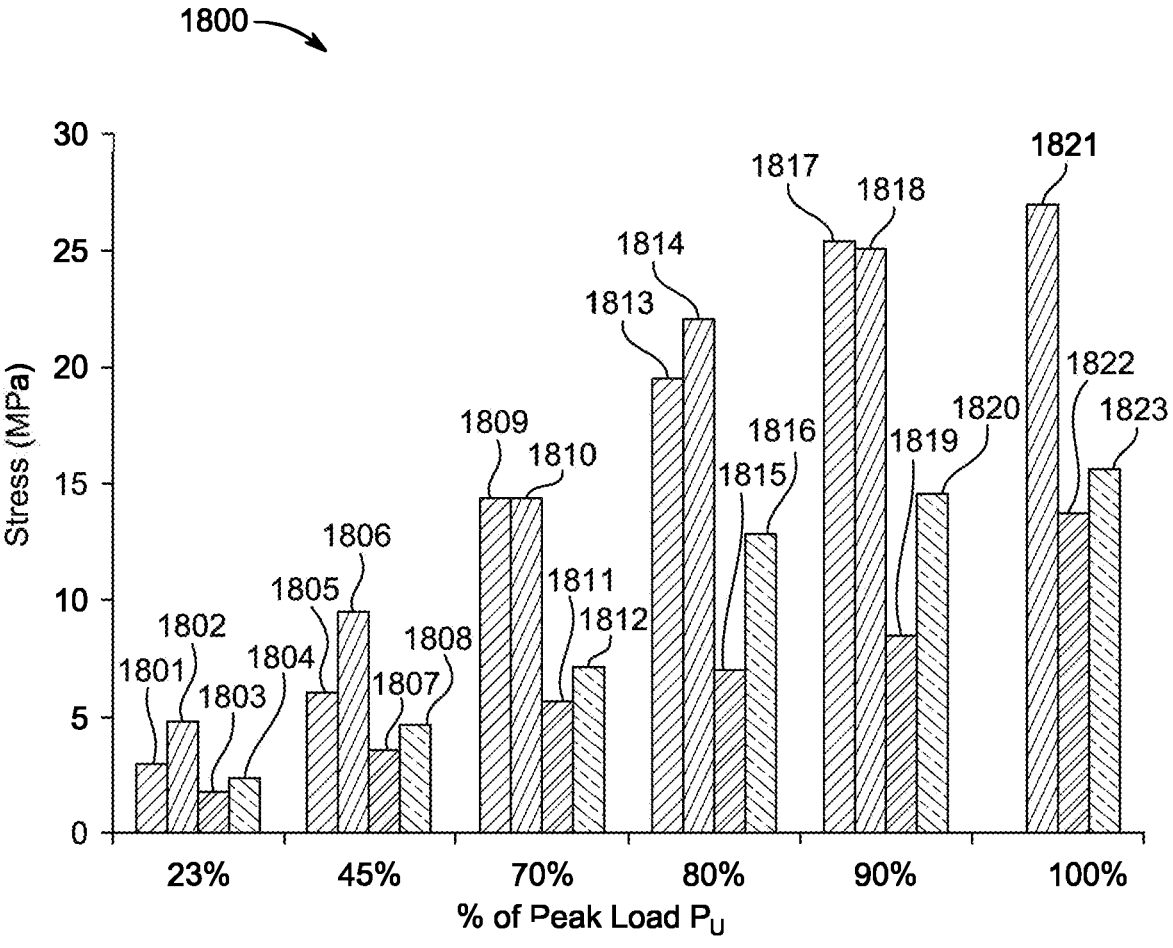
FIG. 18A is a graph illustrating measured and calculated stresses for selected load levels for A20 specimen of the flexural hybrid span beam, according to aspects of the present disclosure.

FIG. 18A is a graph 1800 illustrating measured and calculated stresses for selected load levels for A20 specimen of the flexural hybrid span beam. Bar 1801 represents the measured stress at the bottom surface of A20 specimen at 23% of $P_U$. Bar 1802 represents the calculated stress at the bottom surface of A20 specimen at 23% of $P_U$. Bar 1803 represents the measured stress at the top surface of A20 specimen at 23% of $P_U$. Bar 1804 represents the calculated stress at the top surface of A20 specimen at 23% of $P_U$. Bar 1805 represents the measured stress at the bottom surface of A20 specimen at 45% of $P_U$. Bar 1806 represents the calculated stress at the bottom surface of A20 specimen at 45% of $P_U$. Bar 1807 represents the measured stress at the top surface of A20 specimen at 45% of $P_U$. Bar 1808 represents the calculated stress at the top surface of A20 specimen at 45% of $P_U$. Bar 1809 represents the measured stress at the bottom surface of A20 specimen at 70% of $P_U$. Bar 1810 represents the calculated stress at the bottom surface of A20 specimen at 70% of $P_U$. Bar 1811 represents the measured stress at the top surface of A20 specimen at 70% of $P_U$. Bar 1812 represents the calculated stress at the top surface of A20 specimen at 70% of $P_U$. Bar 1813 represents the measured stress at the bottom surface of A20 specimen at 80% of $P_U$. Bar 1814 represents the calculated stress at the bottom surface of A20 specimen at 80% of $P_U$. Bar 1815 represents the measured stress at the top surface of A20 specimen at 80% of $P_U$. Bar 1816 represents the calculated stress at the top surface of A20 specimen at 80% of $P_U$. Bar 1817 represents the measured stress at the bottom surface of A20 specimen at 90% of $P_U$. Bar 1818 represents the calculated stress at the bottom surface of A20 specimen at 90% of $P_U$. Bar 1819 represents the measured stress at the top surface of A20 specimen at 90% of $P_U$. Bar 1820 represents the calculated stress at the top surface of A20 specimen at 90% of $P_U$. Bar 1821 represents the calculated stress at the bottom surface of A20 specimen at 100% of $P_U$. Bar 1822 represents the measured stress at the top surface of A20 specimen at 100% of $P_U$. Bar 1823 represents the calculated stress at the top surface of A20 specimen at 100% of $P_U$.

Figures 18B, 18C:
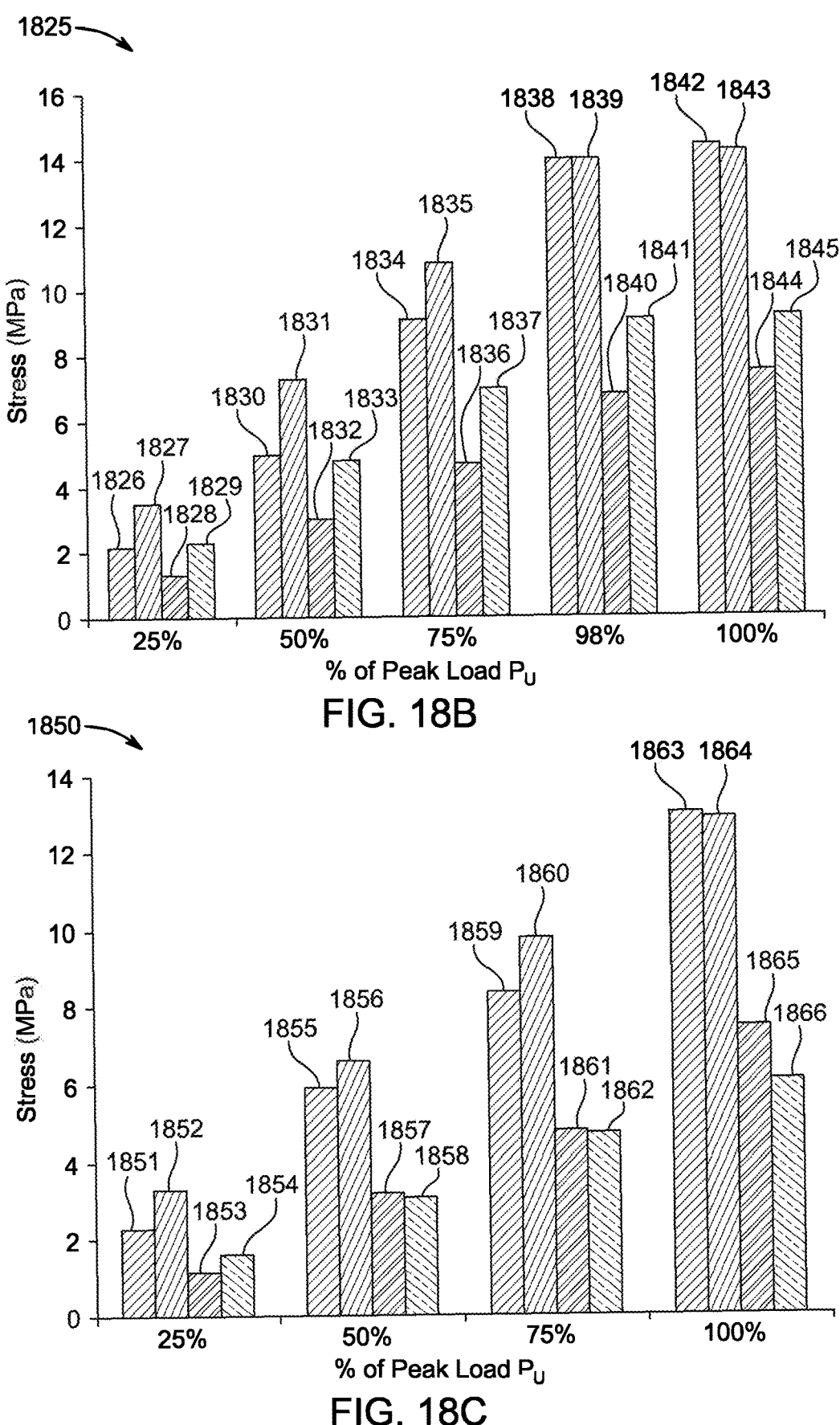
FIG. 18B is a graph illustrating measured and calculated stresses for selected load levels for B20 specimen of the flexural hybrid span beam, according to aspects of the present disclosure.
FIG. 18C is a graph illustrating measured and calculated stresses for selected load levels for D25 specimen of the flexural hybrid span beam, according to aspects of the present disclosure.

FIG. 18B is a graph 1825 illustrating measured and calculated stresses for selected load levels for B20 specimen of the flexural hybrid span beam. Bar 1826 represents the measured stress at the bottom surface of B20 specimen at 25% of $P_U$. Bar 1827 represents the calculated stress at the bottom surface of B20 specimen at 25% of $P_U$. Bar 1828 represents the measured stress at the top surface of B20 specimen at 25% of $P_U$. Bar 1829 represents the calculated stress at the top surface of B20 specimen at 25% of $P_U$. Bar 1830 represents the measured stress at the bottom surface of B20 specimen at 50% of $P_U$. Bar 1831 represents the calculated stress at the bottom surface of B20 specimen at 50% of $P_U$. Bar 1832 represents the measured stress at the top surface of B20 specimen at 50% of $P_U$. Bar 1833 represents the calculated stress at the top surface of B20 specimen at 50% of $P_U$. Bar 1834 represents the measured stress at the bottom surface of B20 specimen at 75% of $P_U$. Bar 1835 represents the calculated stress at the bottom surface of B20 specimen at 75% of $P_U$. Bar 1836 represents the measured stress at the top surface of B20 specimen at 75% of $P_U$. Bar 1837 represents the calculated stress at the top surface of B20 specimen at 75% of $P_U$. Bar 1838 represents the measured stress at the bottom surface of B20 specimen at 98% of $P_U$. Bar 1839 represents the calculated stress at the bottom surface of B20 specimen at 98% of $P_U$.

Bar 1840 represents the measured stress at the top surface of B20 specimen at 98% of $P_U$. Bar 1841 represents the calculated stress at the top surface of B20 specimen at 98% of $P_U$. Bar 1842 represents the measured stress at the bottom surface of B20 specimen at 100% of $P_U$. Bar 1843 represents the calculated stress at the bottom surface of B20 specimen at 100% of $P_U$. Bar 1844 represents the measured stress at the top surface of B20 specimen at 100% of $P_U$. Bar 1845 represents the calculated stress at the top surface of B20 at 100% of $P_U$.

FIG. 18C is a graph 1850 illustrating measured and calculated stresses for selected load levels for D25 specimen of the flexural hybrid span beam. Bar 1851 represents the measured stress at the bottom surface of D25 specimen at 25% of $P_U$. Bar 1852 represents the calculated stress at the bottom surface of D25 specimen at 25% of $P_U$. Bar 1853 represents the measured stress at the top surface of D25 specimen at 25% of $P_U$. Bar 1854 represents the calculated stress at the top surface of D25 specimen at 25% of $P_U$. Bar 1855 represents the measured stress at the bottom surface of D25 specimen at 50% of $P_U$. Bar 1856 represents the calculated stress at the bottom surface of D25 specimen at 50% of $P_U$. Bar 1857 represents the measured stress at the top surface of D25 specimen at 50% of $P_U$. Bar 1858 represents the calculated stress at the top surface of D25 specimen at 50% of $P_U$. Bar 1859 represents the measured stress at the bottom surface of D25 specimen at 75% of $P_U$. Bar 1860 represents the calculated stress at the bottom surface of D25 specimen at 75% of $P_U$. Bar 1861 represents the measured stress at the top surface of D25 specimen at 75% of $P_U$. Bar 1862 represents the calculated stress at the top surface of D25 specimen at 75% of $P_U$. Bar 1862 represents the measured stress at the bottom surface of D25 specimen at 100% of $P_U$. Bar 1863 represents the calculated stress at the bottom surface of D25 specimen at 100% of $P_U$. Bar 1864 represents the measured stress at the top surface of D25 specimen at 100% of $P_U$. Bar 1865 represents the calculated stress at the top surface of D25 at 100% of $P_U$.

Figure 18D:
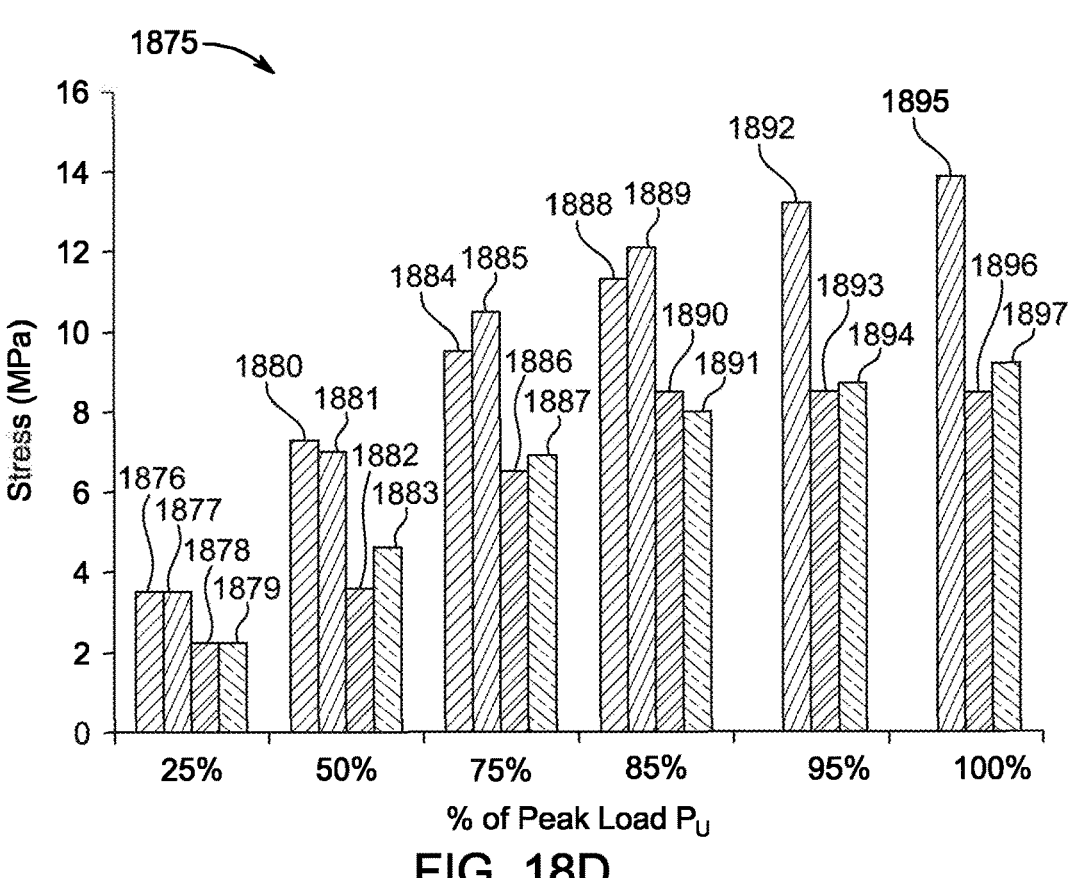
FIG. 18D is a graph illustrating measured and calculated stresses for selected load levels for D50 specimen of the flexural hybrid span beam, according to aspects of the present disclosure.

FIG. 18D is a graph 1875 illustrating measured and calculated stresses for selected load levels for D50 specimen of the flexural hybrid span beam. Bar 1876 represents the measured stress at the bottom surface of D50 specimen at 25% of $P_U$. Bar 1877 represents the calculated stress at the bottom surface of D50 specimen at 25% of $P_U$. Bar 1878 represents the measured stress at the top surface of D50 specimen at 25% of $P_U$. Bar 1879 represents the calculated stress at the top surface of D50 specimen at 25% of $P_U$. Bar 1880 represents the measured stress at the bottom surface of D50 specimen at 50% of $P_U$. Bar 1881 represents the calculated stress at the bottom surface of D50 specimen at 50% of $P_U$. Bar 1882 represents the measured stress at the top surface of D50 specimen at 50% of $P_U$. Bar 1883 represents the calculated stress at the top surface of D50 specimen at 50% of $P_U$. Bar 1884 represents the measured stress at the bottom surface of D50 specimen at 75% of $P_U$. Bar 1885 represents the calculated stress at the bottom surface of D50 specimen at 75% of $P_U$. Bar 1886 represents the measured stress at the top surface of D50 specimen at 75% of $P_U$. Bar 1887 represents the calculated stress at the top surface of D50 specimen at 75% of $P_U$. Bar 1888 represents the measured stress at the bottom surface of D50 specimen at 85% of $P_U$. Bar 1889 represents the calculated stress at the bottom surface of D50 specimen at 85% of $P_U$. Bar 1890 represents the measured stress at the top surface of D50 specimen at 85% of $P_U$. Bar 1891 represents the calculated stress at the top surface of D50 specimen at 85% of $P_U$. Bar 1892 represents the calculated stress at the bottom surface of D50 specimen at 95% of $P_U$. Bar 1893 represents the measured stress at the top surface of D50 specimen at 95% of $P_U$. Bar 1894 represents the calculated stress at the top surface of D50 specimen at 95% of $P_U$. Bar 1895 represents the calculated stress at the bottom surface of D50 specimen at 100% of $P_U$. Bar 1896 represents the measured stress at the top surface of D50 specimen at 100% of $P_U$. Bar 1897 represents the calculated stress at the top surface of D50 specimen at 100% of $P_U$.

The flexural tensile stress at the bottom surface of the hybrid beam was calculated with an elastic modulus of UHPC ($E_{uc}$) of 55 GPa, while the compressive strain at the upper layer of NC was changed to stress by using the modulus of elasticity of NC ($E_{nc}$) of 30 GPa (as shown in table 5). At a smaller level of load, $P<P_{cr}$, the stresses in the hybrid beam were evaluated by using an uncracked beam section, whereas the cracked beam section was used for computing the stresses at load level, $P>P_{cr}$. (Table 6).

FIG. 18A-FIG. 18D show a comparison of the calculated and measured stresses at the top surface and the bottom surface of hybrid beams for different load levels up to 100% of failure load for the selected hybrid beams. FIG. 18A-FIG. 18D also demonstrated that, at all levels of load, the computed stresses are reasonably close to the stresses from the measured strains values, with the exception of some differences close to the ultimate failure load due to the nonlinearity that occurs close to failure load.

Figure 19:
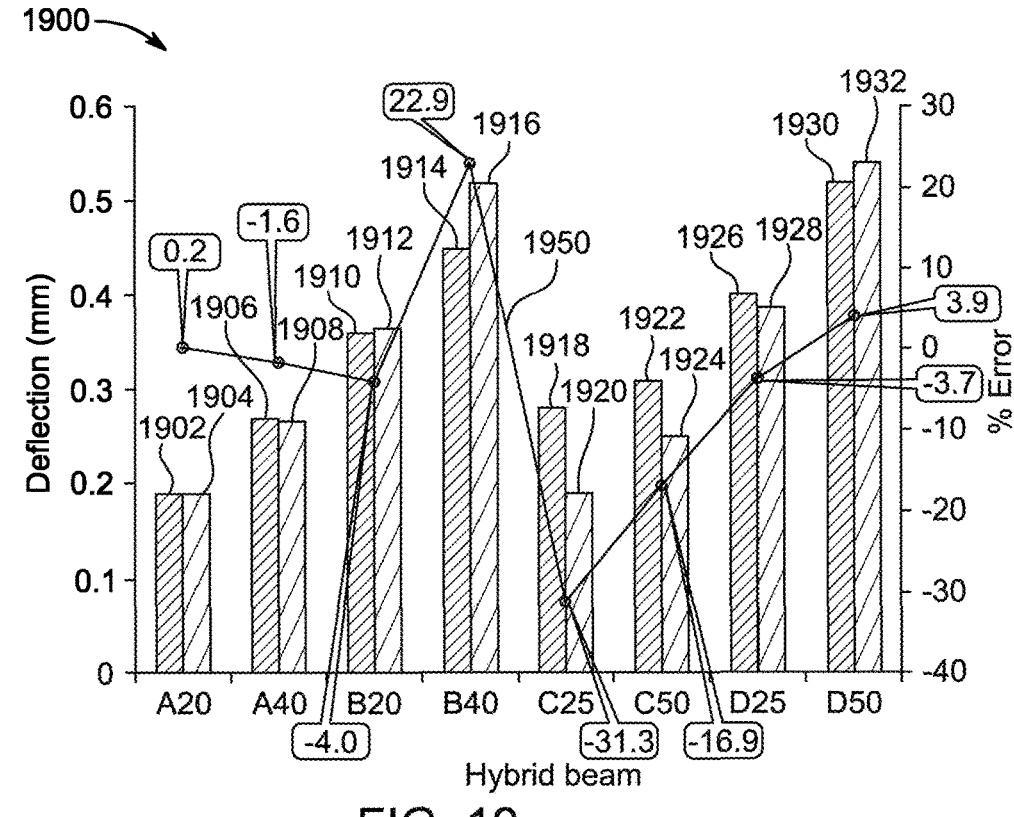
FIG. 19 is a graph illustrating measured and calculated deflection at cracking for the flexural hybrid span beam, according to aspects of the present disclosure.

FIG. 19 is a graph 1900 illustrating measured and calculated deflection at cracking for the flexural hybrid span beam. Bar 1902 represents measured deflection of A20 specimen. Bar 1904 represents calculated deflection of A20 specimen. Bar 1906 represents measured deflection of A40 specimen. Bar 1908 represents calculated deflection of A40 specimen. Bar 1910 represents measured deflection of B20 specimen. Bar 1912 represents calculated deflection of B20 specimen. Bar 1914 represents measured deflection of B40 specimen. Bar 1916 represents calculated deflection of B40 specimen. Bar 1918 represents measured deflection of C25 specimen. Bar 1920 represents calculated deflection of C25 specimen. Bar 1922 represents measured deflection of C50 specimen. Bar 1924 represents calculated deflection of C50 specimen. Bar 1926 represents measured deflection of D25 specimen. Bar 1928 represents calculated deflection of D25 specimen. Bar 1930 represents measured deflection of D50 specimen. Bar 1932 represents calculated deflection of D50 specimen.

Curve 1950 is an error curve represented an error between the measured deflection and the calculated deflection. As shown in FIG. 19, A20 has an error of 0.2% between the measured deflection and the calculated deflection. A40 specimen has an error of −1.6% between the measured deflection and the calculated deflection. B20 specimen has an error of −4% between the measured deflection and the calculated deflection. B40 specimen has an error of 22.9% between the measured deflection and the calculated deflection. C25 specimen has an error of −31.3% between the measured deflection and the calculated deflection. C50 specimen has an error of −16.9% between the measured deflection and the calculated deflection. D25 specimen has an error of −3.7% between the measured deflection and the calculated deflection. D50 specimen has 3.9% error between the measured deflection and the calculated deflection.

FIG. 19 shows the average results of measured and computed deflections at the midspan of all hybrid beams up to the concrete cracking load Pr. By using a simple deflection equation under flexural loading, as shown in equation (6), the calculated deflections were obtained.

$$\delta_{cr} = \frac{P_{cr.a}}{48EI_{cr}}(3L^2 - 4a^2), \tag{6}$$

where $\delta_{cr}$ is the deflection at the center of the hybrid beam $E_{cc}$ is the elastic modulus of NC, I is the moment of inertia of the section, $P_{cr}$, is the applied load, L is the span of the beam, and a is the shear span. The MI could be either the uncracked MI $I_{uc}$ just prior to cracking, MI with a portion of the UHPC layer cracked $I_{cru}$ and Mi in which the NC below the neutral axis is cracked $I_{crn}$. Table 11 shows the measured and calculated deflection with various MI. The UHPC cracked MI assumes that 70% of the UHPC layer is effective due to cracking in the UHPC layer.

TABLE 11

Measured and calculated deflection of hybrid beams

| Specimen | Measured Deflection (mm) | Calculated Deflection $I_{un}$ (mm)/% Error | | Calculated Deflection $I_{crn}$ (mm)/% Error | | Calculated Deflection $I_{cru}$ (mm)/% Error | |
|---|---|---|---|---|---|---|---|
| A20 | 0.19 | 0.117 | −61.75 | 0.137 | −38.28 | 0.190 | 0.21 |
| A40 | 0.27 | 0.122 | −121.83 | 0.124 | −118.32 | 0.266 | −1.60 |
| B20 | 0.38 | 0.225 | −68.57 | 0.264 | −44.11 | 0.365 | −3.99 |
| B40 | 0.4 | 0.238 | −68.24 | 0.242 | −65.58 | 0.519 | 22.94 |
| C25 | 0.25 | 0.120 | −107.79 | 0.144 | −73.92 | 0.190 | −31.28 |
| C50 | 0.31 | 0.125 | −147.73 | 0.128 | −142.23 | 0.265 | −16.86 |
| D25 | 0.4 | 0.244 | −64.14 | 0.291 | −37.38 | 0.386 | −3.70 |
| D50 | 0.52 | 0.255 | −103.69 | 0.261 | −99.17 | 0.541 | 3.92 |

For all beams investigated, there is a big difference between the computed and the measured deflection of the eight hybrid beams when an uncracked section prior to cracking with a MI ($I_{un}$) is used to compute deflections. The deflections are consistently lower, ranging from 39% to 144%. Similarly, if it is assumed that NC below NA is cracked and the MI ($I_{crn}$) is used, the deflection is still under-predicted, with errors ranging from 37% to 142%. In most of the beams cracking was observed to initiate in the UHPC layer. A more appropriate equation for computation of deflection, with values closer to experimentally observed deflections, is based on partial cracking in the UHPC layer, as shown in table 11. The difference between measured and computed deflection using ($I_{cru}$) ranges from 0.2% to 31%. The UHPC layer is assumed to be cracked significantly and with a $\lambda$=0.15 to match the measured deflection. FIG. 19 shows the measured and calculated deflections based on a partially cracked UHPC layer.

The present disclosure describes a hybrid NC-UHPC beam that utilize the ultrahigh tensile strength of UHPC and eliminate the need for passive steel reinforcement. The hybrid NC-UHPC beam includes an upper part made of NC, and a lower part made of a thin layer of UHPC. The thin layer of UHPC replaces the steel reinforcement needed in NC beams and caters to the tensile stress generated at the bottom part of the hybrid NC-UHPC beam. Further experiments were performed on the hybrid design to evaluate the flexural behavior of the hybrid NC-UHPC beam without flexural reinforcement. In the hybrid NC-UHPC beam, the bond between the NC and an uneven surface of the UHPC stratum provides appropriate interfacial shear resistance to ensure combined achievement under loading.

Summarizing, the hybrid NC-UHPC beam has following features:

1. The experimental results show that hybrid NC-UHPC sections with a thin layer of UHPC in the tension zone below the thicker NC layer can be adopted for simple span beam/one-way slab-type members to carry flexural loads without using passive steel reinforcement.

2. The mode of failure of the tested beams showed cracking in the UHPC layer predominantly with a single wide crack within the middle section. Additionally, the UHPC layer in the tension zone imparts a high ductility to the beam and significantly enhances the cracking resistance and moment capacity due to the presence of steel fiber.

3. The moment capacity of the hybrid NC-UHPC beam used in the experimental program (150×150 mm) with a 20 mm to 50 mm thick UHPC layer was higher by 55% compared to the NC beam of similar dimensions and span. The average moment capacity of the hybrid section (9 kN·m) was also close to the moment capacity of the NC beam reinforced with steel bars (10.7 kN·m).

4. The hybrid NC-UHPC beam behaves linearly elastic up to cracking. This measured strain shows a linear behavior confirming that no bond slip occurs at the UHPC and NC interface in the hybrid beam. The linear behavior allows the usage of the transformed section to evaluate deflection, stress, and flexural bearing capacity. The UHPC layer needs to be partially cured with an unfinished top surface for at least 48 hours first, and then the normal concrete is placed over it to increase the bond between both layers and consequently develop a complete composite system without any bond slip at the interface.

5. The measured deflection in the hybrid beam at cracking can be computed with a reasonable accuracy using the moment of inertia for a cracked section in which the UHPC layer is cracked to a great extent. The difference between measured and computed deflections ranges from 0.2% to 31%.

An embodiment is illustrated with respect to FIG. 1. The embodiment describes a method 100 for producing a flexural hybrid span beam. The method includes casting a first layer of ultra-high performance concrete (UHPC) into a bottom of a mold, the first layer comprising steel fibers that are randomly oriented and dispersed (step 102). The method includes self-curing the first layer for at least 48 hours to form an unfinished top surface of the first layer (step 104). The method includes casting a second layer of plain concrete, over the unfinished top surface of the first layer, in the mold, wherein the second layer of plain concrete is not reinforced by steel bars (step 106). The method includes curing the first layer and the second layer to form the flexural hybrid span beam, wherein an interface between the first layer and the second layer is substantially flat and has a periphery conforming to a shape of the mold (step 108).

In an aspect, the second layer is cast over the unfinished top surface of the first layer after self-curing the first layer for the at least 48 hours.

In an aspect, the first layer and the second layer are cured for about 28 days to form the flexural hybrid span beam.

In an aspect, the steel fibers are coated by copper.

In an aspect, the steel fibers are straight and have an average diameter of about 0.2 mm.

In an aspect, the steel fibers have an aspect ratio of about 65 and a maximum tensile strength of 2500 MPa.

In an aspect, the first layer of UHPC further includes a type 1 ordinary Portland cement (OPC), a micro silica, a fine aggregate, a superplasticizer, and water.

In an aspect, the first layer of UHPC consists of at least one type 1 OPC, at least one micro silica, at least one fine aggregate, at least one superplasticizer, the water and the steel fibers.

In an aspect, the method further includes mixing the at least one type 1 OPC, the at least one micro silica and the at least one fine aggregate, then adding the water and the at least one superplasticizer, and then adding the steel fibers.

In an aspect, the first layer of UHPC has a width of 120-180 mm, a length of 760-1200 mm, a thickness of 20-50 mm, a compressive strength of at least 160 MPa, and a tensile strength of about 30 MPa.

In an aspect, the second layer of plain concrete includes a type 1 OPC, a fine aggregate, a coarse aggregate, and water.

In an aspect, the second layer of plain concrete consists of at least one type 1 OPC, at least one fine aggregate, at least one coarse aggregate, and the water.

In an aspect, the method further includes mixing the at least one type 1 OPC, the at least one fine aggregate and at least one coarse aggregate; and then adding the water.

In an aspect, the fine aggregate has an average size of about 0.6 mm, and the coarse aggregate has an average size of 10-20 mm.

In an aspect, a ratio of the water to the type 1 OPC is about 0.42, and the second layer of plain concrete has a width of 100-180 mm, a length of 760-1200 mm, and a thickness of 110-150 mm.

In an aspect, the unfinished top surface of the first layer is substantially flat, and the second layer is cast completely above the unfinished top surface of the first layer.

In an aspect, the method further includes treating the first layer with a trowel, and treating the second layer with the trowel.

In an aspect, the first layer has a first thickness of 20-50 mm, and the second layer has a second thickness of 110-175 mm.

In an aspect, the first layer has a first width of 150 mm, a first length of 900 mm and a first thickness of 50 mm. The second layer has a second width of 150 mm, a second length of 900 mm, and a second thickness of 150 mm. The flexural hybrid span beam has a failure load of 34,000 newtons and a deflection at a flexural failure load of 1.28 mm.

In an aspect, the flexural hybrid span beam consists of the first layer and the second layer.

Numerous modifications and variations of the present disclosure are possible in light of the above teachings. It is therefore to be understood that within the scope of the appended claims, the invention may be practiced otherwise than as specifically described herein.

The invention claimed is:

1. A method for producing a flexural hybrid span beam, the method comprising:
  casting a first layer of ultra-high performance concrete (UHPC) into a bottom of a mold, the first layer comprising steel fibers that are randomly oriented and dispersed;
  self-curing the first layer for at least 48 hours to form an unfinished top surface of the first layer such that the first layer is not completely cured and reaches a cure of 15-50% of design strength;
  casting a second layer of a plain concrete, over the unfinished top surface of the first layer, in the mold, wherein the second layer of the plain concrete is not reinforced by steel bars;
  curing the first layer and the second layer to form the flexural hybrid span beam; and
  removing the flexural hybrid span beam from the mold, wherein the flexural hybrid span beam consists of the first layer and the second layer, an interface between the first layer and the second layer is flat and has a periphery conforming to a cross-sectional shape of the mold, the first layer is the bottom layer of the flexural hybrid span beam, and the second layer is the top layer of the flexural hybrid span beam.

2. The method of claim 1, wherein the second layer is cast over the unfinished top surface of the first layer after self-curing the first layer for the at least 48 hours such that the first layer is not completely cured and reaches a cure of 15-35% of the design strength.

3. The method of claim 1, wherein the first layer and the second layer are cured for 28 days within a margin of 10% to form the flexural hybrid span beam.

4. The method of claim 1, wherein the steel fibers are coated by copper.

5. The method of claim 4, wherein the steel fibers are straight and have an average diameter of 0.2 mm within a margin of 10%.

6. The method of claim 5, wherein the steel fibers have an aspect ratio of 65 within a margin of 10% and a maximum tensile strength of 2500 MPa.

7. The method of claim 1, wherein the first layer of UHPC further comprises a type 1 ordinary Portland cement (OPC), a micro silica, a fine aggregate, a superplasticizer, and water.

8. The method of claim 7, wherein the first layer of UHPC consists of at least one type 1 OPC, at least one micro silica, at least one fine aggregate, at least one superplasticizer, the water and the steel fibers.

9. The method of claim 8, further comprising;
  mixing the at least one type 1 OPC, the at least one micro silica and the at least one fine aggregate;
  then adding the water and the at least one superplasticizer; and
  then adding the steel fibers to form the UHPC.

10. The method of claim 7, wherein the first layer of UHPC has a width of 120-180 mm, a length of 760-1200 mm, a thickness of 20-50 mm, a compressive strength of at least 160 MPa, and a tensile strength of 30 MPa within a margin of 10%.

11. The method of claim 1, wherein the second layer of the plain concrete comprises a type 1 OPC, a fine aggregate, a coarse aggregate, and water.

12. The method of claim 11, wherein the second layer of the plain concrete consists of at least one type 1 OPC, at least one fine aggregate, at least one coarse aggregate, and the water.

13. The method of claim 12, further comprising;
  mixing the at least one type 1 OPC, the at least one fine aggregate and at least one coarse aggregate; and
  then adding the water to form the plain concrete.

14. The method of claim 11, wherein:
  the fine aggregate has an average size of 0.6 mm within a margin of 10%, and
  the coarse aggregate has an average size of 10-20 mm.

15. The method of claim 11, wherein a ratio of the water to the type 1 OPC is 0.42 within a margin of 10%, and the second layer of plain concrete has a width of 100-180 mm, a length of 760-1200 mm, and a thickness of 110-150 mm.

16. The method of claim 1, wherein;
  the unfinished top surface of the first layer is flat, and
  the second layer is cast completely above the unfinished top surface of the first layer.

17. The method of claim 16, further comprising;
  before the self-curing, treating the first layer with a trowel; and
  before the curing, treating the second layer with the trowel.

18. The method of claim 1, wherein;

the first layer has a first thickness of 20-50 mm; and the second layer has a second thickness of 110-175 mm.

19. The method of claim 1, wherein:

the first layer has a first width of 150 mm, a first length of 900 mm and a first thickness of 50 mm, the second layer has a second width of 150 mm, a second length of 900 mm, and a second thickness of 150 mm, and the flexural hybrid span beam has a failure load of 34,000 newtons and a deflection at a flexural failure load of 1.28 mm.

* * * * *